US012528447B1

(12) United States Patent
Smith et al.

(10) Patent No.: US 12,528,447 B1
(45) Date of Patent: *Jan. 20, 2026

(54) MILITARY VEHICLE WITH CONTROL MODES

(71) Applicant: Oshkosh Defense, LLC, Oshkosh, WI (US)

(72) Inventors: Chad Smith, Omro, WI (US); Nader Nasr, Neenah, WI (US); Rachell Harsh, Oshkosh, WI (US); Mike J. Bolton, Oshkosh, WI (US); Bradon Zeitler, Oshkosh, WI (US); Ryan Crabtree, Oshkosh, WI (US); John Beck, Oshkosh, WI (US)

(73) Assignee: OSHKOSH DEFENSE, LLC, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/750,501

(22) Filed: Jun. 21, 2024

Related U.S. Application Data

(63) Continuation of application No. 17/886,615, filed on Aug. 12, 2022, now Pat. No. 12,060,053.
(Continued)

(51) Int. Cl.
*B60W 20/17* (2016.01)
*B60W 10/06* (2006.01)
*B60W 10/08* (2006.01)

(52) U.S. Cl.
CPC ............ *B60W 20/17* (2016.01); *B60W 10/06* (2013.01); *B60W 10/08* (2013.01);
(Continued)

(58) Field of Classification Search
CPC ...... B60W 20/17; B60W 10/06; B60W 10/08; B60W 2555/20; B60W 2300/26;
(Continued)

(56) References Cited

U.S. PATENT DOCUMENTS

| 1,763 A | 9/1840 | Grimes |
|---|---|---|
| 13,952 A | 12/1855 | George |

(Continued)

FOREIGN PATENT DOCUMENTS

| CN | 102490584 A | 6/2012 |
|---|---|---|
| CN | 102849062 A | 1/2013 |

(Continued)

*Primary Examiner* — John D Walters
(74) *Attorney, Agent, or Firm* — FOLEY & LARDNER LLP

(57) ABSTRACT

A military vehicle includes a frame, axle assemblies coupled with the frame that are configured to be driven to transport the military vehicle, an internal combustion engine configured to drive the axle assemblies, an electric motor configured to drive the axle assemblies, and processing circuitry. The processing circuitry is configured to operate the military vehicle according to different modes by generating control signals for the internal combustion engine and the electric motor and providing the control signals to the internal combustion engine and the electric motor. The modes include an economy mode, a summon mode, an environmentally reactive control mode, a weaponry status control mode, a boost mode, an escape mode, an optimized idle control mode, a transmission control mode, a supplemental electric vehicle mode, and a convoy mode.

20 Claims, 44 Drawing Sheets

Related U.S. Application Data

(60) Provisional application No. 63/344,123, filed on May 20, 2022, provisional application No. 63/233,008, filed on Aug. 13, 2021.

(52) U.S. Cl.
CPC ... *B60W 2300/26* (2013.01); *B60W 2510/186* (2013.01); *B60W 2555/20* (2020.02); *B60W 2710/0666* (2013.01); *B60W 2710/083* (2013.01); *B60W 2710/1005* (2013.01)

(58) Field of Classification Search
CPC ... B60W 2501/186; B60W 2710/0666; B60W 2710/083; B60W 2710/1005
See application file for complete search history.

(56) References Cited

U.S. PATENT DOCUMENTS

| | | |
|---|---|---|
| 16,774 A | 3/1857 | Holmes |
| 29,361 A | 7/1860 | Covel |
| 47,430 A | 4/1865 | Kolb |
| 48,292 A | 6/1865 | Leonard |
| 51,775 A | 12/1865 | Brown |
| 51,776 A | 12/1865 | Buckley |
| 52,626 A | 2/1866 | Tyler |
| 97,675 A | 12/1869 | Morris |
| 99,256 A | 1/1870 | Squires et al. |
| 112,496 A | 3/1871 | Robbins |
| 139,955 A | 6/1873 | Hall |
| 158,756 A | 1/1875 | Tibbals |
| 162,200 A | 4/1875 | Sisum |
| 183,431 A | 10/1876 | Steckler, Jr. |
| 193,992 A | 8/1877 | Patterson |
| 200,315 A | 2/1878 | Lewis |
| 230,192 A | 7/1880 | Olmstead |
| 294,505 A | 3/1884 | Robinson |
| 297,417 A | 4/1884 | Keuffel |
| 304,091 A | 8/1884 | Foley |
| 307,084 A | 10/1884 | Bissell |
| 319,389 A | 6/1885 | Button |
| 334,160 A | 1/1886 | Berger |
| 360,678 A | 4/1887 | Gaskin, Sr. |
| 2,612,964 A | 10/1952 | Dudley |
| 4,093,034 A | 6/1978 | Curley et al. |
| 4,533,011 A | 8/1985 | Heidemeyer et al. |
| 4,998,745 A | 3/1991 | David |
| 5,081,365 A | 1/1992 | Field et al. |
| 5,139,123 A | 8/1992 | Rutke |
| 5,281,190 A | 1/1994 | Koivunen |
| 5,343,970 A | 9/1994 | Severinsky |
| 5,559,420 A | 9/1996 | Kohchi |
| 5,713,424 A | 2/1998 | Christenson |
| 5,720,589 A | 2/1998 | Christenson et al. |
| 5,725,350 A | 3/1998 | Christenson |
| 5,769,055 A | 6/1998 | Kaisha |
| 5,769,592 A | 6/1998 | Christenson |
| 5,775,867 A | 7/1998 | Christenson |
| 5,785,486 A | 7/1998 | McNeilus et al. |
| 5,785,487 A | 7/1998 | McNeilus et al. |
| 5,820,150 A | 10/1998 | Archer et al. |
| 5,833,429 A | 11/1998 | McNeilus et al. |
| 5,851,100 A | 12/1998 | Brandt |
| 5,857,822 A | 1/1999 | Christenson |
| 5,863,086 A | 1/1999 | Christenson |
| 5,868,543 A | 2/1999 | McNeilus et al. |
| 5,885,049 A | 3/1999 | McNeilus et al. |
| 5,897,123 A | 4/1999 | Cherney et al. |
| 6,083,138 A | 7/2000 | Aoyama et al. |
| 6,086,074 A | 7/2000 | Braun |
| 6,123,347 A | 9/2000 | Christenson |
| 6,155,126 A | 12/2000 | Vogt et al. |
| 6,164,400 A | 12/2000 | Jankovic et al. |
| 6,209,672 B1 | 4/2001 | Severinsky |
| 6,371,227 B2 | 4/2002 | Bartlett |
| 6,372,378 B1 | 4/2002 | Warner et al. |
| 6,516,914 B1 | 2/2003 | Andersen et al. |
| 6,534,705 B2 | 3/2003 | Berrios et al. |
| 6,561,718 B1 | 5/2003 | Archer et al. |
| 6,672,415 B1 | 1/2004 | Tabata |
| 6,764,085 B1 | 7/2004 | Anderson |
| 6,779,806 B1 | 8/2004 | Breitbach et al. |
| 6,832,148 B1 | 12/2004 | Bennett et al. |
| 6,883,815 B2 | 4/2005 | Archer |
| 6,976,688 B2 | 12/2005 | Archer et al. |
| 7,073,620 B2 | 7/2006 | Braun et al. |
| 7,207,582 B2 | 4/2007 | Siebers et al. |
| 7,222,004 B2 * | 5/2007 | Anderson ......... G01C 21/3461 180/65.265 |
| 7,231,994 B2 | 6/2007 | Buglione et al. |
| 7,258,194 B2 | 8/2007 | Braun et al. |
| 7,277,782 B2 | 10/2007 | Yakes et al. |
| 7,302,320 B2 | 11/2007 | Nasr et al. |
| 7,331,586 B2 | 2/2008 | Trinkner et al. |
| 7,357,203 B2 | 4/2008 | Morrow et al. |
| 7,379,797 B2 | 5/2008 | Nasr et al. |
| 7,439,711 B2 | 10/2008 | Bolton |
| 7,472,914 B2 | 1/2009 | Anderson et al. |
| 7,497,285 B1 | 3/2009 | Radev |
| 7,521,814 B2 | 4/2009 | Nasr |
| 7,770,506 B2 | 8/2010 | Johnson et al. |
| 7,848,857 B2 | 12/2010 | Nasr et al. |
| 7,878,750 B2 | 2/2011 | Zhou et al. |
| 7,905,540 B2 | 3/2011 | Kiley et al. |
| 7,937,194 B2 | 5/2011 | Nasr et al. |
| 8,000,850 B2 | 8/2011 | Nasr et al. |
| 8,005,587 B2 | 8/2011 | Tamor et al. |
| 8,201,656 B2 | 6/2012 | Archer et al. |
| 8,286,743 B2 | 10/2012 | Rawlinson |
| 8,307,924 B2 | 11/2012 | Wang et al. |
| 8,333,390 B2 | 12/2012 | Linsmeier et al. |
| 8,337,352 B2 | 12/2012 | Morrow et al. |
| 8,376,077 B2 | 2/2013 | Venton-Walters |
| 8,459,619 B2 | 6/2013 | Trinh et al. |
| 8,465,025 B2 | 6/2013 | Venton-Walters et al. |
| 8,561,735 B2 | 10/2013 | Morrow et al. |
| 8,565,990 B2 | 10/2013 | Ortmann et al. |
| 8,596,648 B2 | 12/2013 | Venton-Walters et al. |
| 8,764,029 B2 | 7/2014 | Venton-Walters et al. |
| 8,801,017 B2 | 8/2014 | Ellifson et al. |
| 8,801,393 B2 | 8/2014 | Crabtree et al. |
| 8,833,324 B2 | 9/2014 | O'Brien et al. |
| 8,834,319 B2 | 9/2014 | Nefcy |
| 8,839,902 B1 | 9/2014 | Archer et al. |
| 8,864,613 B2 | 10/2014 | Morrow et al. |
| 8,876,133 B2 | 11/2014 | Ellifson |
| 8,955,859 B1 | 2/2015 | Richmond et al. |
| 8,955,880 B2 | 2/2015 | Malcolm et al. |
| 8,991,834 B2 | 3/2015 | Venton-Walters et al. |
| 8,991,840 B2 | 3/2015 | Zuleger et al. |
| 9,007,020 B2 | 4/2015 | Prosser et al. |
| 9,016,703 B2 | 4/2015 | Rowe et al. |
| 9,045,014 B1 | 6/2015 | Verhoff et al. |
| 9,054,402 B1 | 6/2015 | Rawlinson |
| 9,074,656 B2 | 7/2015 | Benz et al. |
| 9,114,804 B1 | 8/2015 | Shukla et al. |
| 9,126,587 B2 | 9/2015 | Yamazaki et al. |
| 9,127,738 B2 | 9/2015 | Ellifson et al. |
| 9,132,736 B1 | 9/2015 | Shukla et al. |
| 9,174,686 B1 | 11/2015 | Messina et al. |
| 9,227,582 B2 | 1/2016 | Katayama et al. |
| 9,254,740 B2 | 2/2016 | Lamperth |
| 9,291,230 B2 | 3/2016 | Ellifson et al. |
| 9,302,129 B1 | 4/2016 | Betz et al. |
| 9,303,715 B2 | 4/2016 | Dillman et al. |
| 9,318,751 B2 | 4/2016 | Chorian et al. |
| 9,327,576 B2 | 5/2016 | Ellifson |
| 9,328,986 B1 | 5/2016 | Pennau et al. |
| 9,329,000 B1 | 5/2016 | Richmond et al. |
| 9,376,102 B1 | 6/2016 | Shukla et al. |
| 9,410,823 B2 | 8/2016 | Widmer et al. |
| 9,415,697 B2 | 8/2016 | Asai |
| 9,423,069 B2 | 8/2016 | Shimmel et al. |
| 9,428,042 B2 | 8/2016 | Morrow et al. |

(56) References Cited

U.S. PATENT DOCUMENTS

| | | |
|---|---|---|
| 9,434,321 B2 | 9/2016 | Perron et al. |
| 9,440,523 B2 | 9/2016 | Decker |
| 9,452,750 B2 | 9/2016 | Shukla et al. |
| 9,472,971 B2 | 10/2016 | Soar |
| 9,492,695 B2 | 11/2016 | Betz et al. |
| 9,533,631 B2 | 1/2017 | Kamimura et al. |
| 9,580,960 B2 | 2/2017 | Aiken et al. |
| 9,580,962 B2 | 2/2017 | Betz et al. |
| 9,650,032 B2 | 5/2017 | Kotloski et al. |
| 9,651,120 B2 | 5/2017 | Morrow et al. |
| 9,656,640 B1 | 5/2017 | Verhoff et al. |
| 9,656,659 B2 | 5/2017 | Shukla et al. |
| 9,669,679 B2 | 6/2017 | Zuleger et al. |
| 9,677,334 B2 | 6/2017 | Aiken et al. |
| 9,688,112 B2 | 6/2017 | Venton-Walters et al. |
| 9,707,869 B1 | 7/2017 | Messina et al. |
| 9,732,846 B2 | 8/2017 | Li et al. |
| 9,751,540 B2 | 9/2017 | Cook |
| 9,764,613 B2 | 9/2017 | Rowe et al. |
| 9,765,841 B2 | 9/2017 | Ellifson et al. |
| 9,806,306 B2 | 10/2017 | Tsutsui et al. |
| 9,809,080 B2 | 11/2017 | Ellifson et al. |
| 9,821,789 B2 | 11/2017 | Shukla et al. |
| 9,849,871 B2 | 12/2017 | Dunlap et al. |
| 9,890,024 B2 | 2/2018 | Hao et al. |
| 9,908,520 B2 | 3/2018 | Shukla et al. |
| 9,944,145 B2 | 4/2018 | Dillman et al. |
| 9,944,186 B1 | 4/2018 | Rehberger |
| 9,970,515 B2 | 5/2018 | Morrow et al. |
| 10,029,555 B2 | 7/2018 | Kotloski et al. |
| 10,029,556 B2 | 7/2018 | Morrow et al. |
| 10,030,737 B2 | 7/2018 | Dillman et al. |
| 10,144,389 B2 | 12/2018 | Archer et al. |
| 10,160,438 B2 | 12/2018 | Shukla et al. |
| 10,167,027 B2 | 1/2019 | Perron et al. |
| 10,221,055 B2 | 3/2019 | Hao et al. |
| 10,224,745 B2 | 3/2019 | Easton et al. |
| 10,267,390 B2 | 4/2019 | Morrow et al. |
| 10,272,909 B1 | 4/2019 | Melatti et al. |
| 10,315,643 B2 | 6/2019 | Shukla et al. |
| 10,350,956 B2 | 7/2019 | Dillman et al. |
| 10,369,860 B2 | 8/2019 | Ellifson et al. |
| 10,384,668 B2 | 8/2019 | Hilliard et al. |
| 10,392,000 B2 | 8/2019 | Shukla et al. |
| 10,392,056 B2 | 8/2019 | Perron et al. |
| 10,407,288 B2 | 9/2019 | Hao et al. |
| 10,421,332 B2 | 9/2019 | Venton-Walters et al. |
| 10,422,403 B2 | 9/2019 | Ellifson et al. |
| 10,434,894 B2 | 10/2019 | Li et al. |
| 10,434,995 B2 | 10/2019 | Verhoff et al. |
| 10,435,026 B2 | 10/2019 | Shively et al. |
| 10,457,134 B2 | 10/2019 | Morrow et al. |
| 10,458,182 B1 | 10/2019 | Betz et al. |
| 10,463,900 B1 | 11/2019 | Betz et al. |
| 10,464,389 B2 | 11/2019 | Zuleger et al. |
| 10,486,689 B2 | 11/2019 | Farrell et al. |
| D869,332 S | 12/2019 | Gander et al. |
| 10,532,722 B1 | 1/2020 | Betz et al. |
| 10,611,203 B1 | 4/2020 | Rositch et al. |
| 10,611,204 B1 | 4/2020 | Zhang et al. |
| 10,619,696 B2 | 4/2020 | Dillman et al. |
| 10,632,805 B1 | 4/2020 | Rositch et al. |
| 10,676,079 B1 | 6/2020 | Bucknor et al. |
| 10,723,282 B1 | 7/2020 | Perron et al. |
| 10,724,616 B2 | 7/2020 | Katsura et al. |
| 10,734,693 B2 | 8/2020 | Staudenmaier |
| 10,752,075 B1 | 8/2020 | Shukla et al. |
| 10,759,251 B1 | 9/2020 | Zuleger |
| 10,836,375 B2 | 11/2020 | Kaufman et al. |
| 10,843,549 B2 | 11/2020 | Morrow et al. |
| 10,858,231 B2 | 12/2020 | Holmes et al. |
| 10,875,521 B2 | 12/2020 | Pettersson |
| 10,934,145 B2 | 3/2021 | Hao et al. |
| 10,940,728 B2 | 3/2021 | Rositch et al. |
| 10,953,939 B2 | 3/2021 | Zuleger et al. |
| 10,960,248 B2 | 3/2021 | Betz et al. |
| 10,967,728 B2 | 4/2021 | Kotloski et al. |
| 10,974,561 B2 | 4/2021 | Dillman et al. |
| 10,974,713 B2 | 4/2021 | Shukla et al. |
| 10,974,724 B1 | 4/2021 | Shively et al. |
| 10,981,538 B2 | 4/2021 | Archer et al. |
| 10,982,736 B2 | 4/2021 | Steinberger et al. |
| 10,988,132 B2 | 4/2021 | Ayesh et al. |
| 10,989,279 B2 | 4/2021 | Morrow et al. |
| 11,001,135 B2 | 5/2021 | Yakes et al. |
| 11,007,863 B2 | 5/2021 | Yakes et al. |
| 11,027,606 B2 | 6/2021 | Wildgrube et al. |
| 11,034,206 B2 | 6/2021 | Zuleger |
| 11,034,227 B2 | 6/2021 | Spielvogel et al. |
| 11,046,142 B2 | 6/2021 | Zhang et al. |
| 11,052,899 B2 | 7/2021 | Shukla et al. |
| 11,097,617 B2 | 8/2021 | Rocholl et al. |
| 11,110,977 B2 | 9/2021 | Smith et al. |
| 11,111,120 B2 | 9/2021 | Hao et al. |
| 11,135,890 B2 | 10/2021 | Ellifson et al. |
| 11,136,187 B2 | 10/2021 | Koga et al. |
| 11,137,053 B2 | 10/2021 | Steinberger et al. |
| 11,142,058 B2 | 10/2021 | Marquez Duran et al. |
| 11,148,550 B2 | 10/2021 | Rocholl et al. |
| 11,161,403 B2 | 11/2021 | Lo et al. |
| 11,161,415 B1 | 11/2021 | Koga et al. |
| 11,161,483 B2 | 11/2021 | Betz et al. |
| 11,167,919 B1 | 11/2021 | Koga et al. |
| 11,199,239 B2 | 12/2021 | Dumitru et al. |
| 11,209,067 B2 | 12/2021 | Ellifson et al. |
| 11,225,240 B2 | 1/2022 | Dalum |
| 11,230,278 B2 | 1/2022 | Linsmeier et al. |
| 11,299,139 B2 | 4/2022 | Shukla et al. |
| 11,358,431 B2 | 6/2022 | Hall et al. |
| 11,376,943 B1 | 7/2022 | Smith et al. |
| 11,376,958 B1 | 7/2022 | Smith et al. |
| 11,376,990 B1 | 7/2022 | Smith et al. |
| 11,377,089 B1 | 7/2022 | Smith et al. |
| 11,383,694 B1 | 7/2022 | Smith et al. |
| 11,420,522 B1 | 8/2022 | Bernatchez |
| 11,465,486 B1 | 10/2022 | Smith et al. |
| 11,498,409 B1 | 11/2022 | Smith et al. |
| 11,498,426 B1 | 11/2022 | Bernatchez |
| 11,505,062 B1 | 11/2022 | Smith et al. |
| 11,597,399 B1 | 3/2023 | Smith et al. |
| 11,608,050 B1 | 3/2023 | Smith et al. |
| 11,712,977 B2 | 8/2023 | Bucknor et al. |
| 11,964,587 B2 | 4/2024 | Yukawa |
| 11,967,727 B2 | 4/2024 | Poloczek et al. |
| 12,100,966 B2 | 9/2024 | Lethellier et al. |
| 12,278,354 B2 | 4/2025 | Teshima et al. |
| 2003/0183431 A1 | 10/2003 | Cikanek et al. |
| 2005/0080523 A1 | 4/2005 | Bennett et al. |
| 2005/0109550 A1 | 5/2005 | Buglione et al. |
| 2005/0113996 A1 | 5/2005 | Pillar et al. |
| 2005/0209747 A1 | 9/2005 | Yakes et al. |
| 2005/0251299 A1 | 11/2005 | Donnelly et al. |
| 2005/0256631 A1 | 11/2005 | Cawthorne et al. |
| 2006/0173593 A1 | 8/2006 | Anderson |
| 2007/0021879 A1 | 1/2007 | Delnero et al. |
| 2007/0112496 A1 | 5/2007 | Ji |
| 2007/0124037 A1 | 5/2007 | Moran |
| 2007/0162200 A1 | 7/2007 | Zillmer et al. |
| 2007/0164552 A1 | 7/2007 | Bauer et al. |
| 2007/0186896 A1 | 8/2007 | Carroll et al. |
| 2007/0278856 A1 | 12/2007 | Craig et al. |
| 2008/0017426 A1 | 1/2008 | Walters et al. |
| 2008/0020875 A1 | 1/2008 | Serrels et al. |
| 2008/0029361 A1 | 2/2008 | Deroo et al. |
| 2008/0093139 A1 | 4/2008 | Dobereiner et al. |
| 2008/0099256 A1 | 5/2008 | Holmes et al. |
| 2008/0149405 A1 | 6/2008 | Hladun et al. |
| 2008/0150350 A1 | 6/2008 | Morrow et al. |
| 2008/0234096 A1 | 9/2008 | Joshi et al. |
| 2008/0284118 A1 | 11/2008 | Venton-Walters et al. |
| 2009/0013952 A1 | 1/2009 | Deniston et al. |
| 2009/0062320 A1 | 3/2009 | Guagnano et al. |
| 2009/0098976 A1 | 4/2009 | Usoro et al. |
| 2009/0174158 A1 | 7/2009 | Anderson et al. |

(56) References Cited

U.S. PATENT DOCUMENTS

| | | |
|---|---|---|
| 2009/0192660 A1 | 7/2009 | Tamor et al. |
| 2009/0287366 A1 | 11/2009 | Davis et al. |
| 2009/0298646 A1 | 12/2009 | Parsons |
| 2009/0326750 A1 | 12/2009 | Ang |
| 2010/0019538 A1 | 1/2010 | Kiley et al. |
| 2010/0049389 A1 | 2/2010 | Ando |
| 2010/0065001 A1 | 3/2010 | Spicer et al. |
| 2010/0138089 A1 | 6/2010 | James |
| 2010/0145562 A1 | 6/2010 | Moran |
| 2010/0219007 A1 | 9/2010 | Dalum et al. |
| 2010/0230192 A1 | 9/2010 | Riley |
| 2011/0079978 A1 | 4/2011 | Schreiner et al. |
| 2011/0162901 A1 | 7/2011 | Lucas et al. |
| 2011/0297469 A1 | 12/2011 | Usami et al. |
| 2012/0225751 A1 | 9/2012 | Andreae et al. |
| 2012/0227394 A1 | 9/2012 | Schweiher et al. |
| 2012/0244979 A1 | 9/2012 | Kruger |
| 2012/0266701 A1 | 10/2012 | Yamada et al. |
| 2012/0299544 A1 | 11/2012 | Prosser et al. |
| 2012/0328454 A1 | 12/2012 | Roby |
| 2012/0329593 A1 | 12/2012 | Larrabee et al. |
| 2013/0126254 A1 | 5/2013 | Lee et al. |
| 2013/0158756 A1 | 6/2013 | Yamazaki et al. |
| 2013/0218386 A1 | 8/2013 | Fisker et al. |
| 2013/0234864 A1 | 9/2013 | Herman |
| 2014/0207346 A1 | 7/2014 | Filla et al. |
| 2014/0228168 A1 | 8/2014 | Kaufman et al. |
| 2014/0315064 A1 | 10/2014 | Katayama et al. |
| 2015/0051775 A1 | 2/2015 | Gotoh et al. |
| 2015/0051776 A1 | 2/2015 | Gotoh et al. |
| 2015/0188104 A1 | 7/2015 | Templeman et al. |
| 2015/0247559 A1 | 9/2015 | Graves |
| 2015/0307084 A1 | 10/2015 | Bureau et al. |
| 2015/0336568 A1 | 11/2015 | Porras et al. |
| 2015/0360678 A1 | 12/2015 | Le Roy et al. |
| 2016/0001763 A1 | 1/2016 | Ehrlich et al. |
| 2016/0052382 A1 | 2/2016 | Clark et al. |
| 2016/0052420 A1 | 2/2016 | Kim |
| 2016/0082951 A1 | 3/2016 | Ohn et al. |
| 2016/0152129 A1 | 6/2016 | West et al. |
| 2016/0185207 A1 | 6/2016 | Gerschutz et al. |
| 2016/0193992 A1 | 7/2016 | Hancock et al. |
| 2016/0200315 A1 | 7/2016 | Fracchia et al. |
| 2016/0297417 A1 | 10/2016 | Shukla et al. |
| 2016/0304091 A1 | 10/2016 | Remes |
| 2017/0023947 A1 | 1/2017 | McMillion |
| 2017/0028912 A1 | 2/2017 | Yang et al. |
| 2017/0028978 A1 | 2/2017 | Dunlap et al. |
| 2017/0066431 A1 | 3/2017 | Kim et al. |
| 2017/0120890 A1 | 5/2017 | Payne |
| 2017/0120899 A1 | 5/2017 | Sugimoto et al. |
| 2017/0129475 A1 | 5/2017 | Prakah-Asante et al. |
| 2017/0282737 A1 | 10/2017 | Miller et al. |
| 2017/0291609 A1 | 10/2017 | Reich et al. |
| 2017/0297425 A1 | 10/2017 | Wildgrube et al. |
| 2017/0355259 A1 | 12/2017 | Borud et al. |
| 2017/0355373 A1 | 12/2017 | Dalum |
| 2018/0001839 A1 | 1/2018 | Perron et al. |
| 2018/0009431 A1 | 1/2018 | Akuzawa |
| 2018/0050685 A1 | 2/2018 | Atluri et al. |
| 2018/0050686 A1 | 2/2018 | Atluri et al. |
| 2018/0154754 A1 | 6/2018 | Rowley et al. |
| 2018/0162371 A1 | 6/2018 | Colavincenzo et al. |
| 2018/0170349 A1 | 6/2018 | Jobson et al. |
| 2018/0265001 A1 | 9/2018 | Bean et al. |
| 2018/0281772 A1 | 10/2018 | Hilliard et al. |
| 2018/0304882 A1 | 10/2018 | Koh et al. |
| 2018/0319389 A1 | 11/2018 | Felsch et al. |
| 2018/0334160 A1 | 11/2018 | Kava et al. |
| 2018/0370373 A1 | 12/2018 | Hooper et al. |
| 2019/0039407 A1 | 2/2019 | Smith |
| 2019/0084395 A1 | 3/2019 | Toyota et al. |
| 2019/0126759 A1 | 5/2019 | Miller et al. |
| 2019/0129416 A1 | 5/2019 | Upmanue et al. |
| 2019/0135107 A1 | 5/2019 | Fortune et al. |
| 2019/0143957 A1 | 5/2019 | Dalum et al. |
| 2019/0178350 A1 | 6/2019 | Steinberger et al. |
| 2019/0202286 A1 | 7/2019 | Natsume et al. |
| 2019/0233034 A1 | 8/2019 | Viele et al. |
| 2019/0248361 A1 | 8/2019 | Farrell et al. |
| 2019/0270387 A1 | 9/2019 | Dudar et al. |
| 2019/0276001 A1 | 9/2019 | Kava et al. |
| 2019/0291711 A1 | 9/2019 | Shukla et al. |
| 2019/0308669 A1 | 10/2019 | Aitharaju et al. |
| 2019/0316650 A1 | 10/2019 | Dillman et al. |
| 2019/0344838 A1 | 11/2019 | Perron et al. |
| 2019/0359198 A1 | 11/2019 | Velderman et al. |
| 2020/0001698 A1 | 1/2020 | Jang et al. |
| 2020/0047740 A1 | 2/2020 | Hoesl |
| 2020/0056426 A1 | 2/2020 | Betz et al. |
| 2020/0062071 A1 | 2/2020 | Zuleger et al. |
| 2020/0108709 A1 | 4/2020 | Kohler et al. |
| 2020/0117204 A1 | 4/2020 | Lindemann et al. |
| 2020/0139955 A1 | 5/2020 | Park |
| 2020/0164760 A1 | 5/2020 | Sohmshetty et al. |
| 2020/0171907 A1 | 6/2020 | Hall et al. |
| 2020/0180440 A1 | 6/2020 | Uchimura et al. |
| 2020/0223276 A1 | 7/2020 | Rositch et al. |
| 2020/0232533 A1 | 7/2020 | Dillman et al. |
| 2020/0247388 A1 | 8/2020 | Johri et al. |
| 2020/0316816 A1 | 10/2020 | Messina et al. |
| 2020/0317083 A1 | 10/2020 | Messina et al. |
| 2020/0346547 A1 | 11/2020 | Rocholl et al. |
| 2020/0346556 A1 | 11/2020 | Rocholl et al. |
| 2020/0384823 A1 | 12/2020 | Shukla et al. |
| 2020/0384977 A1 | 12/2020 | Higuchi et al. |
| 2020/0385977 A1 | 12/2020 | Cooper et al. |
| 2020/0386135 A1 | 12/2020 | Kobayashi et al. |
| 2021/0016774 A1 | 1/2021 | Cho et al. |
| 2021/0031612 A1 | 2/2021 | Yakes et al. |
| 2021/0031649 A1 | 2/2021 | Messina et al. |
| 2021/0031837 A1 | 2/2021 | Schmidt |
| 2021/0070371 A1 | 3/2021 | Ebisumoto et al. |
| 2021/0070375 A1 | 3/2021 | Ebisumoto et al. |
| 2021/0070388 A1 | 3/2021 | Matsuda |
| 2021/0107361 A1 | 4/2021 | Linsmeier et al. |
| 2021/0122205 A1 | 4/2021 | Shukla et al. |
| 2021/0129757 A1 | 5/2021 | Uken |
| 2021/0135177 A1 | 5/2021 | Kalra et al. |
| 2021/0140517 A1 | 5/2021 | Steinberger et al. |
| 2021/0143663 A1 | 5/2021 | Bolton |
| 2021/0155063 A1 | 5/2021 | Rositch et al. |
| 2021/0155218 A1 | 5/2021 | Higuchi et al. |
| 2021/0171137 A1 | 6/2021 | Zuleger et al. |
| 2021/0173411 A1 | 6/2021 | Rao et al. |
| 2021/0178890 A1 | 6/2021 | Steinberger et al. |
| 2021/0188069 A1 | 6/2021 | Friedman |
| 2021/0188076 A1 | 6/2021 | Morrow et al. |
| 2021/0200243 A1 | 7/2021 | Chen et al. |
| 2021/0213822 A1 | 7/2021 | Ripley et al. |
| 2021/0213934 A1 | 7/2021 | Higuchi et al. |
| 2021/0215493 A1 | 7/2021 | Kapadia et al. |
| 2021/0221190 A1 | 7/2021 | Rowe |
| 2021/0221216 A1 | 7/2021 | Yakes et al. |
| 2021/0231411 A1 | 7/2021 | Grate et al. |
| 2021/0276450 A1 | 9/2021 | Eshleman et al. |
| 2021/0276643 A1 | 9/2021 | Ellifson et al. |
| 2021/0313647 A1 | 10/2021 | Itai et al. |
| 2021/0316588 A1 | 10/2021 | Zhang et al. |
| 2021/0318696 A1 | 10/2021 | Koch |
| 2021/0323436 A1 | 10/2021 | Rocholl et al. |
| 2021/0323437 A1 | 10/2021 | Rocholl et al. |
| 2021/0323438 A1 | 10/2021 | Rocholl et al. |
| 2021/0327170 A1 | 10/2021 | Rocholl et al. |
| 2021/0327237 A1 | 10/2021 | Rocholl et al. |
| 2021/0339632 A1 | 11/2021 | Rocholl et al. |
| 2021/0339648 A1 | 11/2021 | Koga et al. |
| 2021/0354684 A1 | 11/2021 | Healy et al. |
| 2021/0362696 A1 | 11/2021 | Verhoff et al. |
| 2021/0362697 A1 | 11/2021 | Verhoff et al. |
| 2021/0369515 A1 | 12/2021 | Malcolm et al. |
| 2021/0370894 A1 | 12/2021 | Verhoff et al. |
| 2021/0380085 A1 | 12/2021 | Verhoff et al. |
| 2021/0380179 A1 | 12/2021 | Smith et al. |

(56) References Cited

U.S. PATENT DOCUMENTS

| | | |
|---|---|---|
| 2021/0396293 A1 | 12/2021 | Ellifson et al. |
| 2022/0001734 A1 | 1/2022 | Tanaka et al. |
| 2022/0049647 A1 | 2/2022 | Papaioannou et al. |
| 2022/0063660 A1 | 3/2022 | Poulet et al. |
| 2022/0097675 A1 | 3/2022 | Bryan et al. |
| 2022/0118845 A1 | 4/2022 | Mu |
| 2022/0126878 A1 | 4/2022 | Moustafa et al. |
| 2022/0176965 A1 | 6/2022 | Gesang et al. |
| 2022/0268202 A1 | 8/2022 | Pennazza et al. |
| 2022/0273975 A1 | 9/2022 | Svensson |
| 2022/0344964 A1 | 10/2022 | Duarte |
| 2022/0355678 A1 | 11/2022 | Seo |
| 2022/0371456 A1 | 11/2022 | Borud et al. |
| 2022/0379730 A1 | 12/2022 | Bernatchez |
| 2023/0047110 A1 | 2/2023 | Smith et al. |
| 2023/0057525 A1 | 2/2023 | Smith et al. |
| 2023/0070769 A1 | 3/2023 | Wheeler et al. |
| 2023/0173902 A1 | 6/2023 | Ruiz et al. |
| 2023/0200296 A1 | 6/2023 | Zeiler et al. |
| 2023/0231245 A1 | 7/2023 | Gauthier |
| 2023/0318131 A1 | 10/2023 | Kellner et al. |
| 2023/0415555 A1 | 12/2023 | Murphy et al. |
| 2024/0063470 A1 | 2/2024 | Linsmeier et al. |
| 2024/0101098 A1 | 3/2024 | Salter et al. |
| 2024/0149657 A1 | 5/2024 | Coupal-Sikes et al. |
| 2024/0149965 A1 | 5/2024 | Archer et al. |
| 2024/0153674 A1 | 5/2024 | Archer et al. |
| 2024/0243387 A1 | 7/2024 | Naruke |
| 2025/0087807 A1 | 3/2025 | Burgess et al. |
| 2025/0269972 A1 | 8/2025 | Peck |
| 2025/0329845 A1 | 10/2025 | Bloder |

FOREIGN PATENT DOCUMENTS

| | | |
|---|---|---|
| CN | 202965960 U | 6/2013 |
| CN | 119369961 A | 1/2025 |
| DE | 10 2005 047 940 A1 | 7/2007 |
| DE | 10 2014 201 355 A1 | 7/2015 |
| DE | 10 2016 204 936 A1 | 9/2017 |
| DE | 10 2017 214 229 A1 | 2/2018 |
| DE | 10 2018 002 650 A1 | 10/2019 |
| DE | 10 2018 129 759 A1 | 5/2020 |
| DE | 10 2021 100 131 A1 | 7/2021 |
| DE | 10 2021 118 072 A1 | 2/2022 |
| EP | 1 995 482 A1 | 11/2008 |
| EP | 3 678 074 A1 | 7/2020 |
| ES | 2897461 T3 | 3/2022 |
| FR | 2932556 A1 | 12/2009 |
| FR | 3082298 A1 | 12/2019 |
| JP | H11-266507 A | 9/1999 |
| JP | 2000-224710 A | 8/2000 |
| JP | 2007-022309 A | 2/2007 |
| JP | 2012-065521 A | 3/2012 |
| JP | 2012-232714 A | 11/2012 |
| JP | 2015-071413 A | 4/2015 |
| JP | 2020-055417 A | 4/2020 |
| KR | 20090062320 A | 6/2009 |
| WO | WO-2005/071819 A1 | 4/2004 |
| WO | WO-2012/139224 A1 | 10/2012 |
| WO | WO-2019/116589 A1 | 6/2019 |
| WO | WO-2020/097885 A1 | 5/2020 |
| WO | WO-2022/132807 A1 | 6/2022 |

\* cited by examiner

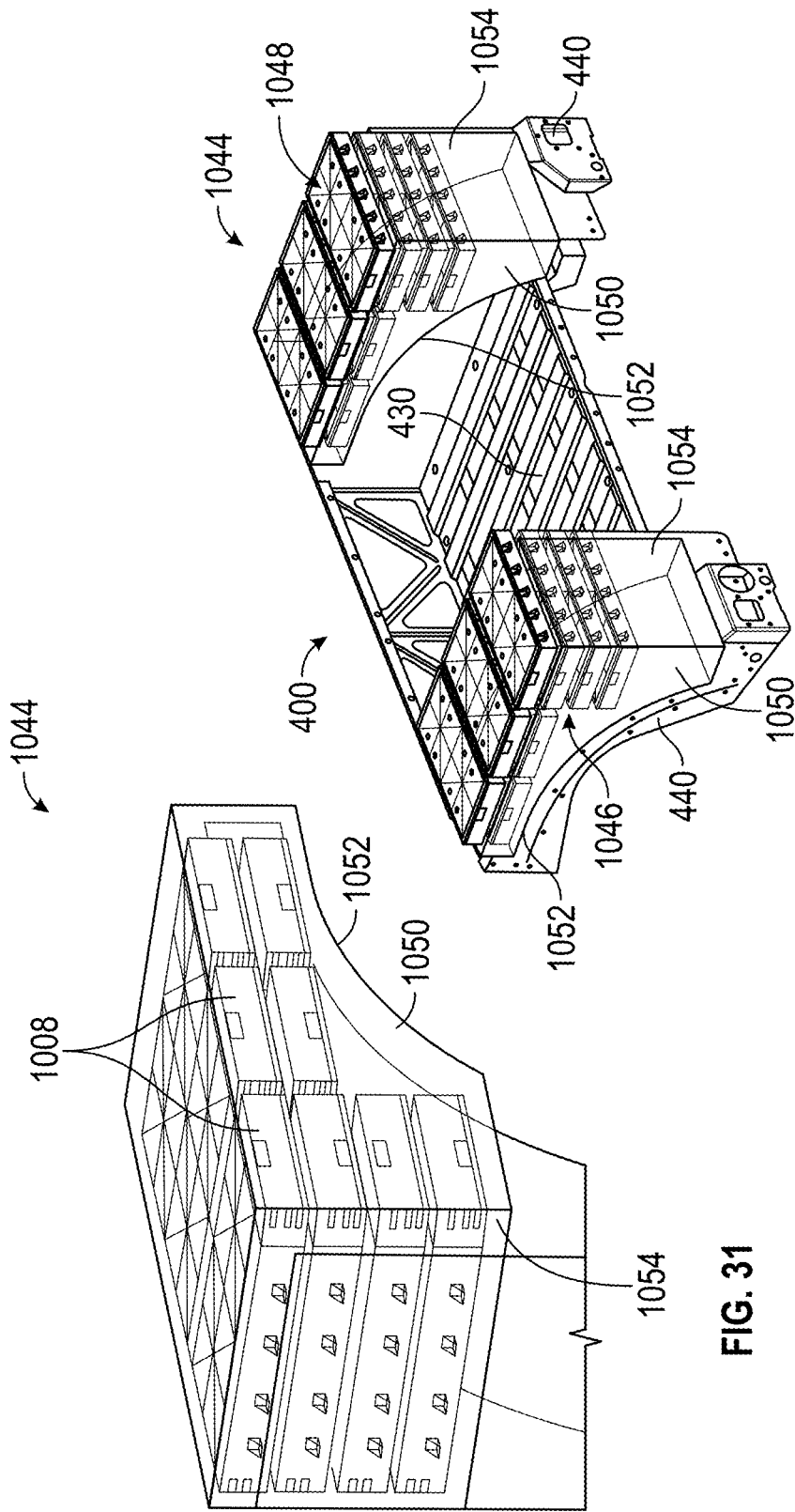

MILITARY VEHICLE WITH CONTROL MODES

CROSS-REFERENCE TO RELATED PATENT APPLICATIONS

This application is a continuation of U.S. application Ser. No. 17/886,615, filed Aug. 12, 2022, now U.S. Pat. No. 12,060,053, which claims the benefit of and priority to (a) U.S. Provisional Patent Application No. 63/233,008, filed Aug. 13, 2021, and (b) U.S. Provisional Patent Application No. 63/344,123, filed May 20, 2022, all of which are incorporated herein by reference in their entireties.

BACKGROUND

Traditionally, military vehicles have been powered by internal combustion engines. However, such internal combustion engines and related systems can produce a significant amount of noise. Under certain circumstances, such as when in enemy territory and trying to remain discreet and unidentified, it may be advantageous to drive military vehicles and their associated subsystems with the engine off to mitigate the amount of noise being produced by the military vehicles, something that current military vehicles cannot provide.

SUMMARY

One embodiment relates to a military vehicle including a frame, multiple axle assemblies, an internal combustion engine, an electric motor, and processing circuitry. The axle assemblies are coupled with the frame. The axle assemblies are configured to be driven to transport the military vehicle. The internal combustion engine is configured to drive the axle assemblies. The electric motor is configured to drive the axle assemblies. The processing circuitry is configured to operate the military vehicle according to multiple modes by generating control signals for the internal combustion engine and the electric motor and providing the control signals to the internal combustion engine and the electric motor. The modes include an environmentally reactive control mode. In the environmentally reactive mode, the processing circuitry is configured to obtain a sound level of environmental noise of the vehicle, and limit activation of the internal combustion engine based on a comparison between the sound level of the environmental noise and a known sound level of activating or operating the internal combustion engine.

In some embodiments, the military vehicle further includes a weaponry status mode. In the weaponry status mode, the processing circuitry is configured to start the internal combustion engine in response to operation of weaponry of the vehicle.

In some embodiments, the military vehicle further includes an escape mode. In the escape mode, the processing circuitry is configured to operate an actuator to physically decouple one or more items from the military vehicle to reduce weight of the military vehicle, and operate both the internal combustion engine and the electric motor to transport the military vehicle at a maximum possible speed of the military vehicle.

In some embodiments, the military vehicle further includes a convoy mode. In the convoy mode, the processing circuitry is configured to communicate with processing circuitry of other military vehicles to form a convoy chain including multiple military vehicles coupled with each other in series. The processing circuitry is also configured to operate an electrical energy storage system of the military vehicle to exchange electrical energy between the military vehicle and the other military vehicles.

In some embodiments, the processing circuitry uses separate shift profiles for a transmission of the military vehicle when operating in an internal combustion engine-only mode and an electric motor-only mode. In some embodiments, the military vehicle includes a boost mode. In the boost mode, the processing circuitry is configured to operate the electric motor to provide a maximum amount of torque for a period of time and operate a display screen to provide a boost indicator to an operator of the military vehicle.

In some embodiments, the military vehicle further includes an economy mode. In the economy mode, the processing circuitry is configured to quantify an amount of fuel or electrical energy consumed by the internal combustion engine and the electric motor, and modulate activation of the internal combustion engine and the electric motor to minimize a cumulative energy consumption of the internal combustion engine and the electric motor.

In some embodiments, the military vehicle further includes a summon mode. In the summon mode, the processing circuitry is configured to receive a summon request from a requesting device and autonomously control the vehicle to transport to a location of the summon request.

In some embodiments, the military vehicle further includes an optimized idle control mode. In the optimized idle control mode, the processing circuitry is configured to shut off the internal combustion engine in response to the military vehicle coming to a stop or in response to a parking brake of the military vehicle being activated.

In some embodiments, the military vehicle further includes a transmission control mode. In the transmission control mode, the processing circuitry is configured to shift a transmission of the military vehicle into a highest available gear when transitioning between an electric vehicle mode and an internal combustion engine mode.

In some embodiments, the military vehicle further includes a supplemental electric vehicle mode. In the supplemental electric vehicle mode, the electric motor always operates to provide torque to the axle assemblies to supplement torque provided to the axle assemblies by the internal combustion engine.

Another embodiment is a military vehicle including a frame, multiple axle assemblies, an internal combustion engine, an electric motor, and processing circuitry. The multiple axle assemblies are coupled with the frame and are configured to be driven to transport the military vehicle. The internal combustion engine is configured to drive the axle assemblies. The electric motor is configured to drive the axle assemblies. The processing circuitry is configured to operate the military vehicle according to multiple modes by generating control signals for the internal combustion engine and the electric motor and providing the control signals to the internal combustion engine and the electric motor. The modes include an environmentally reactive control mode, a weaponry status mode, an escape mode, and a convoy mode. In the environmentally reactive mode, the processing circuitry is configured to obtain a sound level of environmental noise of the vehicle, and limit activation of the internal combustion engine based on a comparison between the sound level of the environmental noise and a known sound level of activating or operating the internal combustion engine. In the weaponry status mode, the processing circuitry is configured to start the internal combustion engine in response to operation of weaponry of the vehicle. In the escape mode, the processing circuitry is configured to operate an actuator to physically decouple one or more items from the military vehicle to reduce weight of the military vehicle, and operate both the internal combustion engine and the electric motor to transport the military vehicle at a maximum possible speed of the military vehicle. In the convoy mode, the processing circuitry is configured to communicate with processing circuitry of other military vehicles to form a convoy chain including multiple military vehicles coupled with each other in series. The processing circuitry is also configured to operate an electrical energy storage system of the military vehicle to exchange electrical energy between the military vehicle and the other military vehicles.

In some embodiments, the processing circuitry uses separate shift profiles for a transmission of the military vehicle when operating in an internal combustion engine-only mode and an electric motor-only mode. In some embodiments, the military vehicle further includes a boost mode. In the boost mode, the processing circuitry is configured to operate the electric motor to provide a maximum amount of torque for a period of time and operate a display screen to provide a boost indicator to an operator of the military vehicle.

In some embodiments, the military vehicle further includes an economy mode. In the economy mode, the processing circuitry is configured to quantify an amount of fuel or electrical energy consumed by the internal combustion engine and the electric motor, and modulate activation of the internal combustion engine and the electric motor to minimize a cumulative energy consumption of the internal combustion engine and the electric motor.

In some embodiments, the military vehicle further includes a summon mode. In the summon mode, the processing circuitry is configured to receive a summon request from a requesting device and autonomously control the vehicle to transport to a location of the summon request.

In some embodiments, the military vehicle further includes an optimized idle control mode. In the optimized idle control mode, the processing circuitry is configured to shut off the internal combustion engine in response to the military vehicle coming to a stop or in response to a parking brake of the military vehicle being activated.

In some embodiments, the military vehicle further includes a transmission control mode. In the transmission control mode, the processing circuitry is configured to shift a transmission of the military vehicle into a highest available gear when transitioning between an electric vehicle mode and an internal combustion engine mode.

In some embodiments, the military vehicle further includes a supplemental electric vehicle mode. In the supplemental electric vehicle mode, the electric motor always operates to provide torque to the axle assemblies to supplement torque provided to the axle assemblies by the internal combustion engine.

Another embodiment is a military vehicle including a frame, multiple axle assemblies, an internal combustion engine, an electric motor, and processing circuitry. The multiple axle assemblies are coupled with the frame and are configured to be driven to transport the military vehicle. The internal combustion engine is configured to drive the axle assemblies. The electric motor is configured to drive the axle assemblies. The processing circuitry is configured to operate the military vehicle according to multiple modes by generating control signals for the internal combustion engine and the electric motor and providing the control signals to the internal combustion engine and the electric motor. The multiple modes includes an environmentally reactive control mode, a weaponry status mode, an escape mode, a convoy mode, a boost mode, an economy mode, a summon mode, an optimized idle control mode, a transmission control mode, and a supplemental electric vehicle mode. In the environmentally reactive mode, the processing circuitry is configured to obtain a sound level of environmental noise of the vehicle, and limit activation of the internal combustion engine based on a comparison between the sound level of the environmental noise and a known sound level of activating or operating the internal combustion engine. In the weaponry status mode, the processing circuitry is configured to start the internal combustion engine in response to operation of weaponry of the vehicle. In the escape mode, the processing circuitry is configured to operate an actuator to physically decouple one or more items from the military vehicle to reduce weight of the military vehicle, and operate both the internal combustion engine and the electric motor to transport the military vehicle at a maximum possible speed of the military vehicle. In the convoy mode, the processing circuitry is configured to communicate with processing circuitry of other military vehicles to form a convoy chain including multiple military vehicles coupled with each other in series. The processing circuitry is also configured to operate an electrical energy storage system of the military vehicle to exchange electrical energy between the military vehicle and the other military vehicles. In the boost mode, the processing circuitry is configured to operate the electric motor to provide a maximum amount of torque for a period of time and operate a display screen to provide a boost indicator to an operator of the military vehicle. In the economy mode, the processing circuitry is configured to quantify an amount of fuel or electrical energy consumed by the internal combustion engine and the electric motor, and modulate activation of the internal combustion engine and the electric motor to minimize a cumulative energy consumption of the internal combustion engine and the electric motor. In the summon mode, the processing circuitry is configured to receive a summon request from a requesting device and autonomously control the vehicle to transport to a location of the summon request. In the optimized idle control mode, the processing circuitry is configured to shut off the internal combustion engine in response to the military vehicle coming to a stop or in response to a parking brake of the military vehicle being activated. In the transmission control mode, the processing circuitry is configured to shift a transmission of the military vehicle into a highest available gear when transitioning between an electric vehicle mode and an internal combustion engine mode. In the supplemental electric vehicle mode, the electric motor always operates to provide torque to the axle assemblies to supplement torque provided to the axle assemblies by the internal combustion engine. The processing circuitry uses separate shift profiles for a transmission of the military vehicle when operating in an internal combustion engine-only mode and an electric motor-only mode.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIGS. 31 and 32 are various views of a portion of the vehicle of FIG. 1 including the ESS of FIG. 24, according to another exemplary embodiment.

DETAILED DESCRIPTION

Figure 1:
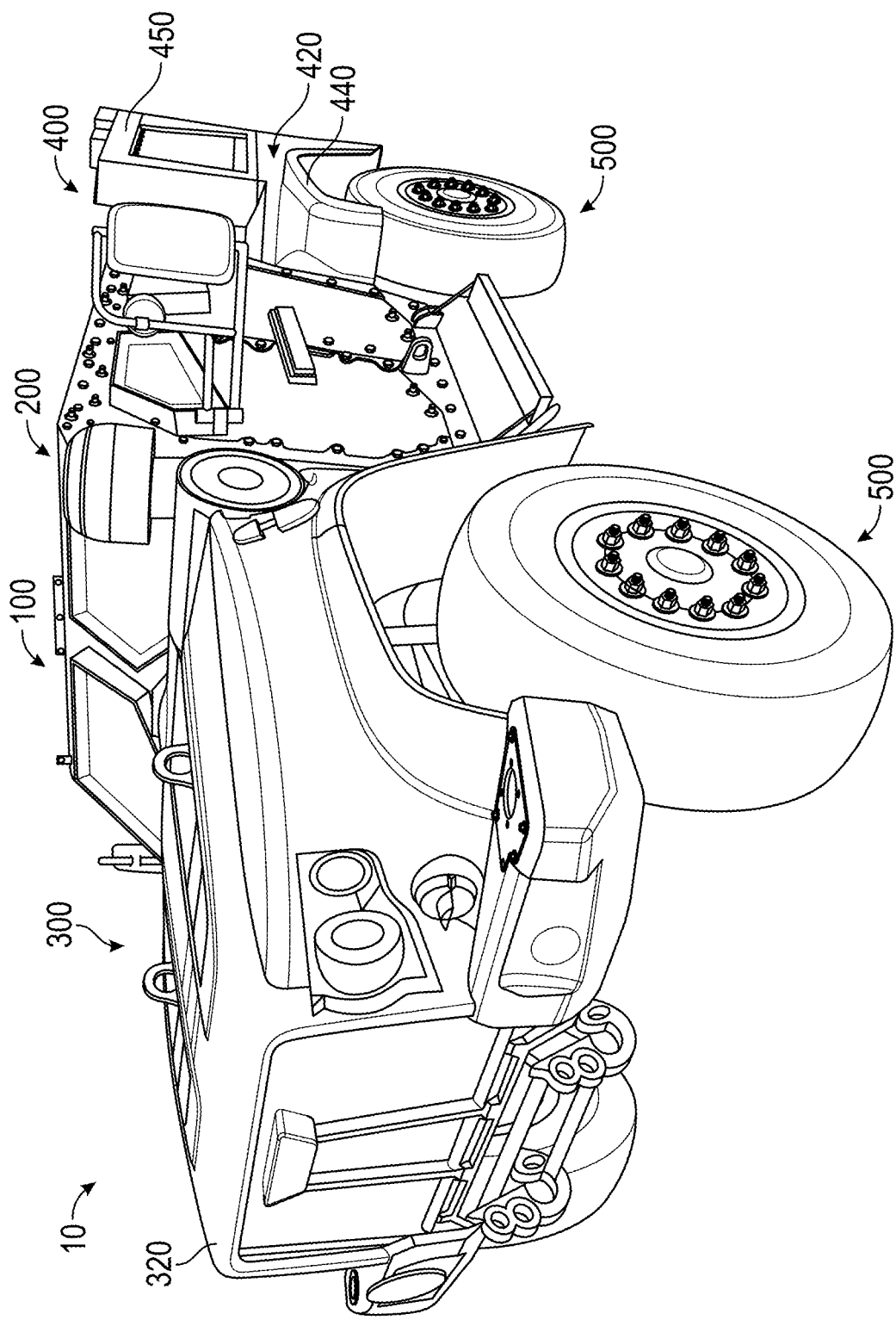
FIG. 1 is a front perspective view of a vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle of the present disclosure (e.g., a military vehicle, etc.) includes an electrified driveline. Specifically, the vehicle includes (i) a first driver including an internal combustion engine and (ii) a second driver including a motor/generator and a clutch. The clutch is positioned between the engine and the motor/generator. The engine can drive the driveline independently, the motor/generator can drive the driveline independently, and/or both the engine and the motor/generator can drive the driveline together. Such an electrified driveline arrangement facilitates operating the vehicle in variety of ways that current military vehicles are incapable of.

According to an exemplary embodiment, the vehicle of the present disclosure includes an engine and a FEAD. The FEAD can include a first belt and a second belt that are coupled with each other through a sprag clutch. The first belt is coupled with multiple accessories, which may include, but is not limited to, a fan, an air compressor, and an electric motor/generator. The second belt is coupled with an output of the engine and the sprag clutch. The sprag clutch is coupled with an additional accessory (e.g., a hydraulic pump). The FEAD is operable between an engine-driven mode and an electric-driven mode (e.g., an electrified mode). When the FEAD is operated in the engine-driven mode, the engine drives the second belt and the first belt (e.g., through the sprag clutch) and the accessories that are coupled with the sprag clutch and the first belt. When the FEAD is operated in the engine-driven mode, the electric motor/generator may be driven to generate electrical energy that can be stored in a battery or consumed by electric accessories of the vehicle. When the FEAD is operated in the electric-driven mode, the electric motor/generator drives the first belt and the accessories coupled with the first belt, and the additional accessory (e.g., the hydraulic pump) coupled with the sprag clutch. In the electric-driven mode, the electric motor/generator consumes electrical energy from the battery, and operates independently of operation of the engine.

In alternative embodiments, the FEAD does not include the electric motor/generator. In one such embodiment, the FEAD may instead be driven solely by the engine and the FEAD only operates according to an engine-driven mode. In another such embodiment, a PTO is positioned at an output of an IMG or a transmission of a driveline of the vehicle, and the PTO can be engaged while the IMG or the transmission drives the PTO. The PTO may transfer torque to the FEAD belt in place of the electric motor/generator to thereby drive the FEAD using an electrically-driven source. In still another such embodiment, one or more accessories, or all of the accessories, of the FEAD include a corresponding electric motor so that each of the accessories of the FEAD having the corresponding electric motor can be independently operated relative to operation of the engine (if included), and relative to operation of each other.

According to an exemplary embodiment, the vehicle of the present disclosure includes an ESS with a large battery capable of providing electric vehicle propulsion. The ESS can be stored behind a cab within a bed cavity, behind a cab outside the bed cavity, above the rear wheel wells, between a floor and a belly deflector, above a floor within the cab, and/or below a false floor above the floor.

According to an exemplary embodiment, the vehicle of the present disclosure includes a control system. The control system includes a controller configured to operate the vehicle according to different modes. The modes include an engine mode, a dual-drive mode, an EV/silent mode, and/or an ultrasilent mode. In the engine mode, an engine of the vehicle drives the FEAD and tractive elements of the vehicle for transportation. In the dual-drive mode, both the engine and an IMG of the vehicle drive the tractive elements of the vehicle for transportation. In the EV/silent mode, the IMG drives the tractive elements of the vehicle for transportation with the engine shut off and an electric motor of the FEAD drives the FEAD. In the ultrasilent mode, the IMG drives the tractive elements of the vehicle for transportation with the engine shut off, the electric motor drives the FEAD, and a fan of the FEAD is disengaged to further reduce sound output of the vehicle during operation.

According to an exemplary embodiment, the vehicle of the present disclosure includes a driveline assembly that can be configured to operate in an (i) engine-only travel mode, (ii) an electric-motor-only travel mode, and/or (iii) a hybrid or dual-drive travel mode where each of the engine and an electric motor can be used to drive the vehicle. The vehicle includes an onboard energy storage system (e.g., a battery) that is configured to supply the electric drive motor with power to drive the vehicle for an extended period of time (e.g., 30 minutes) within the electric-motor-only mode or a "silent mode" or a "stealth mode." The driveline assembly is arranged so that the electric drive motor of the vehicle can be selectively clutched into one or more of a transaxle drive shaft, a transmission shaft, or a transaxle to supply torque to each of a front axle assembly and a rear axle assembly to drive the vehicle. During the silent or stealth mode, the engine can be decoupled from the transmission or the transaxle drive shaft, which allows the vehicle to drive entirely independent of the engine for a period of time. This type of operation can permit the vehicle to perform tasks discretely, which provides a significant advantage to military vehicles that may wish to travel undetected through enemy territory, for example.

Overall Vehicle

Figure 2:
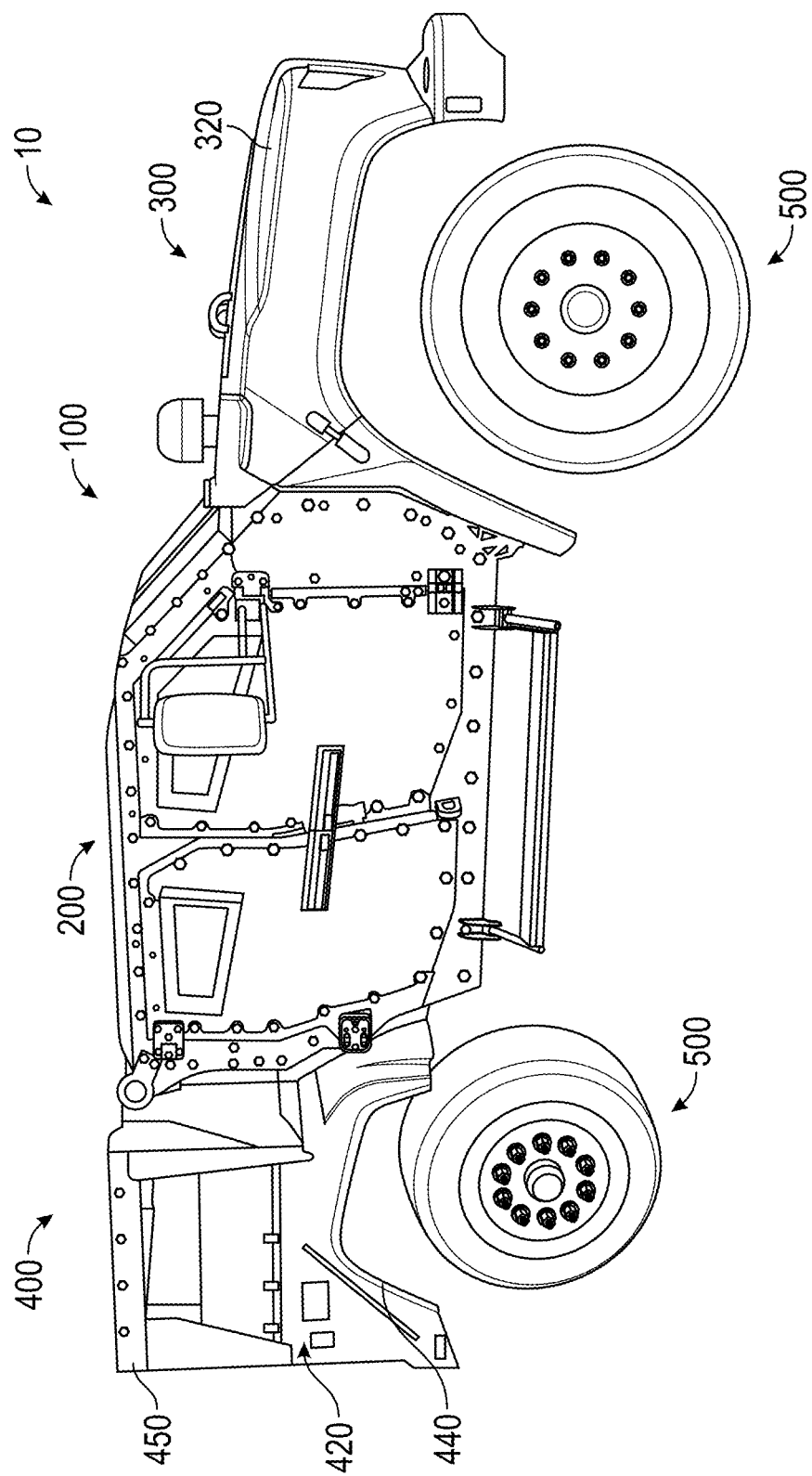
FIG. 2 is a side view of the vehicle of FIG. 1, according to an exemplary embodiment.
Figure 3:
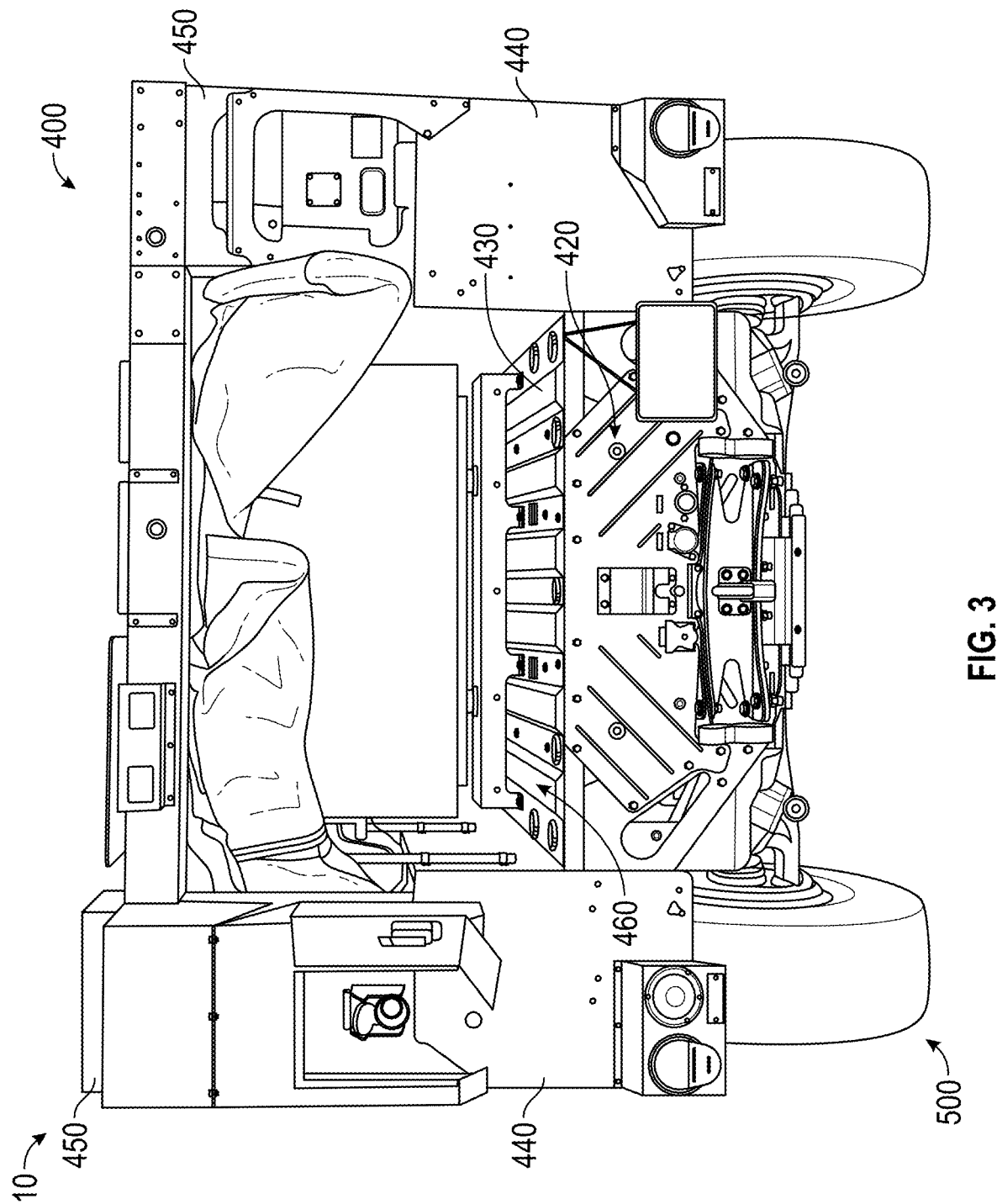
FIG. 3 is a rear view of the vehicle of FIG. 1, according to an exemplary embodiment.

According to the exemplary embodiment shown in FIGS. 1-3, a machine, shown vehicle 10, is configured as a military vehicle. In the embodiment shown, the military vehicle is a joint light tactical vehicle ("JLTV"). In other embodiments, the military vehicle is another type of military vehicle (e.g., a medium tactical vehicle, a heavy tactical vehicle, etc.). In an alternative embodiment, the vehicle 10 is another type of vehicle other than a military vehicle. For example, the vehicle 10 may be a fire apparatus (e.g., a pumper fire truck, a rear-mount aerial ladder truck, a mid-mount aerial ladder truck, a quint fire truck, a tiller fire truck, an airport rescue fire fighting ("ARFF") truck, etc.), a refuse truck, a concrete mixer truck, a tow truck, an ambulance, a farming machine or vehicle, a construction machine or vehicle, and/or still another vehicle.

As shown in FIGS. 1-14, the vehicle 10 includes a chassis assembly, shown as hull and frame assembly 100, including a passenger cabin, shown as passenger capsule 200, a first module, shown as front module 300, a second module, shown as rear module 400; a plurality of axle assemblies (e.g., including axles, differentials, wheels, brakes, suspension components, etc.), shown as axle assemblies 500, coupled to the front module 300 and the rear module 400; and a first electrified driveline arrangement (e.g., a powertrain, a drivetrain, including an accessory drive, etc.), shown as driveline 600.

According to an exemplary embodiment, the passenger capsule 200 provides a robust and consistent level of protection by using overlaps to provide further protection at the door interfaces, component integration seams, and panel joints. The passenger capsule 200 may be manufactured from high hardness steel, commercially available aluminum alloys, ceramic-based SMART armor, and/or other suitable materials to provide a 360-degree modular protection system with two levels of underbody mine/improvised explosive device ("IED") protection. The modular protection system provides protection against kinetic energy projectiles and fragmentation produced by IEDs and overhead artillery fire. The two levels of underbody protection may be made of an aluminum alloy configured to provide an optimum combination of yield strength and material elongation. Each protection level uses an optimized thickness of this aluminum alloy to defeat underbody mine and IED threats.

According to an exemplary embodiment, the passenger capsule 200 is a structural shell that forms a monocoque hull structure. Monocoque refers to a form of vehicle construction in which the vehicle body and chassis form a single unit. In some embodiments, the passenger capsule 200 includes a plurality of integrated armor mounting points configured to engage a supplemental armor kit (e.g., a "B-Kit," etc.). According to the exemplary embodiment shown in FIGS. 1, 2, 4, 5, 9, and 10, the passenger capsule 200 accommodates four passengers in a two-by-two seating arrangement and has four doors mounted thereto. According to the alternative embodiment shown in FIG. 8, the passenger capsule 200 accommodates two passengers and has two doors mounted thereto.

Figure 4:
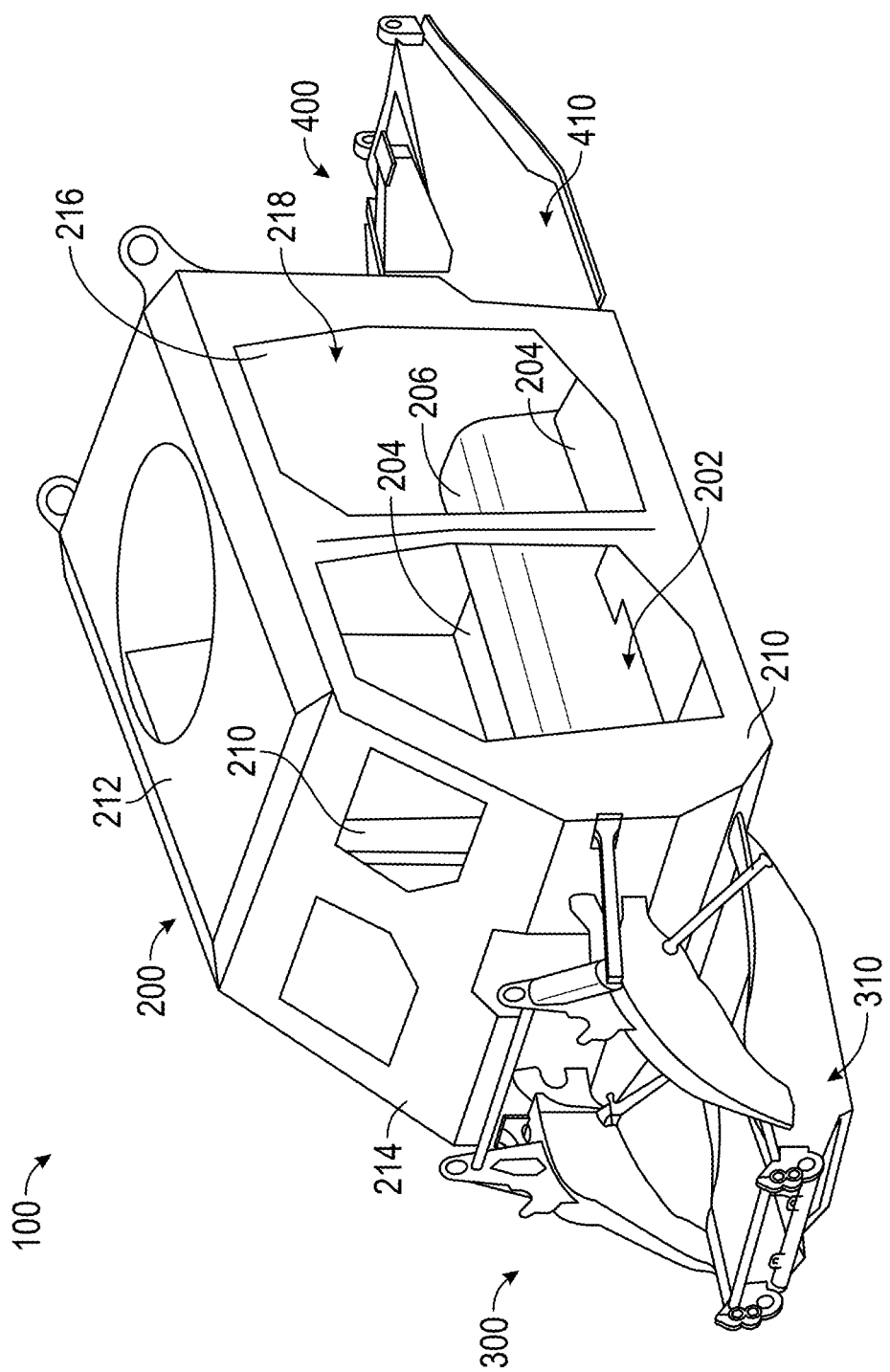
FIG. 4 is a perspective view of a chassis assembly of the vehicle of FIG. 1 including a passenger capsule, a front module, and a rear module, according to an exemplary embodiment.
Figure 5:
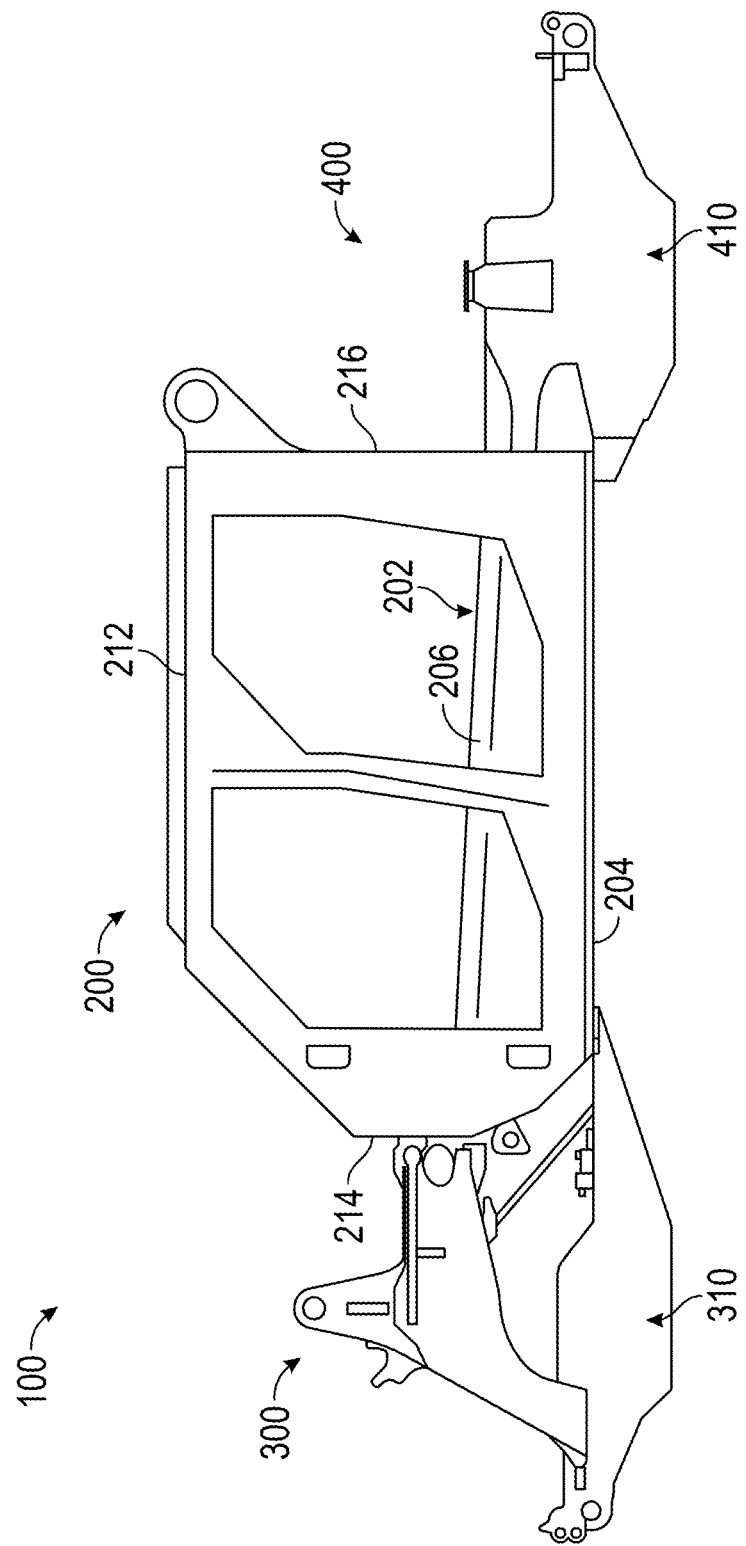
FIG. 5 is a side view of the chassis assembly of FIG. 4, according to an exemplary embodiment.
Figure 6:
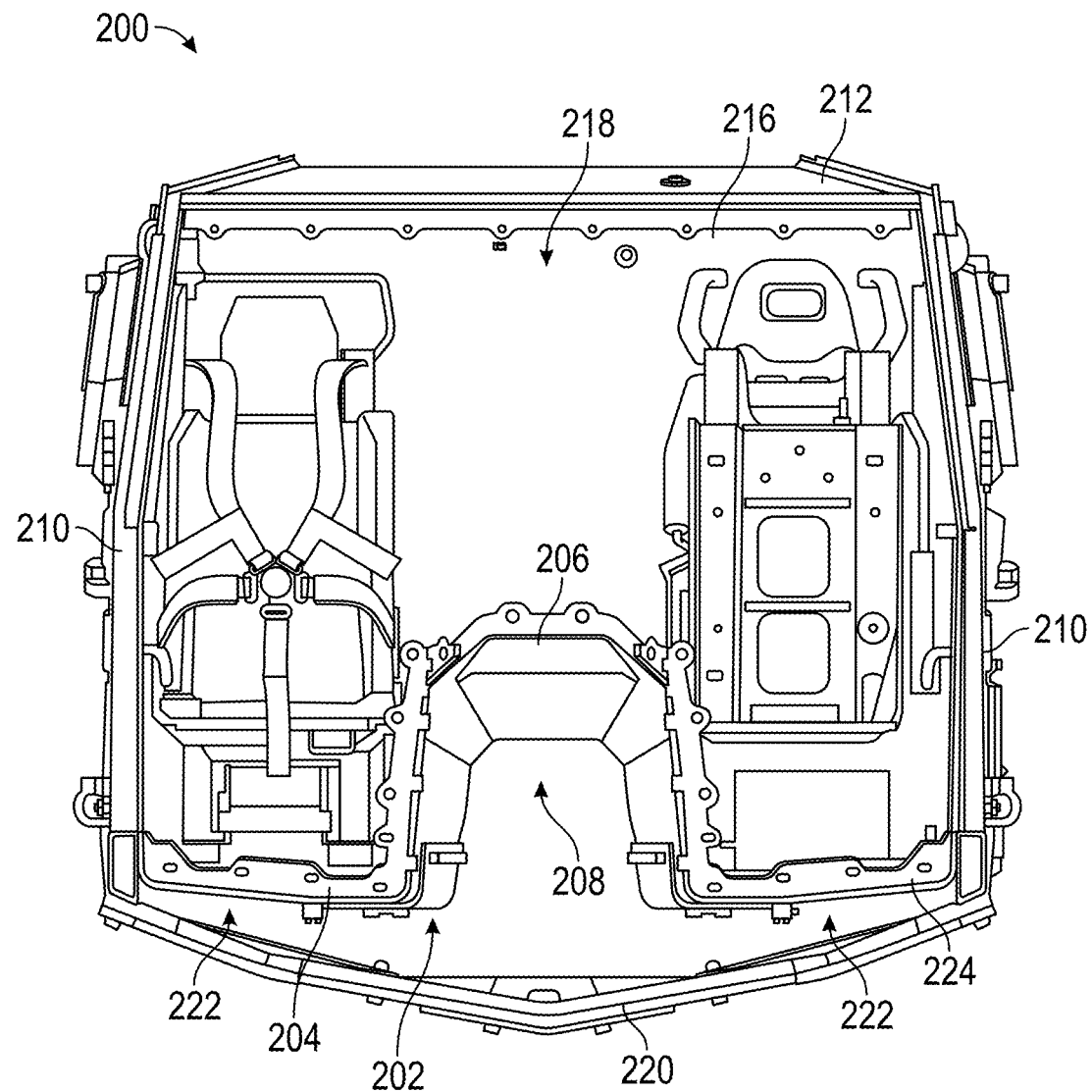
FIG. 6 is a cross-sectional view of the passenger capsule of FIG. 4, according to an exemplary embodiment.

As shown in FIGS. 4-6, the passenger capsule 200 includes a floor assembly, shown as floor assembly 202, having a pair of floor portions, shown as floor portions 204, laterally spaced apart and separated by a central tunnel, shown as structural tunnel 206, extending longitudinally along a centerline of the passenger capsule 200. According to an exemplary embodiment, for load purposes, the structural tunnel 206 replaces a frame or rail traditionally used in vehicle chassis. As shown in FIG. 6, the structural tunnel 206 (i) has an arcuately shaped cross-section that extends upward into an interior, shown as passenger compartment 218, of the passenger capsule 200 and (ii) defines a cavity or recessed space, shown as tunnel slot 208. The configuration of the structural tunnel 206 increases the distance between the ground and the passenger compartment 218 of the passenger capsule 200. Accordingly, the structural tunnel 206 may provide greater blast protection from IEDs located on the ground (e.g., because the IED has to travel a greater distance in order to penetrate the structural tunnel 206).

As shown in FIGS. 4-6, the passenger capsule 200 additionally includes a pair of side panels, shown as sidewalls 210, coupled to opposing lateral sides of the floor assembly 202; a top panel, shown as roof 212, coupled to the sidewalls 210 opposite the floor assembly 202; a front panel, shown as front wall 214, coupled to front ends of the floor assembly 202, the sidewalls 210, and the roof 212; and a rear panel, shown as rear wall 216, coupled to rear ends of the floor assembly 202, the sidewalls 210, and the roof 212. As shown in FIGS. 4 and 6, the floor assembly 202, the sidewalls 210, the roof 212, the front wall 214, and the rear wall 216 cooperatively define the passenger compartment 218.

As shown in FIG. 6, the passenger capsule 200 includes a belly deflector, shown as v-shaped belly deflector 220, coupled to bottom ends of the sidewalls 210 and across the bottom of the passenger capsule 200 beneath the floor assembly 202. According to an exemplary embodiment, the v-shaped belly deflector 220 is configured to mitigate and spread blast forces along the belly of the vehicle 10. As shown in FIG. 6, the v-shaped belly deflector 220 is spaced from the floor assembly 202 such that a space, shown as air gap 222, is formed between the floor portions 204 of the floor assembly 202 and the v-shaped belly deflector 220.

In some embodiments, the floor assembly 202, the sidewalls 210, the roof 212, the front wall 214, the rear wall 216, and the v-shaped belly deflector 220 are fabricated subassemblies that are bolted together to provide the passenger capsule 200. Such a modular approach to the passenger capsule 200 provides increased protection with the application of perimeter, roof, and underbody add on panels. The components of the passenger capsule 200 mitigate and attenuate blast effects, allow for upgrades, and facilitate maintenance and replacements.

As shown in FIGS. 4, 5, 7, 8, and 10, the front module 300 includes a first subframe assembly, shown as front subframe 310, and the rear module 400 includes a second subframe assembly, shown as rear subframe 410. The front subframe 310 includes a first plurality of frame members coupled to the floor assembly 202 and the front wall 214 of the passenger capsule 200 at a first plurality of interfaces. The rear subframe 410 includes a second plurality of frame members coupled to the floor assembly 202 and the rear wall 216 of the passenger capsule 200 at a second plurality of interfaces. Such interfaces may include, for example, a plurality of fasteners (e.g., bolts, rivets, etc.) extending through corresponding pads coupled to the front subframe 310, the rear subframe 410, and the passenger capsule 200. According to an exemplary embodiment, a front axle assembly of the axle assemblies 500 is coupled to the front subframe 310 and a rear axle assembly of the axle assemblies 500 is coupled to the rear subframe 410.

The front subframe 310 and the rear subframe 410 may be manufactured from high strength steels, high strength aluminum, or another suitable material. According to an exemplary embodiment, the front subframe 310 and the rear subframe 410 feature a tabbed, laser cut, bent, and welded design. In other embodiments, the front subframe 310 and the rear subframe 410 are manufactured from tubular members to form a space frame. The front subframe 310 and the rear subframe 410 may also include forged frame sections, rather than fabricated or cast frame sections, to mitigate the stress, strains, and impact loading imparted during operation of the vehicle 10. Aluminum castings may be used for various cross member components where the loading is compatible with such material properties.

The passenger capsule 200, the front subframe 310, and the rear subframe 410 are integrated into the hull and frame assembly 100 to efficiently carry chassis loading imparted during operation of the vehicle 10, during a lift event, during a blast event, or under still other conditions. During a blast event, conventional frame rails can capture the blast force, transferring the blast force into the vehicle 10 and the occupants thereof. The vehicle 10 replaces conventional frame rails and instead includes the passenger capsule 200, the front module 300, and the rear module 400. According to an exemplary embodiment, the passenger capsule 200, the front module 300, and the rear module 400 vent blast gases (e.g., traveling upward after a tire triggers an IED), thereby reducing the blast force on the passenger capsule 200 and the occupants within passenger capsule 200. Traditional frame rails may also directly impact (e.g., contact, engage, hit, etc.) the floor of traditional military vehicles. The hull and frame assembly 100 does not include traditional frame rails extending along a length of the vehicle 10, thereby eliminating the ability for such frame rails to impact the floor assembly 202 of the passenger capsule 200.

Figure 9:
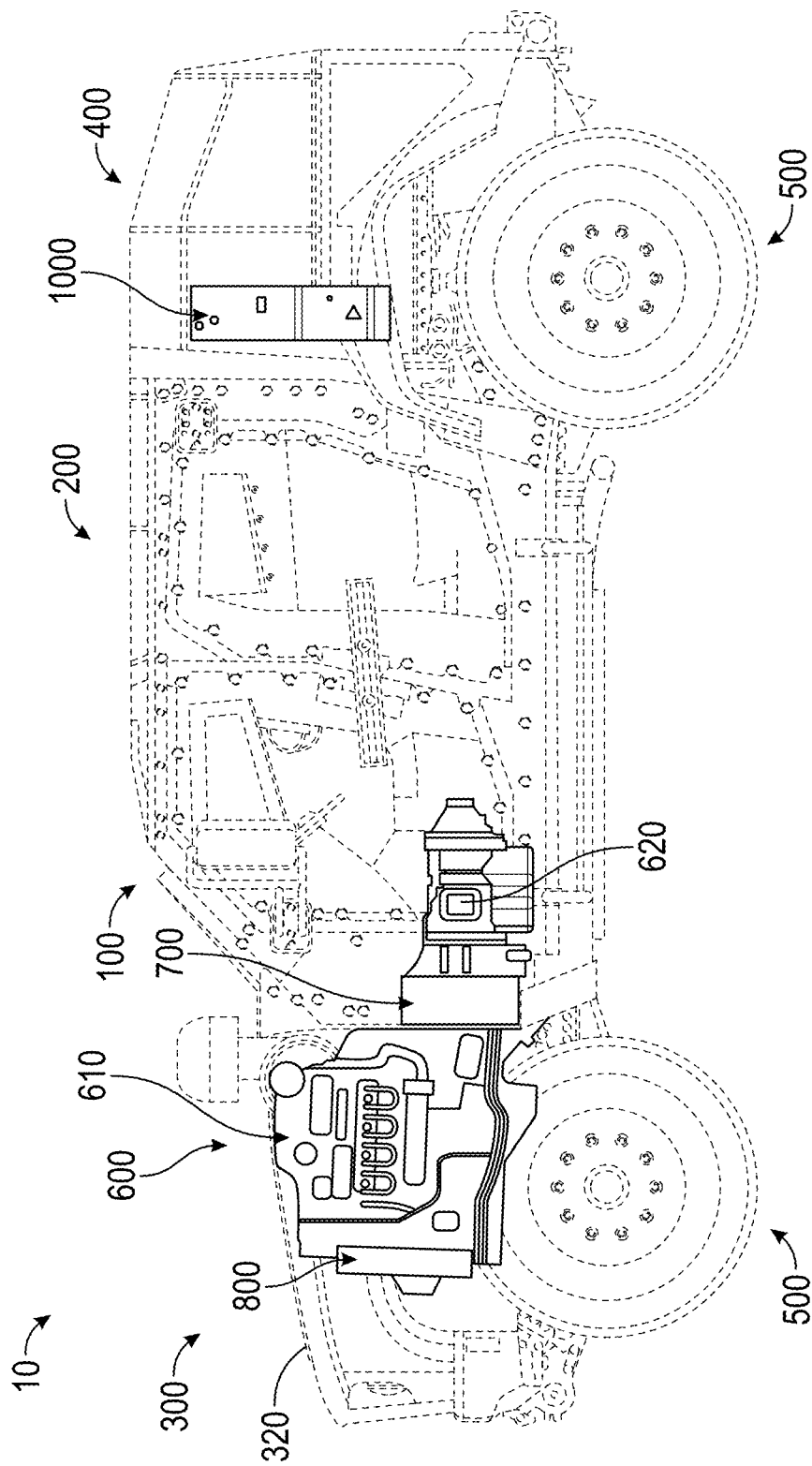
FIG. 9 is a partially transparent side view of the vehicle of FIG. 1 having a driveline including an engine, an integrated motor/generator ("IMG"), a transmission, an energy storage system ("ESS"), and a front-end accessory drive ("FEAD"), according to an exemplary embodiment.

As shown in FIGS. 1, 2, and 9, the front module 300 includes a body panel, shown as hood 320, supported by the front subframe 310. As shown in FIG. 9, the hood 320 partially surrounds components of the driveline 600 (e.g., an engine, a FEAD, radiators, etc.) of the vehicle 10. The hood 320 may be manufactured from a composite material (e.g., carbon fiber, fiberglass, a combination of fiberglass and carbon fiber, etc.) or a metal material (e.g., steel, aluminum, etc.). The hood 320 may be configured (e.g., shaped, etc.) to maximize vision while clearing under-hood components.

As shown in FIGS. 1-3, the rear module 400 includes a body assembly, shown as cargo body assembly 420, supported by the rear subframe 410. The cargo body assembly 420 includes a deck, shown as bed 430; a pair of wheel wells, shown as wheel wells 440, positioned along opposing lateral sides of the bed 430 and over the wheels of the rear axle assembly of the axle assemblies 500; and a pair of storage compartments, shown as stowage boxes 450, positioned along and on top of the wheel wells 440. As shown in FIG. 3, the bed 430, the wheel wells 440, and the stowage boxes 450 cooperatively define a compartment, shown as bed cavity 460.

Figure 7:
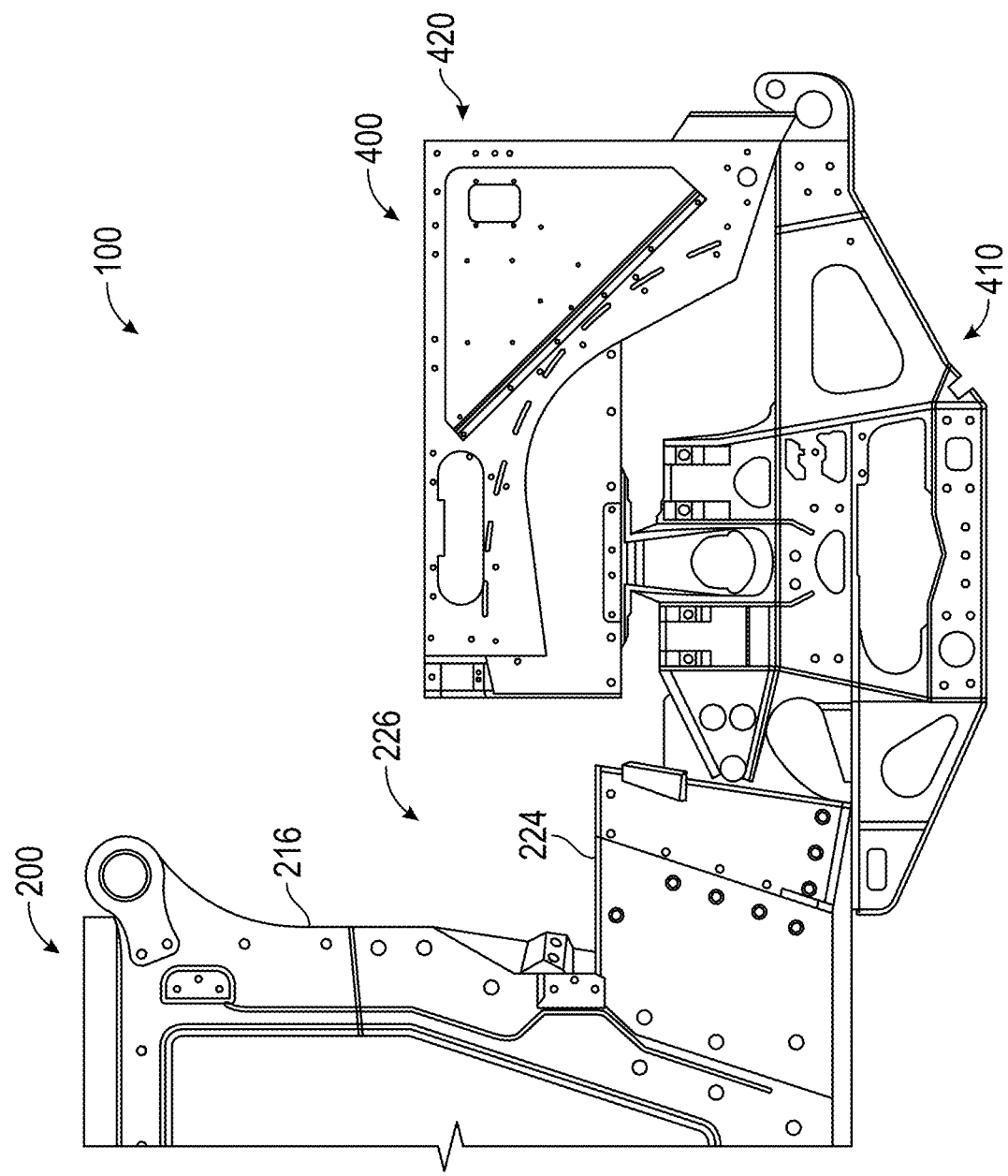
FIG. 7 is a detailed side view of a chassis assembly of the vehicle of FIG. 1, according to another exemplary embodiment.
Figure 8:
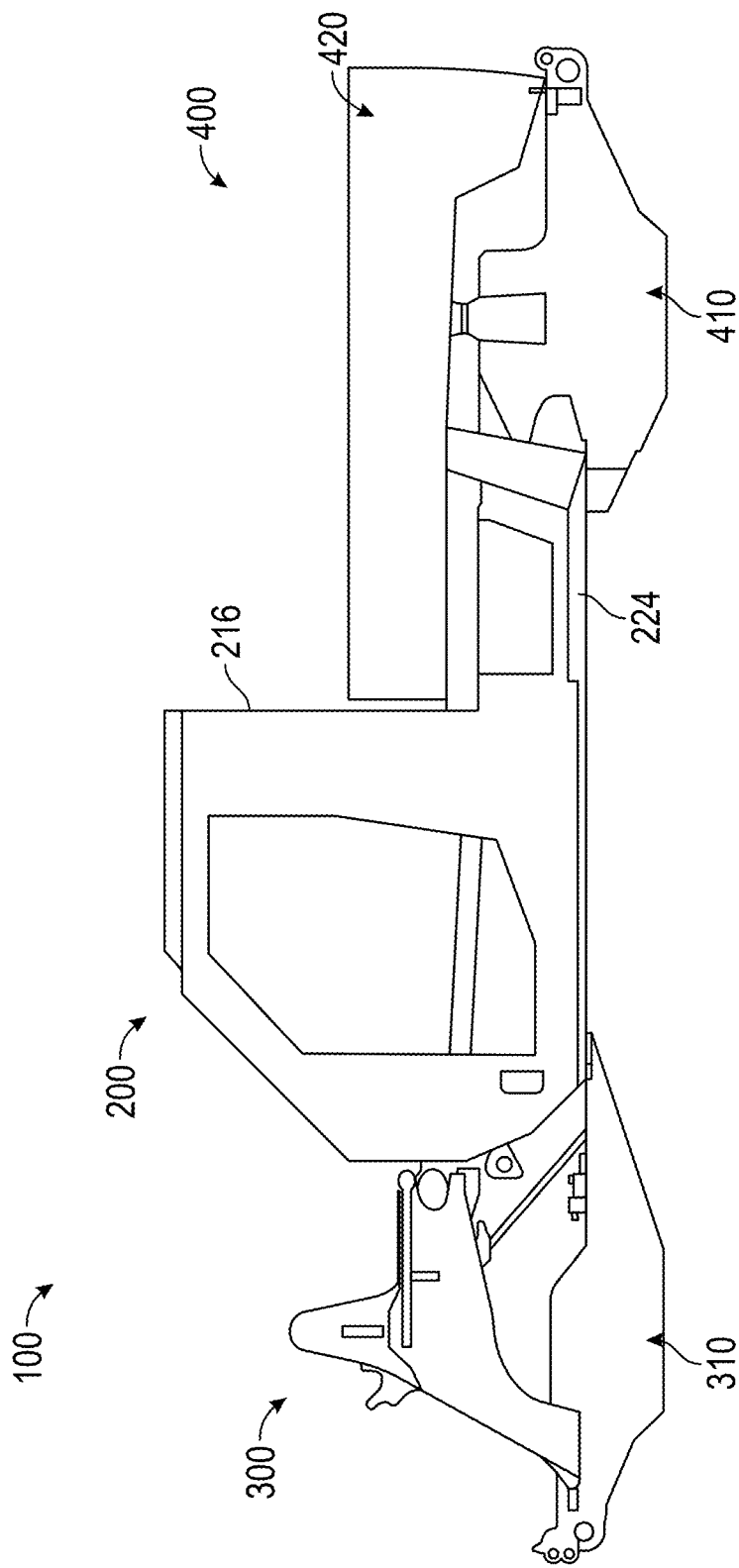
FIG. 8 is a side view of a chassis assembly of the vehicle of FIG. 1, according to another exemplary embodiment.

In some embodiment, as shown in FIG. 7, the passenger capsule 200 includes a protrusion, shown as capsule extension 224, extending from a bottom portion of the rear wall 216 of the passenger capsule 200. According to an exemplary embodiment, the capsule extension 224 provides an extended wheelbase for the vehicle 10, which facilitates providing a cavity, shown as gap 226, between the rear wall 216 and the cargo body assembly 420 of the rear module 400. In some embodiments, as shown in FIG. 8, the capsule extension 224 replaces a rear portion (e.g., back seats, etc.) of the passenger capsule 200 and supports an extended cargo body assembly 420 (e.g., eliminating the gap 226 of FIG. 7 or maintaining the gap 226 of FIG. 7).

Driveline

As shown in FIGS. 9-36, the driveline 600 includes a first driver, shown as engine 610; a transmission device, shown as transmission 620; a first drive shaft, shown transaxle drive shaft 630, coupled to the transmission 620; a power splitter, shown as transaxle 640, coupled to the transaxle drive shaft 630 and the rear axle assembly 500; a second drive shaft, shown as front axle drive shaft 650, extending between the transaxle 640 and the front axle assembly 500 (e.g., a front differential thereof); a second driver, shown as IMG 700, positioned between the engine 610 and the transmission 620; an accessory drive assembly, shown as FEAD 800, positioned in front of the engine 610; and an on-board ESS, shown as ESS 1000.

Figure 10:
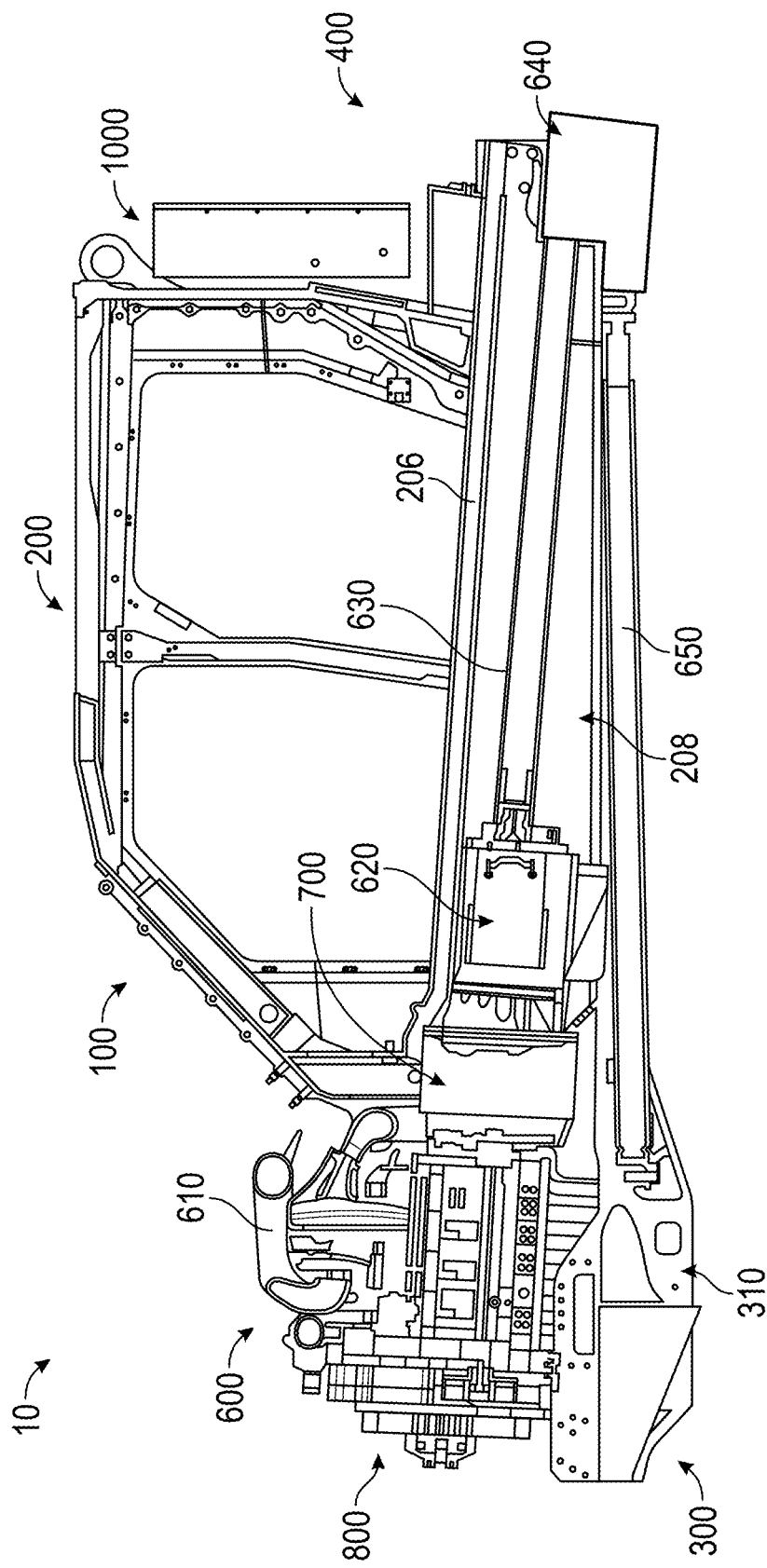
FIG. 10 is a cross-sectional side view of the driveline of FIG. 9 including the engine, the IMG, the transmission, the ESS, the FEAD, and a transaxle, according to an exemplary embodiment.
Figure 11:
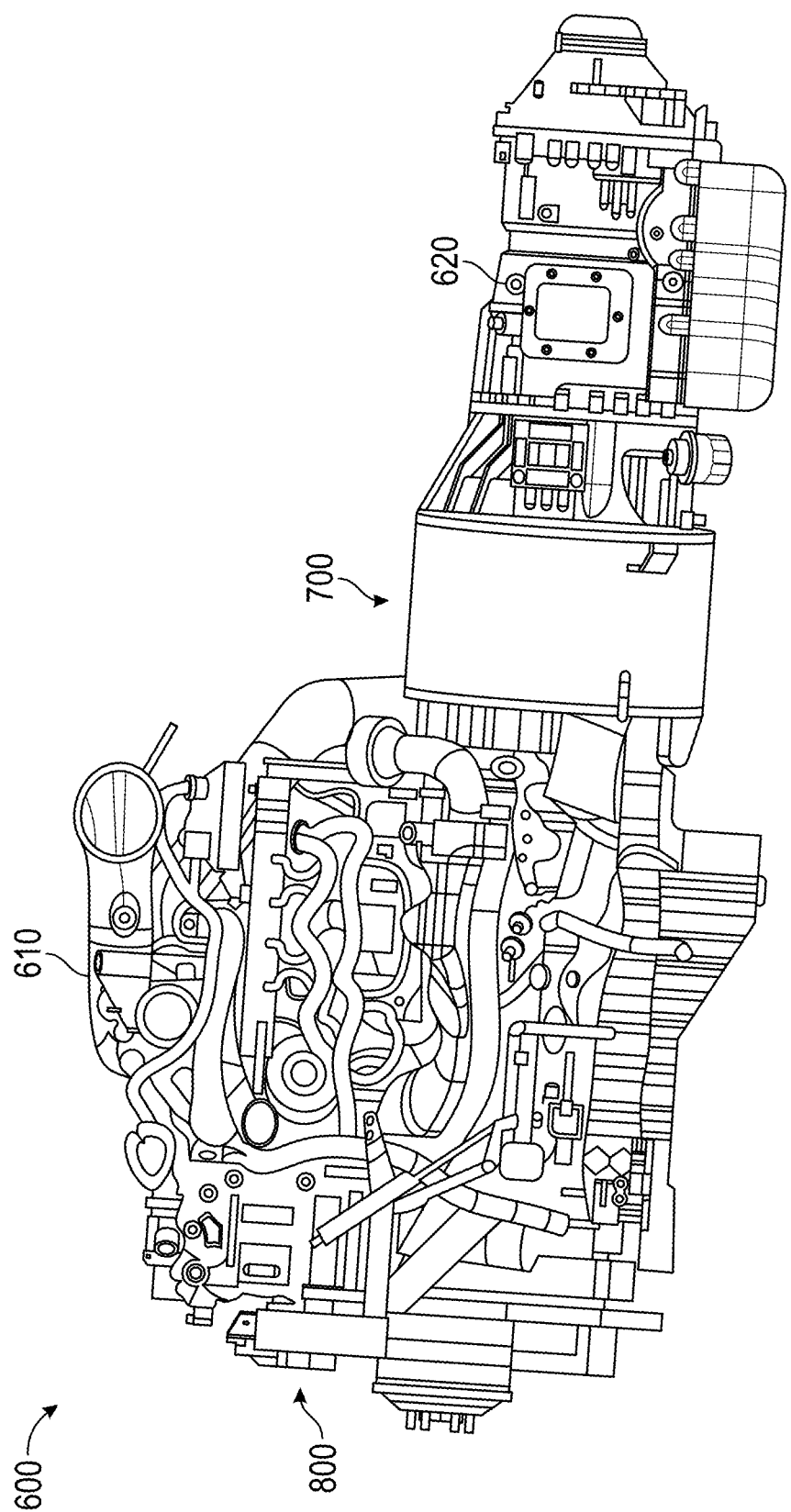
FIG. 11 is a detailed side view of the engine, the IMG, the transmission, and the FEAD of the driveline of FIG. 9, according to an exemplary embodiment.

As shown in FIGS. 9 and 10, the engine 610 and the FEAD 800 are positioned within the front module 300 and supported by the front subframe 310. The FEAD 800 may include an independent FEAD motor (e.g., motor/generator 822) and various belt driven-accessories and/or electrically-operated accessories (e.g., a fan, a hydraulic pump, an air compressor, an air conditioning ("A/C") compressor, etc.). As shown in FIG. 10, the IMG 700 and the transmission 620 are positioned beneath the passenger capsule 200 within the tunnel slot 208 of the structural tunnel 206. The transaxle drive shaft 630 extends from the transmission 620 longitudinally along the structural tunnel 206 and within tunnel slot 208 to the transaxle 640. According to an exemplary embodiment, the transaxle 640 is positioned within the rear module 400 and supported by the rear subframe 410. As shown in FIG. 10, the front axle drive shaft 650 is positioned beneath the transaxle drive shaft 630 and outside of the tunnel slot 208 (e.g., between the transaxle drive shaft 630 and the v-shaped belly deflector 220).

According to various embodiments, the engine 610 is individually, the IMG 700 is individually, or both the engine 610 and the IMG 700 are cooperatively configured to provide power to the transmission 620 to drive the transmission 620 and, thereby, drive the transaxle drive shaft 630, the transaxle 640, the rear axle assembly 500, the front axle drive shaft 650, and the front axle assembly 500 to drive the vehicle 10. According to various embodiments, the FEAD 800 is configured to be selectively driven by the engine 610, by the FEAD motor, by the IMG 700, and/or electrically-operated. According to an exemplary embodiment, the ESS 1000 is configured to power various high-voltage components and low-voltage components of the vehicle 10 (e.g., the IMG 700, the FEAD motor, electrified FEAD accessories, cab displays, cab gauges, cab lights, external lights, etc.). According to various embodiments, except for electrical wiring, the components of the ESS 1000 (e.g., battery packs, inverters, power distribution components, power conversion hardware, etc.) are variously positioned about the vehicle 10 (e.g., within the rear module 400, under the passenger capsule 200, etc.), except proximate the engine 610 or within the tunnel slot 208 of the structural tunnel 206. Such positioning facilitates maintaining the components of the ESS 1000 at proper operating temperatures and away from high temperature zones proximate the engine 610 and/or within the tunnel slot 208 of the structural tunnel 206. In some embodiments (e.g., when the FEAD 800 includes the FEAD motor, when the engine 610 drives the FEAD, etc.), the FEAD motor and the IMG 700 are configured to selectively operate as generators to facilitate charging the ESS 1000 using power provided by the engine 610 while the vehicle 10 is stationary or moving.

Engine, Transmission, and Transaxle

According to an exemplary embodiment, the engine 610 is a compression-ignition internal combustion engine that utilizes diesel fuel. In other embodiments, the engine 610 is a spark-ignition engine that utilizes one of a variety of fuel types (e.g., gasoline, compressed natural gas, propane, etc.). The transmission may be a commercially available transmission. The transmission 620 may include a torque converter configured to improve efficiency and decrease heat loads. Lower transmission gear ratios combined with a low range of an integrated rear differential/transfer case provide optimal speed for slower speeds, while higher transmission gear ratios deliver convoy-speed fuel economy and speed on grade. According to an exemplary embodiment, the transmission 620 includes a driver selectable range selection.

The transaxle 640 is designed to reduce the weight of the vehicle 10. The weight of the transaxle 640 is minimized by integrating a transfercase and a rear differential into a single unit, selecting an optimized gear configuration, and/or utilizing high strength structural aluminum housings. By integrating the transfercase and the rear differential into the transaxle 640 (thereby forming a singular unit), the connecting drive shaft and end yokes traditionally utilized to connect the transfercase and the rear differential have been eliminated. An integral neutral and front axle disconnect allows the vehicle 10 to be flat towed or front/rear lift and towed with minimal preparation (i.e., without removing the transaxle drive shaft 630 or the front axle drive shaft 650). Specifically, the transaxle 640 includes an internal mechanical disconnect capability that allows the front axle assembly 500 and/or the rear axle assembly 500 to turn without rotating the transaxle 640 and the transmission 620. A mechanical air solenoid over-ride is easily accessible from the interior and/or exterior of the vehicle 10. Once actuated, no further vehicle preparation is needed. After the recovery operation is complete, the driveline 600 can be re-engaged by returning the air solenoid mechanical over-ride to the original position.

IMG

According to an exemplary embodiment, the IMG 700 is electrically coupled to the ESS 1000, selectively mechanically coupled to the engine 610, and mechanically coupled to the transmission 620. The IMG 700 is configured to be mechanically driven by the engine 610 to selectively generate electricity for storage in the ESS 1000 and/or to power electrical components of the vehicle 10. The IMG 700 is configured to receive electrical power from the ESS 1000 to facilitate driving the transmission 620 and, therefore, the axle assemblies 500 of the vehicle 10. In some embodiments, the IMG 700 is configured to receive electrical power from the ESS 1000 to function as a starter for the engine 610. Such starting capability can be performed while the vehicle 10 is stationary or while the vehicle 10 is moving. In some embodiments, the driveline 600 additionally or alternatively includes a backup or dedicated engine starter.

Figure 12:
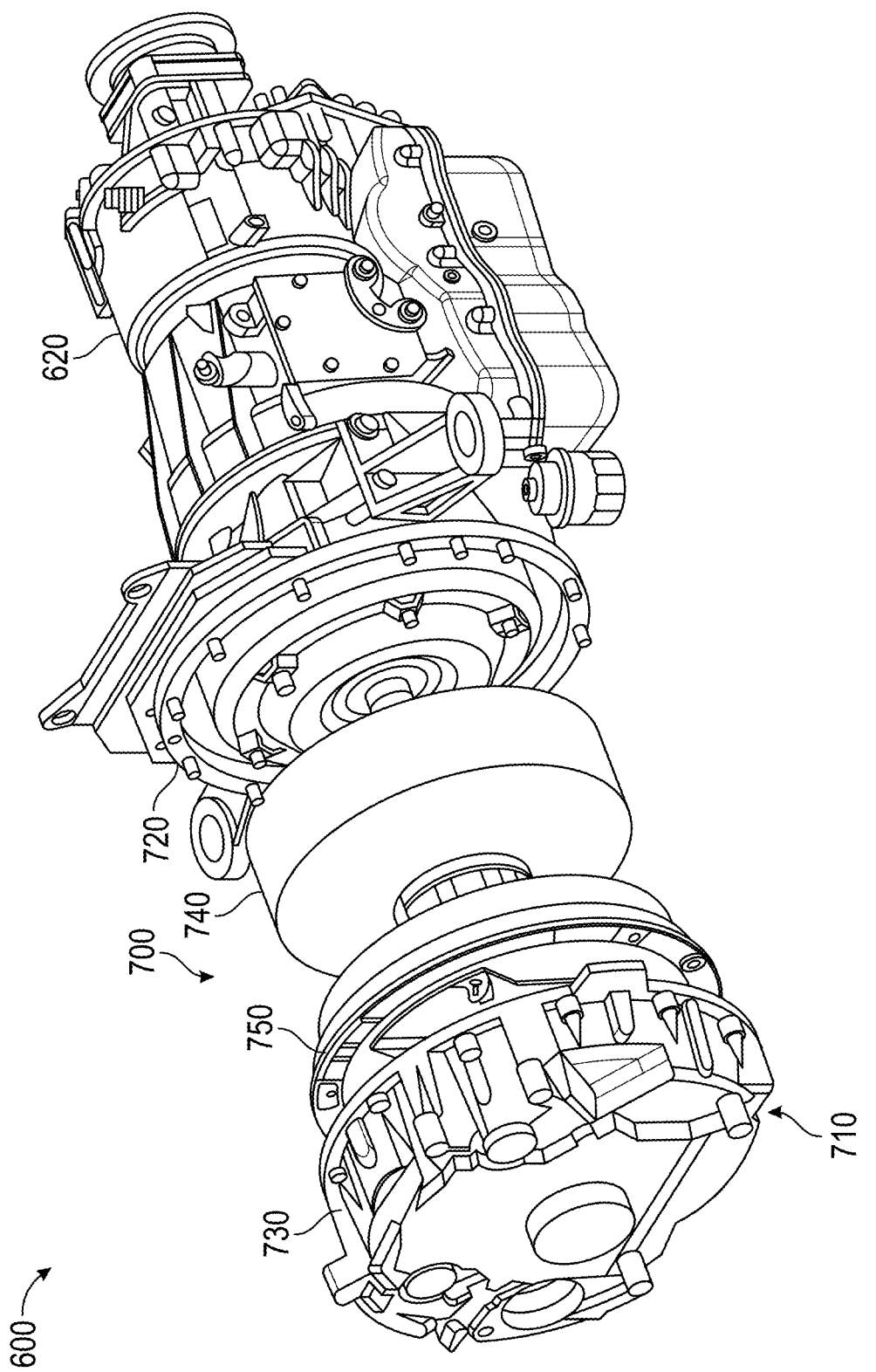
FIG. 12 is an exploded view the IMG and the transmission of the driveline of FIG. 9, according to an exemplary embodiment.
Figure 13:
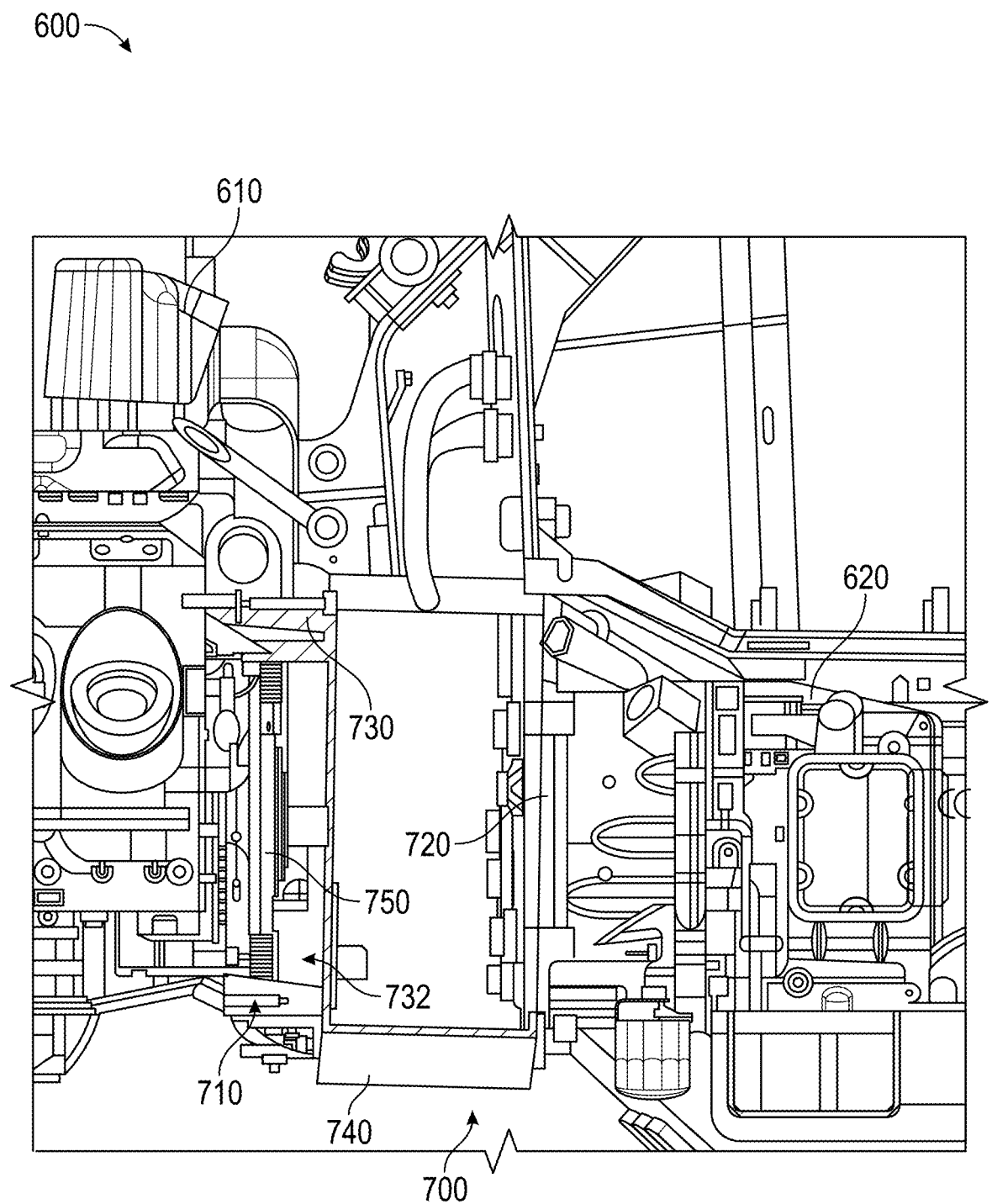
FIG. 13 is a detailed cross-sectional side view of the IMG of the driveline of FIG. 9, according to an exemplary embodiment.
Figure 14:
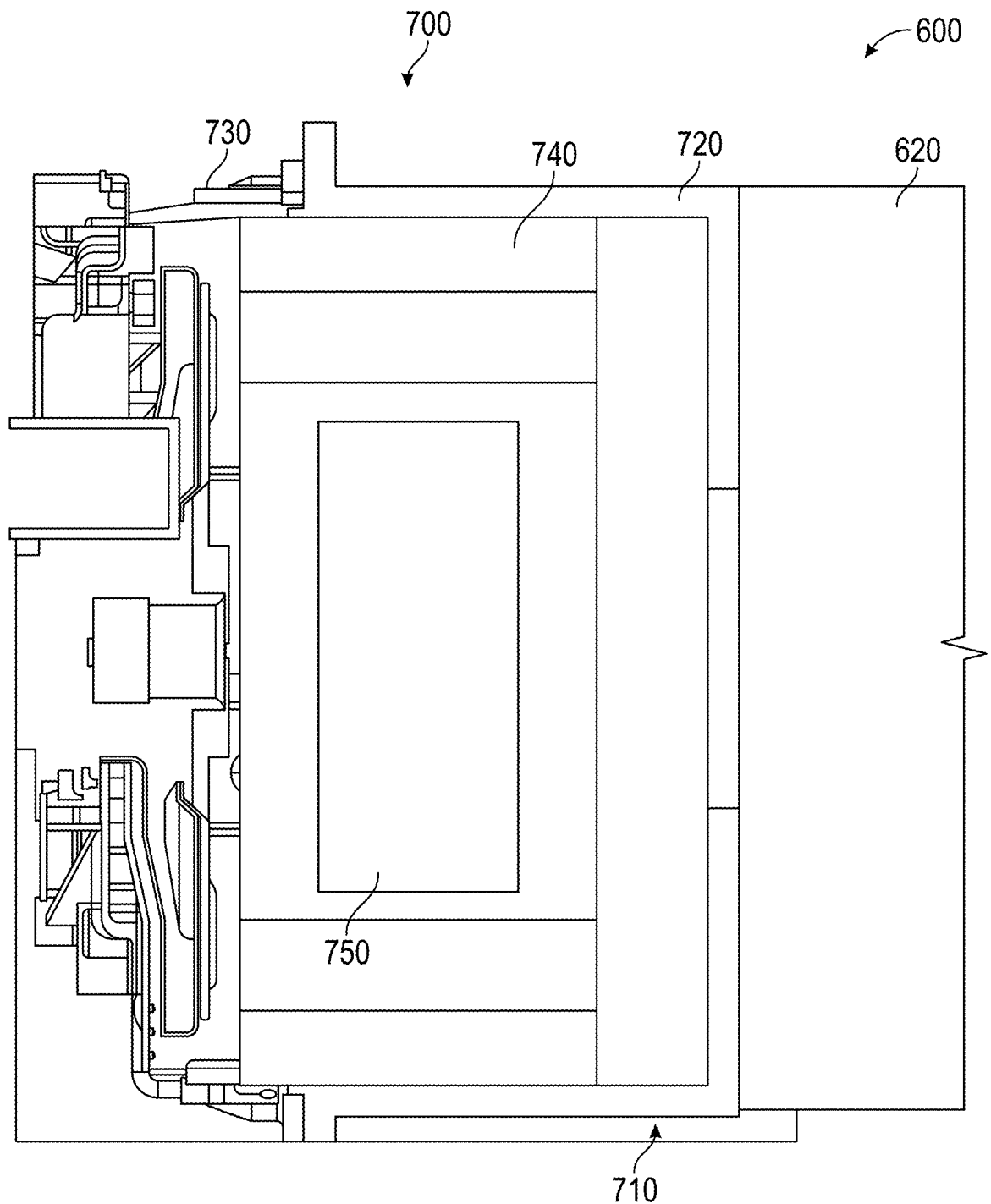
FIG. 14 is a detailed cross-sectional side view of the IMG of the driveline of FIG. 9, according to another exemplary embodiment.

As shown in FIGS. 12-14, the IMG 700 includes a housing, shown as IMG housing 710, including a first portion, shown as backing plate 720, coupled to the transmission 620, and a second portion, shown as engine mount 730, coupled to the engine 610. The IMG 700 further includes an electromagnetic device, shown as motor/generator 740, coupled to the backing plate 720, and a clutch mechanism, shown as engine clutch 750, coupled to the motor/generator 740 and selectively couplable to the engine 610. The motor/generator 740 and the engine clutch 750 are, therefore, positioned between the backing plate 720 and the engine mount 730 and enclosed within the IMG housing 710 (e.g., a single unit).

According to an exemplary embodiment, the engine clutch 750 is controllable (e.g., disengaged, engaged, etc.) to facilitate (i) selectively mechanically coupling the engine 610 and the motor/generator 740 (e.g., to start the engine 610 with the motor/generator 740, to drive the motor/generator 740 with the engine 610 to produce electricity, to drive the motor/generator 740 with the engine 610 to drive the transmission 620, etc.) and (ii) selectively mechanically decoupling the engine 610 and the motor/generator 740 (e.g., to drive the motor/generator 740 with power from the ESS 1000 to drive the transmission 620, the FEAD 800, etc.). In an alternative embodiment, the IMG 700 does not include the engine clutch 750 such that the engine 610 is directly coupled to the motor/generator 740.

As shown in FIGS. 12 and 13, the motor/generator 740 and the engine clutch 750 are arranged in a stacked arrangement with the engine clutch 750 positioned within an interior chamber, shown as cavity 732, of the engine mount 730. As shown in FIG. 14, the motor/generator 740 and the engine clutch 750 are arranged in an integrated arrangement with the engine clutch 750 positioned within an interior chamber, shown as cavity 752, of the motor/generator 740. The integrated arrangement of the motor/generator 740 and the engine clutch 750 facilitates reducing the packaging size of the IMG 700, which facilitates reducing the overall length of the driveline 600.

According to an exemplary embodiment, the engine clutch 750 is a pneumatically-operated clutch that is (i) spring-biased towards engagement with the engine 610 to couple the engine 610 to the other components of the driveline 600 (e.g., the motor/generator 740, the transmission 620, etc.) and (ii) selectively disengaged using compressed air provided from an air compressor (e.g., included in the FEAD 800, air compressor 808, etc.) to decouple the engine 610 from the other components of the driveline 600. Such a spring-biased and air-disengaged clutch ensures that the driveline 600 of the vehicle 10 is operational in the event of damage to the ESS 1000 or if a state-of-charge ("SoC") of the ESS 1000 falls below a minimum SoC threshold (e.g., 20% SoC). As an example, if the engine clutch 750 is disengaged and the motor/generator 740 is driving the vehicle 10, the engine clutch 750 will auto-engage (i) if electrical power is lost due to the ESS 1000 being damaged or the FEAD motor is damaged (which will cause the air compressor of the FEAD 800 to stop providing compressed air to the engine clutch 750) or (ii) if switching to an engine drive mode, which may include stopping the FEAD motor (e.g., in response to the SoC of the ESS 1000 falling below the minimum SoC threshold, which causes the air compressor of the FEAD 800 to stop providing compressed air to the engine clutch 750). In the event of auto-engagement of the engine clutch 750, the engine 610 (if already off) will be started by the inertial forces of the vehicle 10 (if moving), can be started by the motor/generator 740, or can be started by the dedicated engine starter. Such auto-engagement, therefore, ensures that engine 610 is connected to the remainder of the driveline 600 to drive the vehicle 10 in the event of some malfunction in the electrical system or when transitioning from electric drive to engine drive. According to an exemplary embodiment, the components of the driveline 600 do not need to be stopped nor do component speeds need to be matched to switch between engine drive and electric drive.

FEAD

According to an exemplary embodiment, the FEAD 800 is configured to drive (e.g., provide mechanical energy to, provide torque to, provide rotational inertia to, etc.) various accessories of the vehicle 10. As shown in FIGS. 15-17, 19, 22, and 23, the various accessories include a first accessory, shown as air compressor 808, a second accessory, shown as fan 810, a third accessory, shown as motor/generator 822, a fourth accessory, shown as hydraulic pump 832, and a fifth accessory, shown as air conditioning ("A/C") compressor 848. In other embodiments, the FEAD 800 includes additional, fewer, or different accessories. According to an exemplary embodiment, the FEAD 800 is selectively transitionable between different configurations, modes, or states to change a drive source (e.g., to change which of multiple available primary movers, engines, internal combustion engines, electric motors, etc. drive various accessories of the vehicle 10).

E-FEAD

According to the exemplary embodiment shown in FIGS. 15-19, the FEAD 800 is configured as an electrified FEAD ("E-FEAD") having a dual-belt drive arrangement. The FEAD 800 can be selectively driven by either the engine 610 (e.g., in a first mode or state) or the motor/generator 822

(e.g., in a second mode or state). Accordingly, the FEAD 800 and, therefore, the driving of the accessories can be transitioned between an electrified state or mode and an engine-driven state or mode. When the FEAD 800 is in the electrified state or mode, the FEAD 800 can operate independently of operation of the engine 610. For example, when the FEAD 800 is in the electrified state, the FEAD 800 and accessories thereof can operate even when the engine 610 is off or in-operational, thereby operating independently of the engine 610. In another example, when the FEAD 800 is in the electrified state, the FEAD 800 can operate to drive the accessories of the vehicle 10 while the engine 610 operates to drive other driveable elements or systems of the vehicle 10 such as the wheels of the axle assemblies 500, thereby operating independently and simultaneously with operation of the engine 610.

Figure 15:
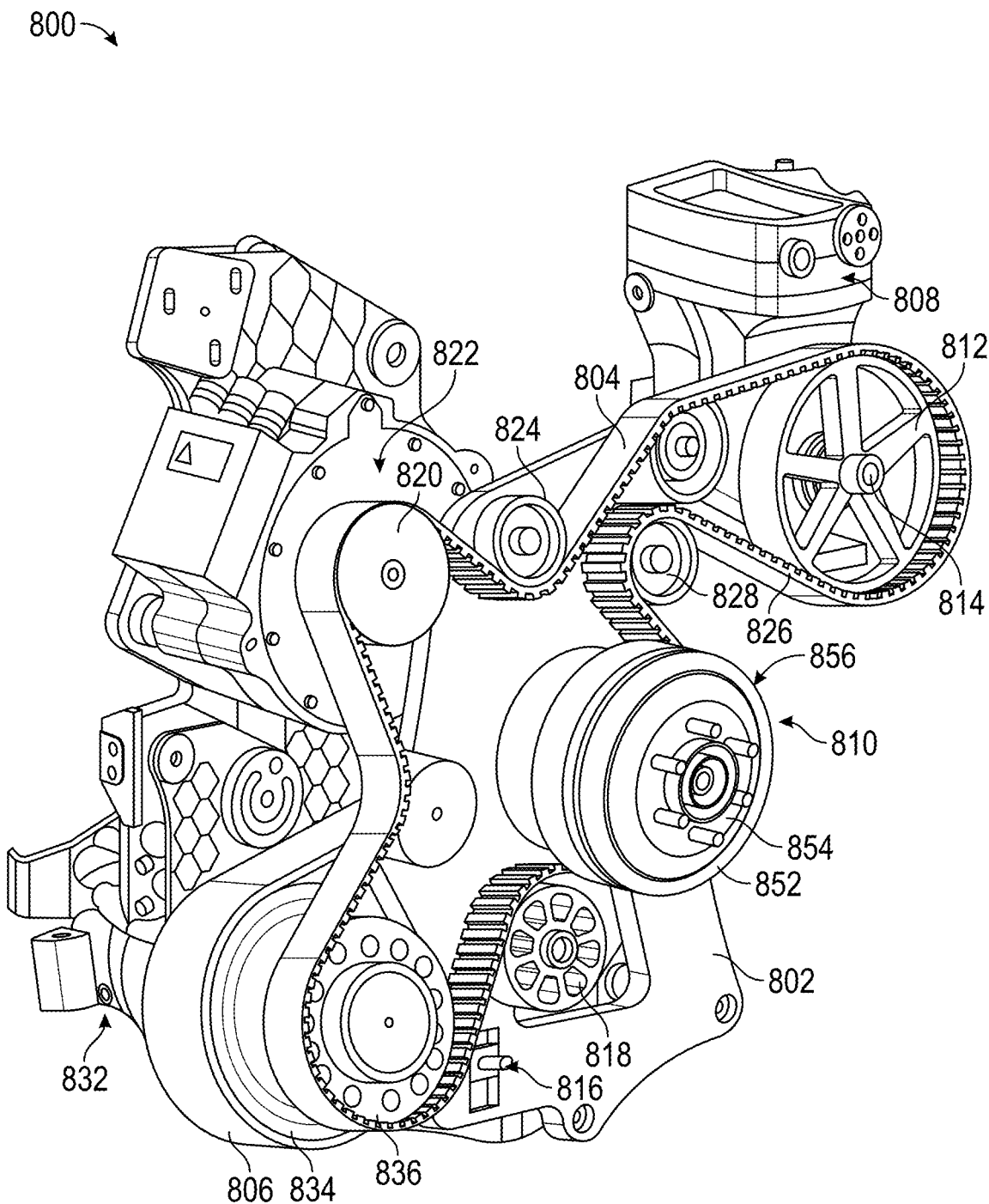
FIG. 15 is a front perspective view of the FEAD of FIG. 9, according to an exemplary embodiment.
Figure 16:
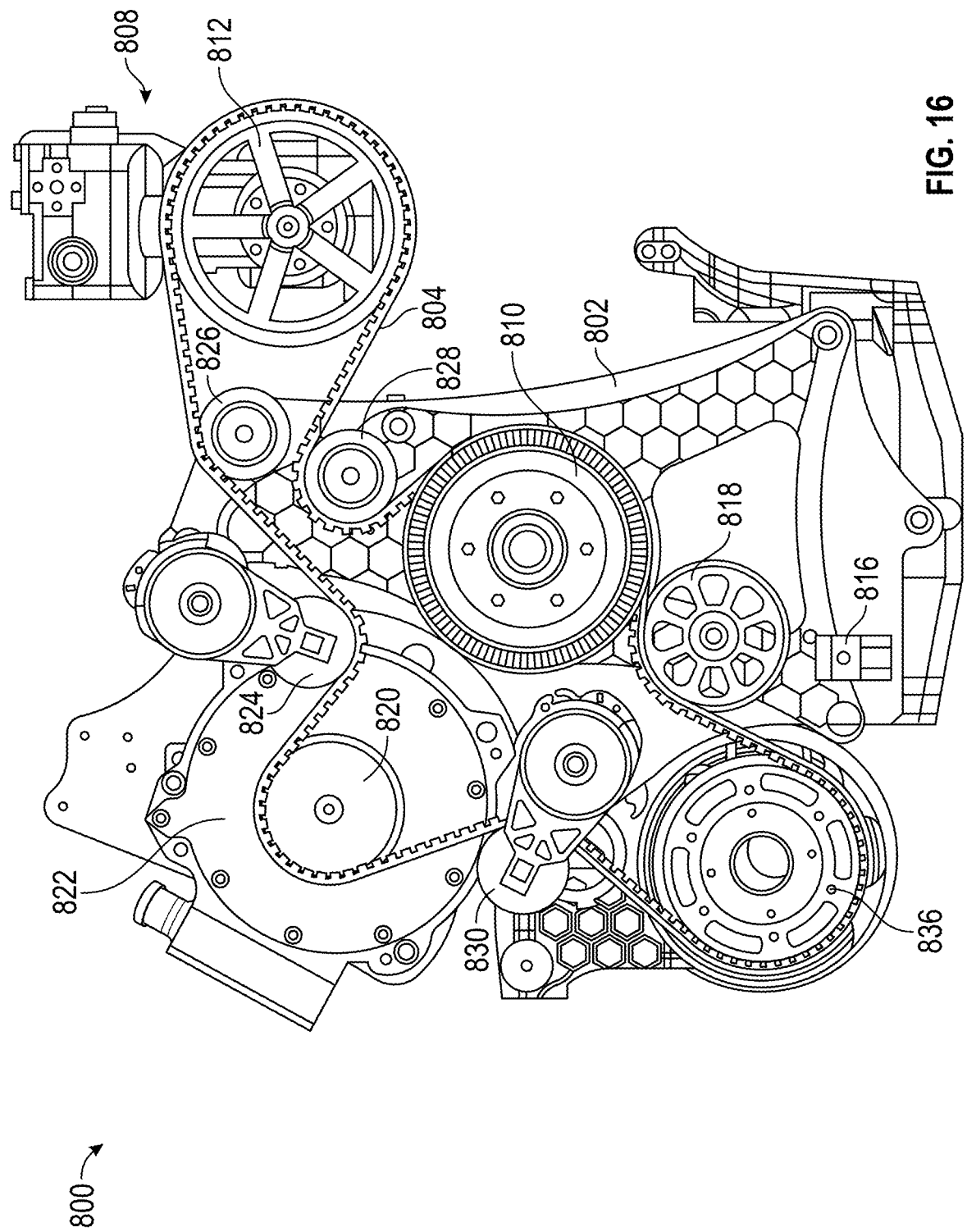
FIG. 16 is a front view of the FEAD of FIG. 15, according to an exemplary embodiment.
Figure 17:
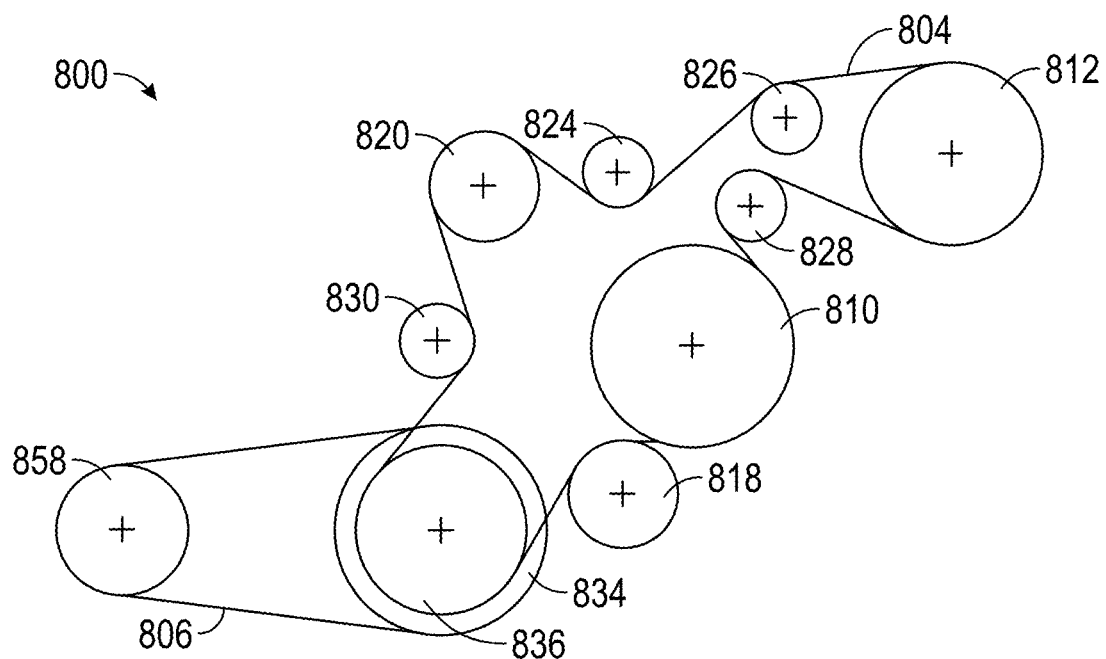
FIG. 17 is a schematic diagram of the FEAD of FIG. 15, according to an exemplary embodiment.

As shown in FIGS. 15-17, the FEAD 800 includes a first belt (e.g., tensile member, chain, power transmitting band, pulley, etc.), shown as FEAD belt 804, and a second belt (e.g., tensile member, chain, power transmitting band, pulley, etc.), shown as engine belt 806. The engine belt 806 is coupled between an output shaft 858 of the engine 610 (e.g., at a front end of the engine 610) and a one-way bearing or clutch, shown as sprag clutch 834. The FEAD belt 804 is coupled with, and defines a power band circuit between, a shaft 820 of the motor/generator 822, a drive member 812 of the air compressor 808 (e.g., an air compressor pulley or sheave), an outer race 852 of a fan clutch 856 of the fan 810, a tensioning pulley 818, a pulley 836 of the sprag clutch 834, a first roller 824, a second roller 826, a third roller 828, and a fourth roller 830 (e.g., roller pulleys). The FEAD belt 804 and the engine belt 806 can be V-belts or synchronous belts and are configured to drive or be driven by any of the coupled components, clutches, shafts, pulleys, rollers, gears, rotatable members, etc. of the FEAD 800 as described in detail herein.

Figure 18:
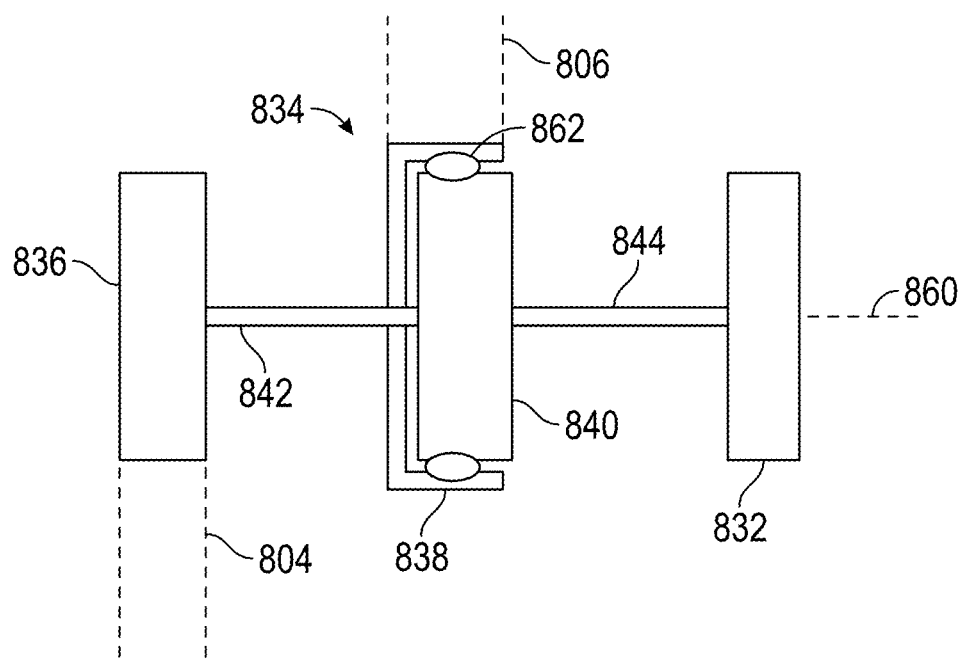
FIG. 18 is a schematic diagram of a sprag clutch of the FEAD of FIG. 15, according to an exemplary embodiment.

The hydraulic pump 832 is configured to be driven (e.g., by providing a torque input at an input shaft 844 of the hydraulic pump 832 as shown in FIG. 18) to pressurize a hydraulic fluid, according to an exemplary embodiment. The hydraulic fluid may be stored in a reservoir or tank, pressurized by the hydraulic pump 832, and provided to different hydraulically driven accessories, accessory systems, hydraulic motors, hydraulic actuators, power steering systems, suspension systems, etc. of the vehicle 10. The hydraulic pump 832 may be a component of a hydraulic circuit of the vehicle 10 that is used for different body operations or body systems of the vehicle 10, or different chassis systems of the vehicle 10 that use hydraulic primary movers (e.g., hydraulic motors, hydraulic linear actuators, etc.). The hydraulic pump 832 can be any of a gear pump, a piston pump, a vane pump, a clutch pump, a dump pump, a refuse pump, etc. or any other hydraulic pump (e.g., clutched) that receives an input torque and pressurizes or drives a hydraulic fluid. In an exemplary embodiment, the hydraulic pump 832 pressurizes the hydraulic fluid for a power steering system and a suspension system of the vehicle 10.

The air compressor 808 is configured to be driven (e.g., by providing a torque input at an input shaft 814 of the air compressor 808 such as by driving, with the FEAD belt 804, the drive member 812 that is fixedly coupled with the input shaft 814) to pressurize air or any other gas, according to an exemplary embodiment. The air may be pressurized and stored in an air tank (e.g., a tank, a reservoir, a pressure vessel, etc.) that is fluidly coupled with the air compressor 808. For example, the air compressor 808 can be configured to operate to maintain a required pressure in the air tank for different chassis operations or systems such as brakes. In an exemplary embodiment, the air compressor 808 is configured to pressurize air for air brakes of the vehicle 10 (e.g., drum brakes that include a brake chamber that is fluidly coupled with the air tank). The air compressor 808 is a component of a fluid circuit for providing pressurized air to different accessories or systems of the vehicle 10, including but not limited to, air brakes of the axle assemblies 500. In some embodiments, the air compressor 808 is configured to pressurize air for other chassis or body operations of the vehicle 10 (e.g., suspension components, etc.).

The fan 810 is configured to be driven (e.g., by providing a torque input, with the FEAD belt 804, through the fan clutch 856 of the fan 810 when the fan clutch 856 is in an engaged state) to drive a rotor or impeller component of the fan 810. The fan 810 is configured to drive an airflow through cooling components (e.g., an engine radiator, a transmission cooler, heat exchangers, a hydraulic cooler, an A/C condenser, a battery cooler, etc.) of the vehicle 10 to provide cooling for the engine 610 and various other systems (e.g., a hydraulic circuit, the transmission 620, the ESS 1000, etc.) of the vehicle 10. The impeller component or assembly can be selectively engaged with the FEAD belt 804 through the fan clutch 856. The fan clutch 856 may be an electric clutch that is selectively engaged or disengaged to thereby couple or de-couple the impeller component or assembly of the fan 810 with the FEAD belt 804. The FEAD belt 804 couples with the outer race 852 of the fan clutch 856, and the impeller assembly of the fan 810 is fixedly coupled with an inner race 854 of the fan clutch 856. Engaging or disengaging the fan clutch 856 couples or decouples the inner race 854 with the outer race 852 of the fan clutch 856. The fan clutch 856 can be transitioned between the engaged state and the disengaged state automatically based on a temperature of the engine 610 or other vehicle components, in response to a user input, in response to a control mode, etc.

As shown in FIGS. 15 and 16, the tensioning pulley 818 is positioned along the FEAD belt 804 between the pulley 836 of the sprag clutch 834 and the fan 810. In other embodiments, the tensioning pulley 818 is otherwise positioned along the FEAD belt 804. The tensioning pulley 818 is adjustable (e.g., physically moveable, translatable, etc.) to increase or decrease a tension of the FEAD belt 804. The tensioning pulley 818 can be adjusted by providing an input to an adjustment member 816 (e.g., lever, knob, etc.) to reposition (e.g., translate, etc.) the tensioning pulley 818.

According to an exemplary embodiment, the motor/generator 822 is configured to function both as a motor and as a generator in different modes of the FEAD 800. When the motor/generator 822 functions as a motor, the motor/generator 822 is configured to consume electrical energy from the ESS 1000 of the vehicle 10 and output a torque to the FEAD belt 804 through the shaft 820 of the motor/generator 822. The FEAD belt 804 transfers the torque or mechanical energy to each of the fan 810, the air compressor 808, and the hydraulic pump 832 so that the motor/generator 822 functions as the primary mover of the FEAD 800 when activated, thereby electrifying the FEAD 800 and facilitating independent operation the FEAD 800 (i.e., operating independently of operation of the engine 610). The FEAD belt 804 can be configured to drive the hydraulic pump 832 through the sprag clutch 834, as described in greater detail below with reference to FIG. 18.

The motor/generator 822 is also configured to function as a generator and be driven by the FEAD belt 804 when the engine 610 operates as the primary mover of the FEAD 800.

The engine 610 is configured to drive the sprag clutch 834 through the engine belt 806, which thereby drives (i) the hydraulic pump 832 through the sprag clutch 834 and (ii) the FEAD belt 804 through the sprag clutch 834, and thereby the fan 810, the air compressor 808, and the motor/generator 822 through the pulley 836 of the sprag clutch 834. In some embodiments, the FEAD 800 can be transitioned between the engine-driven mode and the electrified mode by (i) selectively configuring the engine 610 to drive the engine belt 806 (e.g., by engaging a clutch of the engine 610 so that the engine outputs torque to the sprag clutch 834 via the engine belt 806, or by starting or stopping the engine 610) or (ii) activating the motor/generator 822 to drive the FEAD belt 804 (e.g., by providing electrical power to the motor/generator 822 to thereby cause the motor/generator 822 to function as an electric motor and drive the FEAD belt 804). When the engine 610 drives the FEAD 800 through the engine belt 806, the sprag clutch 834, and the FEAD belt 804, the motor/generator 822 may be driven through the shaft 820 and function as a generator (as necessary or continuously) to generate electrical energy based on the driving of the shaft 820 (e.g., now functioning as an input shaft) and provide the electrical energy to various electrical components of the vehicle 10 and/or to the ESS 1000 for storage.

As shown in FIGS. 15 and 16, the FEAD 800 includes a structural member, shown as frame 802, with which each of the motor/generator 822, the air compressor 808, the tensioning pulley 818, the hydraulic pump 832, the sprag clutch 834, the fan 810, and the roller pulleys 824-830 are coupled (e.g., translationally fixedly coupled). According to an exemplary embodiment, the frame 802 is coupled (e.g., mounted, secured, fixedly coupled, fastened, attached, etc.) to a front of the engine 610. In other embodiments, the frame 802 is coupled to the hull and frame assembly 100 (e.g., a portion of the front module 300).

As shown in FIG. 18, the sprag clutch 834 includes a first portion, shown as outer race 838, a second portion, shown as inner race 840, and one-way rotational elements, shown as sprags 862, positioned between the inner race 840 and the outer race 838. The sprags 862 are configured to (i) permit free rotation between the inner race 840 and the outer race 838 when the inner race 840 is rotated relative to the outer race 838 about a central axis 860 thereof (e.g., when the pulley 836, and therefore, the inner race 840 is driven by the motor/generator 822) and (ii) limit or jam when the outer race 838 is rotated relative to the inner race 840 about the central axis 860 (e.g., when the outer race 838 is driven by the engine 610 through the engine belt 806).

As shown in FIGS. 15 and 17, the engine belt 806 is coupled with the outer race 838 of the sprag clutch 834 so that when the engine 610 drives the engine belt 806, the outer race 838 locks with the inner race 840 and both the outer race 838 and the inner race 840 rotate in unison (e.g., due to the sprags 862 locking the inner race 840 with the outer race 838 or limiting relative rotation between the inner race 840 and the outer race 838). The pulley 836 of the sprag clutch 834 is fixedly coupled with the inner race 840 of the sprag clutch 834 (e.g., via a shaft 842) so that rotation of the inner race 840 drives the pulley 836 and the FEAD belt 804. The input shaft 844 of the hydraulic pump 832 is coupled (e.g., rotatably) with the inner race 840 of the sprag clutch 834 such that rotation of the inner race 840 (e.g., in unison with rotation of the outer race 838 when the engine 610 drives the outer race 838 and the inner race 840 in unison through the engine belt 806) also drives the hydraulic pump 832.

As shown in FIG. 18, the pulley 836 and, therefore, the FEAD belt 804 are coupled with the inner race 840 of the sprag clutch 834. When the motor/generator 822 of the FEAD 800 operates as the primary mover of the FEAD 800, the motor/generator 822 drives the FEAD belt 804 (thereby driving the air compressor 808 and/or the fan 810), which drives the pulley 836 and the inner race 840 to rotate relative to the outer race 838 of the sprag clutch 834, thereby also driving the hydraulic pump 832 without driving the outer race 838 and the engine belt 806. In this way, the sprag clutch 834 can function to facilitate driving the FEAD 800 with either the engine 610 or the motor/generator 822. When the motor/generator 822 drives the FEAD 800 and accessories thereof, the inner race 840 of the sprag clutch 834 rotates freely relative to the outer race 838. When the engine 610 drives the FEAD 800 and accessories thereof, the inner race 840 and the outer race 838 of the sprag clutch 834 have limited relative rotation to thereby transfer the torque from the engine 610 and the engine belt 806 to the FEAD 800 and accessories thereof.

It should be understood that while FIG. 18 shows the engine belt 806 being coupled with the outer race 838 of the sprag clutch 834, and the hydraulic pump 832 and the FEAD belt 804 being coupled with the inner race 840 of the sprag clutch 834, in other embodiments, the engine belt 806 is coupled with the inner race 840 of the sprag clutch 834 and the hydraulic pump 832 and the FEAD belt 804 are coupled with the outer race 838 of the sprag clutch 834.

Figure 19:
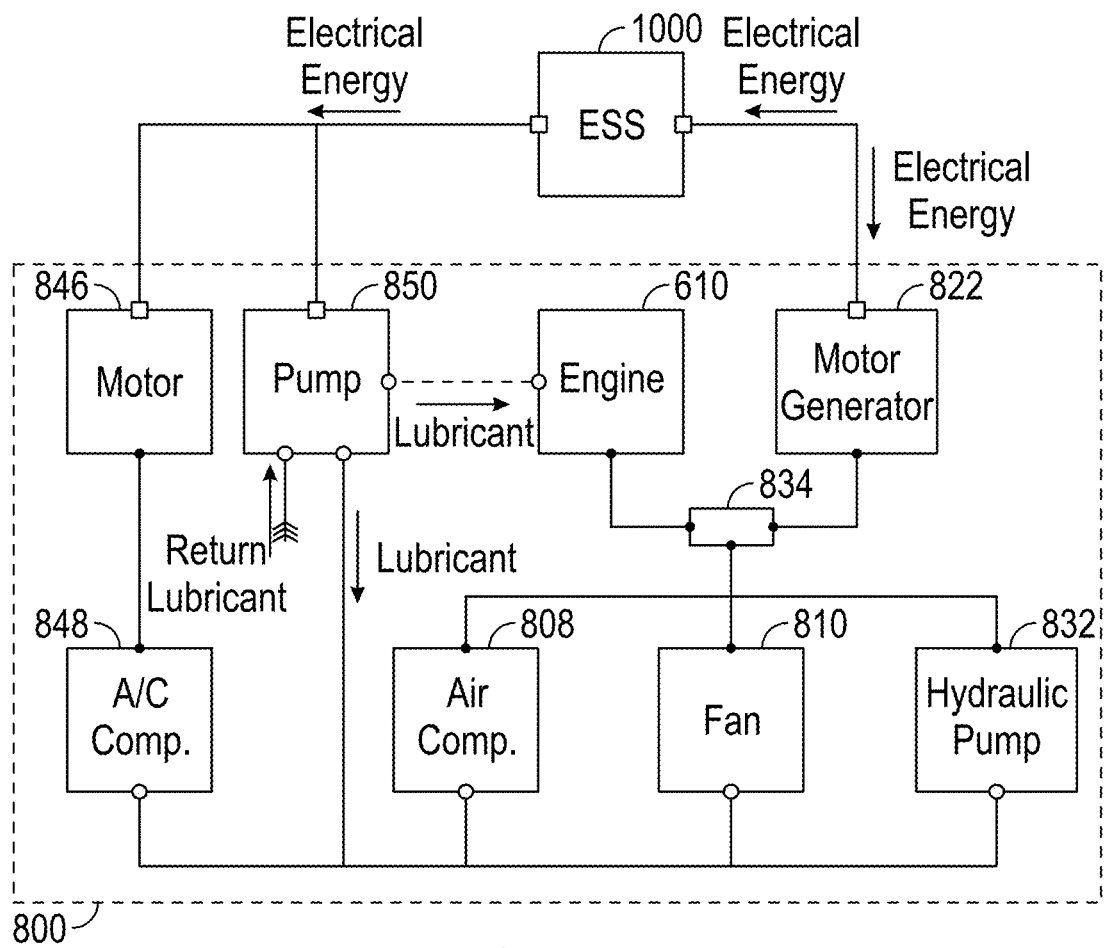
FIG. 19 is a schematic block diagram of the FEAD of FIG. 15 operably coupled with the ESS of FIGS. 9 and 10, according to an exemplary embodiment.

As shown in FIG. 19, the FEAD 800 is operably or electrically coupled with the ESS 1000 so that the ESS 1000 can exchange electrical energy with electrical components of the FEAD 800. The FEAD 800 also includes the A/C compressor 848 and an electric motor 846 that is configured to drive the A/C compressor 848. The A/C compressor 848 and the electric motor 846 can operate independently of the engine 610 and the motor/generator 822 so that the A/C compressor 848 does not depend on operation, drive speed, or on/off status of the engine 610 or the motor/generator 822. The engine 610 or the motor/generator 822 are selectively configured to provide mechanical energy to drive the air compressor 808, the fan 810, or the hydraulic pump 832. When the engine 610 drives the air compressor 808, the fan 810, and the hydraulic pump 832, the engine 610 may also drive the motor/generator 822 so that the motor/generator 822 generates electrical energy. The motor/generator 822 is electrically coupled (e.g., via electrical wiring) with the ESS 1000 and provides generated electrical energy to the ESS 1000 for storage and discharge to other electrical components of the vehicle 10. When the motor/generator 822 operates to drives the FEAD 800 (e.g., in the electrified mode), the motor/generator 822 consumes electrical energy provided by the ESS 1000 (or more specifically batteries thereof) and uses the electrical energy to drive the accessories of the FEAD 800.

As shown in FIG. 19, the FEAD 800 includes a pump (e.g., an oil pump, a lubrication pump, etc.), shown as lubricant pump 850, that is configured to provide lubricant to the A/C compressor 848, the air compressor 808, the fan 810, and/or the hydraulic pump 832. In some embodiments, the lubricant pump 850 is a component in a fluid lubricant circuit that includes a reservoir for the lubricant, one or more filters to filter the lubricant, etc. In some embodiments, the lubricant pump 850 is configured to provide lubricant to the engine 610. The lubricant pump 850 may be selectively fluidly coupled with the accessories of the FEAD 800 (e.g., the A/C compressor 848, the air compressor 808, the fan 810, the hydraulic pump 832, etc.) or lubricant inlets (e.g., grease fittings) of the accessories of the FEAD 800 to provide lubricant (e.g., grease, liquid lubricant, oil-based lubricant, etc.) to reduce friction and reduce wear of the accessories of the FEAD 800. The lubricant fluid circuit including the lubricant pump 850 can include a valve and a branch (e.g., a tee) to selectively direct lubricant to the accessories of the FEAD 800 or moving parts of the accessories of the FEAD 800 as required, automatically, or in response to a user input. The lubricant pump 850 can include an electric motor that consumes electrical energy provided by the ESS 1000 to operate independently of operation of the engine 610 and/or the motor/generator 822 (e.g., operates when the engine 610 and/or the motor/generator 822 are in an off state, not operating to provide torque or generate electrical energy, etc.). The lubricant pump 850 is configured to receive return lubricant from any of the A/C compressor 848, the air compressor 808, the fan 810, the hydraulic pump 832, or the engine 610, and recirculate the return lubricant.

The A/C compressor 848 and the electric motor 846 are configured to operate independently of the engine 610 and the motor/generator 822 to provide A/C for occupants of the vehicle 10. The electric motor 846 operates by consuming electrical power provided by the ESS 1000 (or other batteries of the vehicle 10) and driving the A/C compressor 848. The A/C compressor 848 is configured to compress a refrigerant to pass the refrigerant through a heat exchanger for A/C. Advantageously, the A/C compressor 848 can be operated regardless of the mode of the FEAD 800 (e.g., if the FEAD 800 is being driven by the engine 610, if the FEAD 800 is being driven by the motor/generator 822, if the FEAD 800 is not being driven).

Engine-Only-Driven FEAD m

Figure 20:
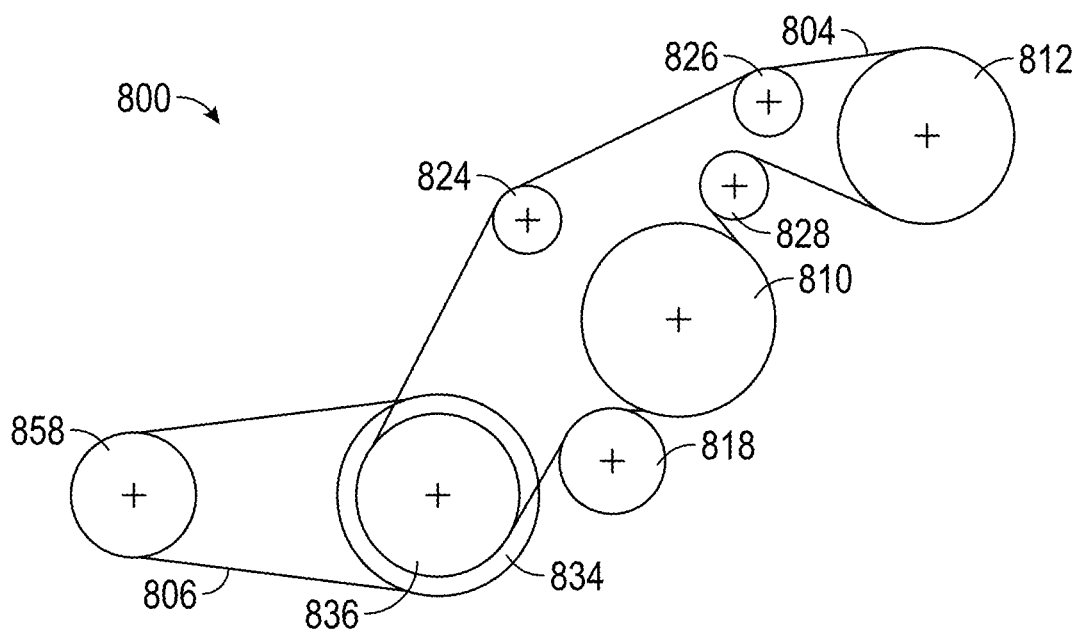
FIG. 20 is a schematic diagram of the FEAD of FIG. 9 without an electric motor/generator, according to another exemplary embodiment.

According to the alternative embodiment shown in FIG. 20, the FEAD 800 does not include the motor/generator 822 and is instead driven solely by the engine 610 through the output shaft 858 of the engine 610 that is coupled with the engine belt 806, thereby driving the FEAD belt 804 through the sprag clutch 834. In such an embodiment, the FEAD 800 may not include the sprag clutch 834. The accessories of the FEAD 800 may, therefore, be directly coupled to the engine belt 806 or the sprag clutch 834 is replaced by two pulleys coupled together (e.g., the pulley 836 and a second pulley that replaces the outer race 838 and the inner race 840 of the sprag clutch 834).

IMG-Driven FEAD

Figure 21:
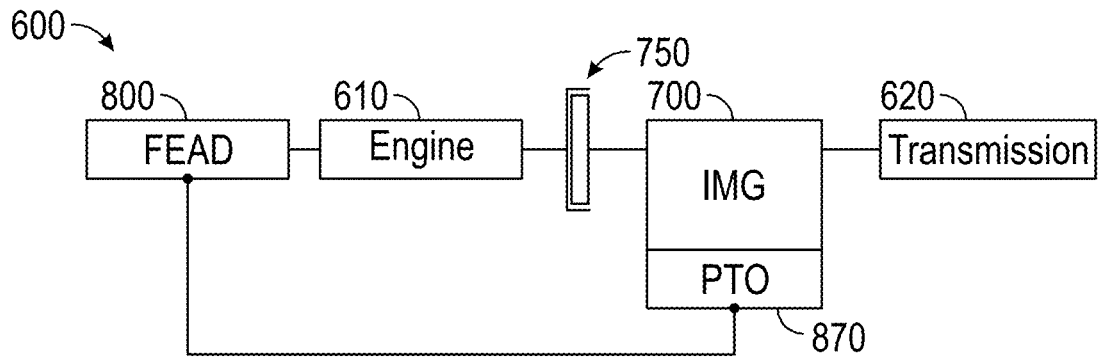
FIG. 21 is a schematic block diagram of the driveline of FIG. 9 including a power take-off ("PTO") that is driven by the IMG and coupled to the FEAD, according to another exemplary embodiment.
Figure 22:
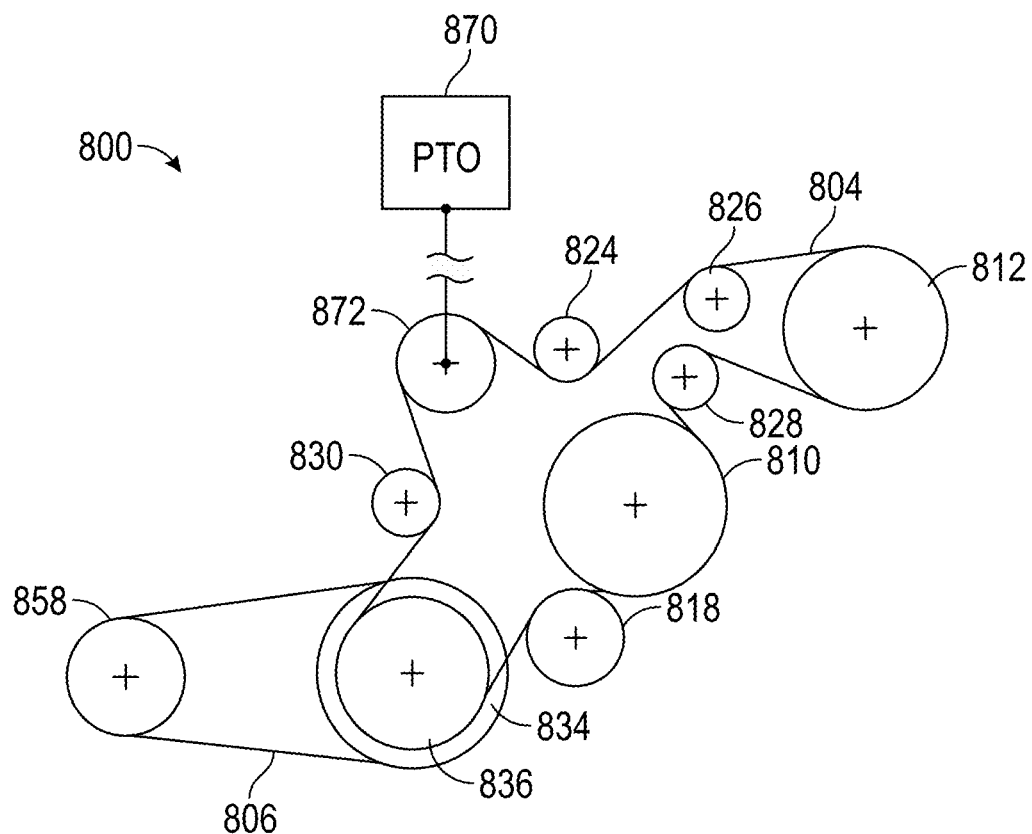
FIG. 22 is a schematic diagram of the FEAD coupled to the PTO of the driveline of FIG. 21, according to an exemplary embodiment.

According to the exemplary embodiment FIGS. 21 and 22, the FEAD 800 or accessories thereof can be driven by the IMG 700 of the driveline 600. As shown in FIG. 21, the driveline 600 includes the engine 610, the engine clutch 750, the IMG 700, and the transmission 620 where the IMG 700 includes a PTO, shown as PTO 870, configured to be driven by an output (e.g., a secondary output, etc.) of the IMG 700. The PTO 870 can be transitionable between an engaged state and a disengaged state. When the PTO 870 is in the engaged state, the PTO 870 can receive output torque from the IMG 700 and transfer the torque to an input pulley 872 of the FEAD 800 for driving the FEAD belt 804. Accordingly, the input pulley 872 may replace the motor/generator 822 of the FEAD 800. The engine 610 may still be configured to drive the FEAD 800 and accessories of the FEAD 800 through the sprag clutch 834 and the engine belt 806 when the FEAD 800 is in the engine-driven mode. When the FEAD 800 is transitioned into the motor/driven or electrified mode, the IMG 700 can consume electrical energy (e.g., from the ESS 1000) and output torque to the PTO 870. The PTO 870 can be transitioned into the engaged state so that the PTO 870 receives the output torque from the IMG 700 and transfers the output torque to the input pulley 872 of the FEAD 800. The input pulley 872 can be configured to drive the FEAD belt 804 similarly to the motor/generator 822 as described in greater detail above with reference to FIGS. 15-19.

Accordingly, the FEAD 800 shown in FIGS. 21 and 22 is transitionable between (i) an engine-driven mode where the FEAD 800 and accessories of the FEAD 800 are driven by the engine 610 and (ii) a motor/driven or electrified mode where the FEAD 800 and accessories of the FEAD 800 are driven by the IMG 700 of the driveline 600 (e.g., through the PTO 870). Transitioning between the engine-driven mode and the motor/driven mode can include (i) transitioning the PTO 870 between the engaged state and the disengaged state and/or (ii) transitioning the IMG 700 between operating as a motor and operating as a generator. Advantageously, driving the FEAD 800 in the motor/driven mode with the IMG 700 reduces the need for an additional motor/generator at the FEAD 800 (e.g., the motor/generator 822). When the FEAD 800 is driven by the IMG 700 through the PTO 870, the engine clutch 750 may be de-coupled from the engine 610 so that the IMG 700 operates independently of operation of the engine 610. In another embodiment, the PTO 870 is coupled to an output (e.g., a secondary output) of the transmission 620 and driven by the IMG 700 and/or the engine 610 to drive the FEAD 800.

Electrified Accessories

Figure 23:
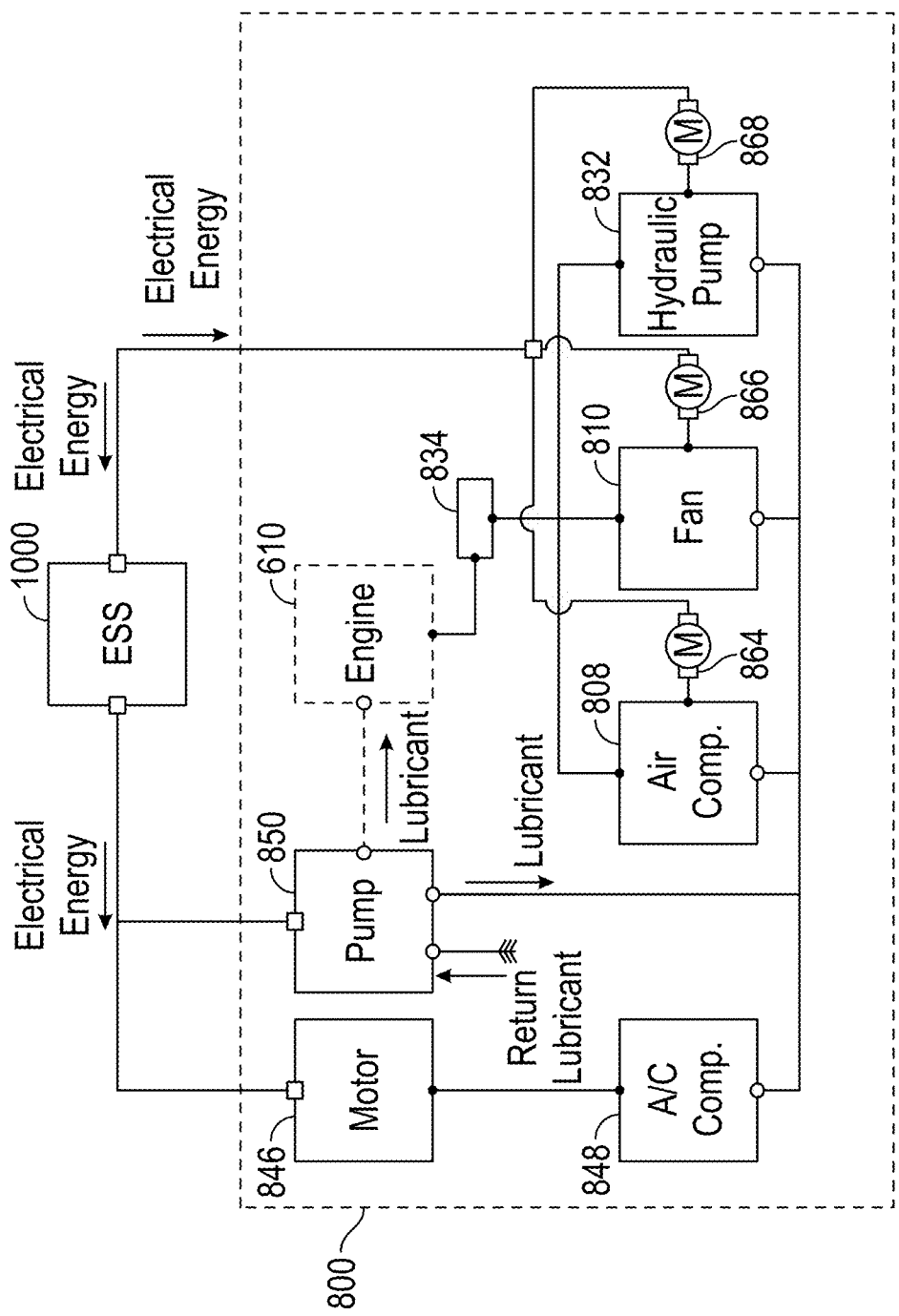
FIG. 23 is a schematic block diagram of the FEAD of FIG. 9 including an electric motor for each of the accessories thereof, according to another exemplary embodiment.

According to the exemplary embodiment shown in FIG. 23, each of the accessories of the FEAD 800 can be individually electrified. As shown in FIG. 23, the FEAD 800 additionally includes an electric motor 864 configured to drive the air compressor 808, an electric motor 866 configured to drive the fan 810, and an electric motor 868 configured to drive the hydraulic pump 832. Each of the electric motor 864, the electric motor 866, the electric motor 868, and the electric motor 846 is configured to consume electrical energy provided by the ESS 1000 to drive their corresponding accessories. Each of the electric motor 864, the electric motor 866, the electric motor 868, and the electric motor 846 can therefore be operated independently of each other and/or independently of the engine 610.

In the embodiment shown in FIG. 23 where each of the accessories is electrified, the engine 610 may be optional as a primary mover for the FEAD 800. If the engine 610 is not used by the FEAD 800 in such an embodiment, the engine 610 may still be provided as a component of the driveline 600 but is not used to provide a torque input to the FEAD 800. If the engine 610 is not used to provide a torque input to the FEAD 800, the engine belt 806, the FEAD belt 804, and the sprag clutch 834 are not used since each of the accessories are independently operated by their corresponding electric motors.

If the engine 610 is used to provide a torque input to the FEAD 800, the electric motor 864, the electric motor 866, and the electric motor 868 can function as motor/generators, and can be driven by the engine 610 to generate electrical energy and provide the electrical energy to the ESS 1000. In some embodiments, one or more of the air compressor 808, the fan 810, and the hydraulic pump 832 are not electrified, while one or more others of the air compressor 808, the fan 810, and the hydraulic pump 832 are electrified. For example, the hydraulic pump 832 and the air compressor 808 can both be electrified and independently operational (e.g., through operation of the electric motor 868 and the electric motor 864) while the fan 810 may be coupled with the engine 610 through the FEAD belt 804 or the engine belt 806 to be driven by the engine 610. Advantageously, providing the electric motors 864-868 facilitates independent operation of each of the air compressor 808, the fan 810, and the hydraulic pump 832 relative to operation of the engine 610, and also relative to operation of each other. For example, the air compressor 808 can be operated independently, regardless of operation of any of the A/C compressor 848, the engine 610, the fan 810, or the hydraulic pump 832. Further, electrification of the accessories may facilitate distributing the accessories variously about the vehicle 10, providing improved component packaging.

Energy Storage System
Capacity, Operating Range, and Charging

Figure 24:
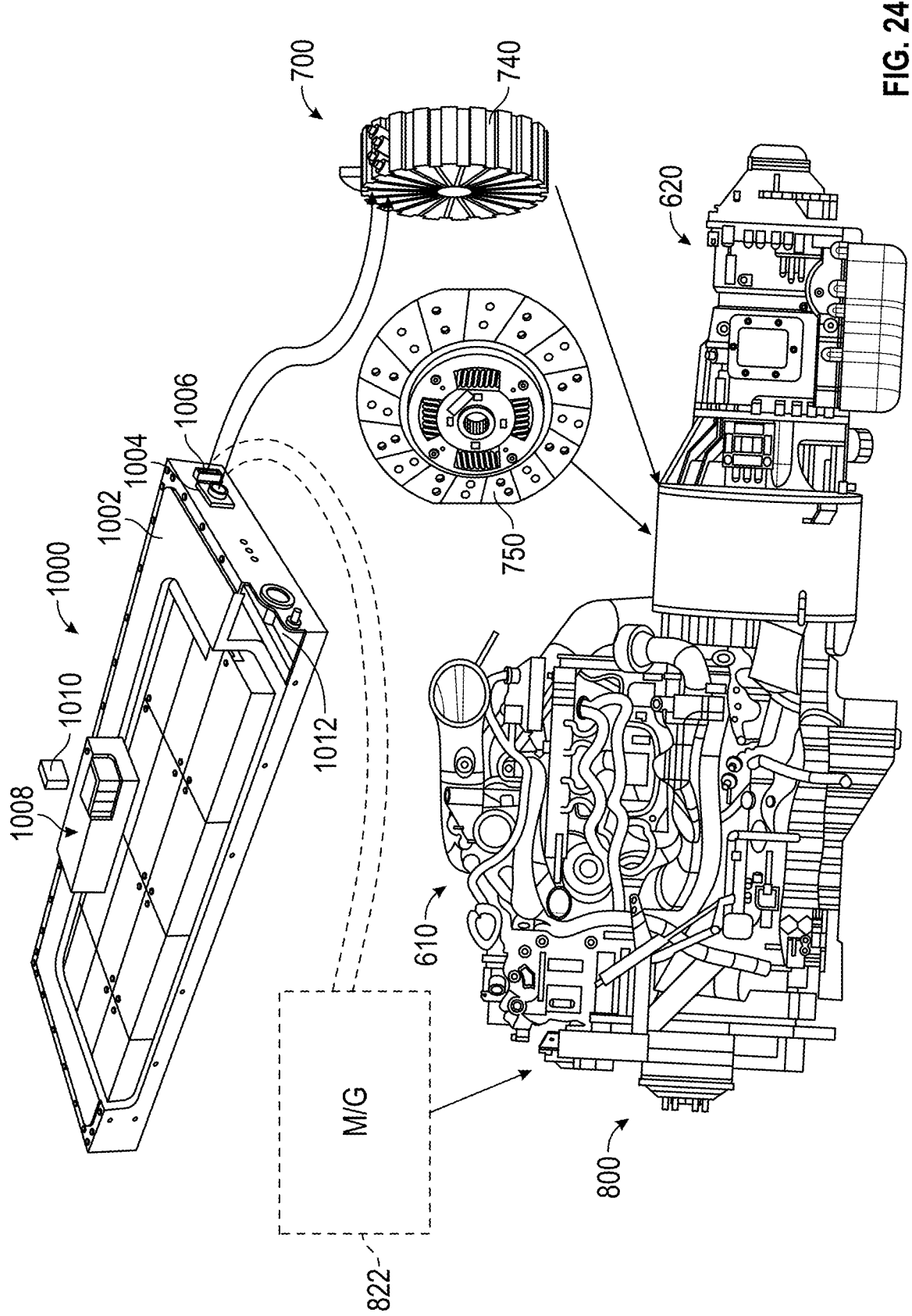
FIG. 24 is a schematic diagram of the ESS of FIG. 9, according to an exemplary embodiment.

As shown in FIG. 24, the ESS 1000 is electrically coupled to the IMG 700. In some embodiments (e.g., embodiments where the FEAD 800 includes the motor/generator 822), the ESS 1000 is also electrically coupled to the motor/generator 822 of the FEAD 800. In an electric drive mode of operation, the ESS 1000 provides power to the IMG 700 to drive the transmission 620 and/or other components/systems of the vehicle 10 (e.g., to the motor/generator 822 to drive the FEAD 800). In a charge mode of operation (e.g., during the engine mode), (i) the IMG 700 is driven by the engine 610 via the engine clutch 750 and electrical power may generated and provided to the ESS 1000 and/or (ii) the motor/generator 822 may be driven by the engine 610 and electrical power may be generated and provided to the ESS 1000.

As shown in FIG. 24, the ESS 1000 includes a battery storage housing 1002, a power connector 1004 supported by the battery storage housing 1002, and a data connector 1006 supported by the battery storage housing 1002. The power connector 1004 provides power communication between the ESS 1000, the IMG 700, and/or the motor/generator 822. The data connector 1006 provides data communication between the ESS 1000, the IMG 700, and/or the motor/generator 822. The ESS 1000 includes a number of batteries 1008, each including a number of cells 1010. The batteries 1008 are coupled together to provide an energy storage capacity of the ESS 1000.

In some embodiments, the batteries 1008 are configured (e.g., structured, designed, etc.) to operate at 700 volts ("V"). In some embodiments, the batteries 1008 are configured to operate at 24 V. In some embodiments, the batteries 1008 are configured to operate at a voltage between 700 V and 24 V. In an exemplary embodiment, the batteries 1008 are configured to operate at 666 V nominal voltage with a 406 kW discharge power. In some embodiments, the ESS 1000 has an energy storage capacity of 30.6 kWh. In some embodiments, the ESS 1000 is configured to operate at ambient temperatures between −40 degrees Celsius and 80 degrees Celsius.

In some embodiments, the energy storage capacity is defined for a target load. The target load is defined by the vehicle 10 (e.g., weight, transmission design, suspension dynamics, etc.) and can be expressed as an average load in kilowatts ("kW"). In some embodiments, the target load is defined by a specific vehicle and a specific use case. In some embodiments, the vehicle 10 is structured to provide a silent mobility mode where the systems and components the vehicle 10 are operated using energy from the ESS 1000 and the engine 610 is inactive. The silent mobility mode can define the energy storage capacity in part. In some embodiments, the target load is defined at the gross-vehicle-weight-rating ("GVWR") of the vehicle 10. Table 1, reproduced below, depicts six use cases and associated target loads during the silent mobility mode.

In use case "Vehicle 1," the target load is 68 kW average load and results in 22 minutes of run time and 13.5 miles of distance traveled. The energy storage capacity of "Vehicle 1" can be defined as 22 minutes of run time and/or 13.5 miles of distance traveled. In some embodiments, the target load of "Vehicle 1" is at least sixty-five kilowatts (65 kW). In some embodiments, the energy storage capacity of "Vehicle 1" can be defined as at least 20 minutes of run time and/or at least 13 miles of distance traveled.

In use case "Vehicle 2," the target load is 53 kW average load and results in 29 minutes of run time and 6 miles of distance traveled. The energy storage capacity of "Vehicle 2" can be defined as 29 minutes of run time and/or 6 miles of distance traveled. In some embodiments, the target load of "Vehicle 2" is at least fifty kilowatts (50 kW). In some embodiments, the energy storage capacity of "Vehicle 2" can be defined as at least 29 minutes of run time and/or at least 6 miles of distance traveled.

In use case "Vehicle 3," the target load is 40 kW average load and results in 38 minutes of run time and 14.5 miles of distance traveled. The energy storage capacity of "Vehicle 3" can be defined as 38 minutes of run time and/or 14.5 miles of distance traveled. In some embodiments, the target load of "Vehicle 3" is at least forty kilowatts (40 kW). In some embodiments, the energy storage capacity of "Vehicle 3" can be defined as at least 35 minutes of run time and/or at least 14 miles of distance traveled.

In use case "Idle," the goal is to idle the vehicle 10 using the ESS 1000 without requiring activation of the engine 610 (e.g., operate all loads of the vehicle 10 using the ESS 1000). The target load of the "Idle" use case is 17 kW average load and results in 90 minutes of run time. The energy storage capacity of "Idle" can be defined as 90 minutes of run time and/or 0 miles of distance traveled.

In use case "Fuel_Econ," the goal is to maximize the distance traveled by the vehicle 10. The target load is 40 kW average load and results in 22 miles of distance traveled. The energy storage capacity of "Fuel_Econ" can be defined 22 miles of distance traveled.

In use case "25 mph," the goal is to maximize a time of operation while moving the vehicle 10 at 25 mph over ground. The target load is 34 kW average load and results in 44 minutes of run time. The energy storage capacity of "25 mph" can be defined as 44 minutes of run time.

TABLE 1

| | Use Case | | | | | |
|---|---|---|---|---|---|---|
| | Vehicle 1 | Vehicle 2 | Vehicle 3 | Idle | Fuel_Econ | 25 mph |
| | | | Target Load | | | |
| | 68 kW | 53 kW | 40 kW | 17 kW | 40 kW | 34 kW |
| | | | Criteria | | | |
| | Minutes Miles | Minutes Miles | Minutes Miles | Minutes | Miles | Minutes |
| Result | 22  13.5 | 29  6 | 38  14.5 | 90 | 22 | 44 |

In one example, the ESS 1000 includes batteries 1008 that provide 30.6 kWh of energy storage capacity and are capable of providing enough energy for a minimum pure electric vehicle (EV) drive operation (e.g., silent mobility mode) of at least 30 minutes at 25 mph (e.g., 30-35 min at 45 mph).

The battery storage housing 1002 and the batteries 1008 may have a weight of about 818.4 pounds. In some embodiments, the battery storage housing 1002 and batteries 1008 may have a weight of between about 600 pounds and about 1000 pounds. The battery storage housing 1002 may have dimensions of about 60.8 inches wide, about 29.5 inches tall, and about 8.5 inches thick. In some embodiments, the battery storage housing 1002 is shaped differently and defines different dimensions (e.g., dependent upon the positioning on the vehicle 10, the desired battery capacity, weight loading requirements, etc.). For example, the battery storage housing 1002 may be between 40 and 80 inches wide, between 10 and 40 inches tall, and between 4 and 12 inches thick. In some embodiments, the battery storage housing 1002 is not structured as a single housing containing multiple batteries. In some embodiments, each battery 1008 or a subset of batteries 1008 may include battery storage housings 1002 that may be collocated on the vehicle 10 or distributed in multiple positions about the vehicle 10.

The batteries 1008 are configured to be maintained at between a lower SoC limit and an upper SoC limit. In one embodiment, the lower SoC limit is 20% of the maximum SoC and the upper SoC limit is 93% of the maximum SoC. In some embodiments, the lower SoC limit is greater than or less than 20% (e.g., 5%, 10%, 15%, 25%, etc.). In some embodiments, the upper SoC limit may be greater than or less than 93% (e.g., 88%, 90%, 95%, etc.).

The ESS 1000 can include a charge controller 1012 structured to control the flow of electrical energy into the batteries 1008 using a charge profile. The charge profile instituted by the charge controller 1012 may be dependent on the battery 1008 chemistry and other considerations. In some embodiments, the energy storage capacity may be defined as the amount of energy available between the lower SoC limit and the upper SoC limit.

Figure 25:
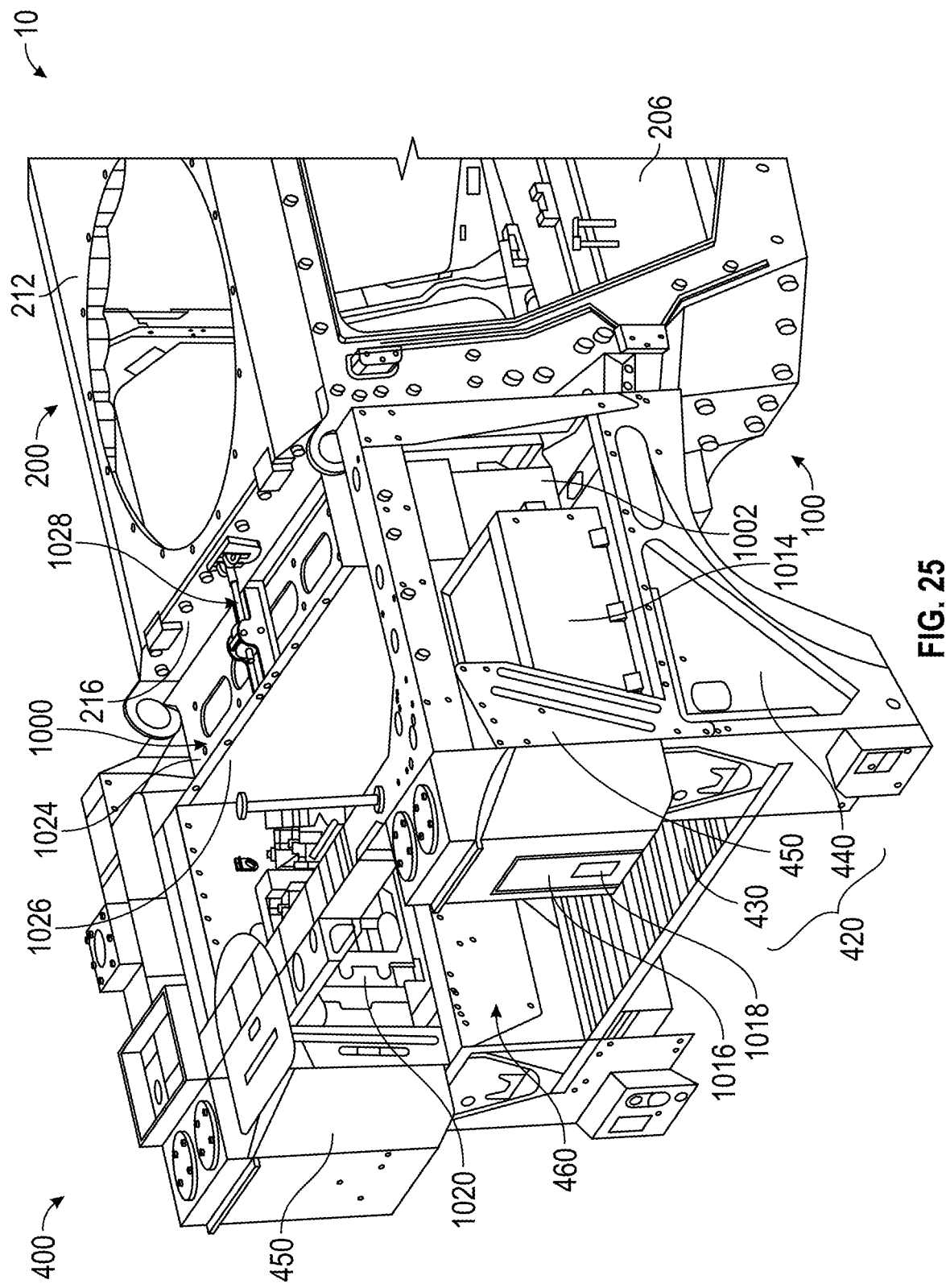
FIG. 25 is a rear perspective view of the vehicle of FIG. 1 including the ESS of FIG. 24, according to an exemplary embodiment.
Figure 26:
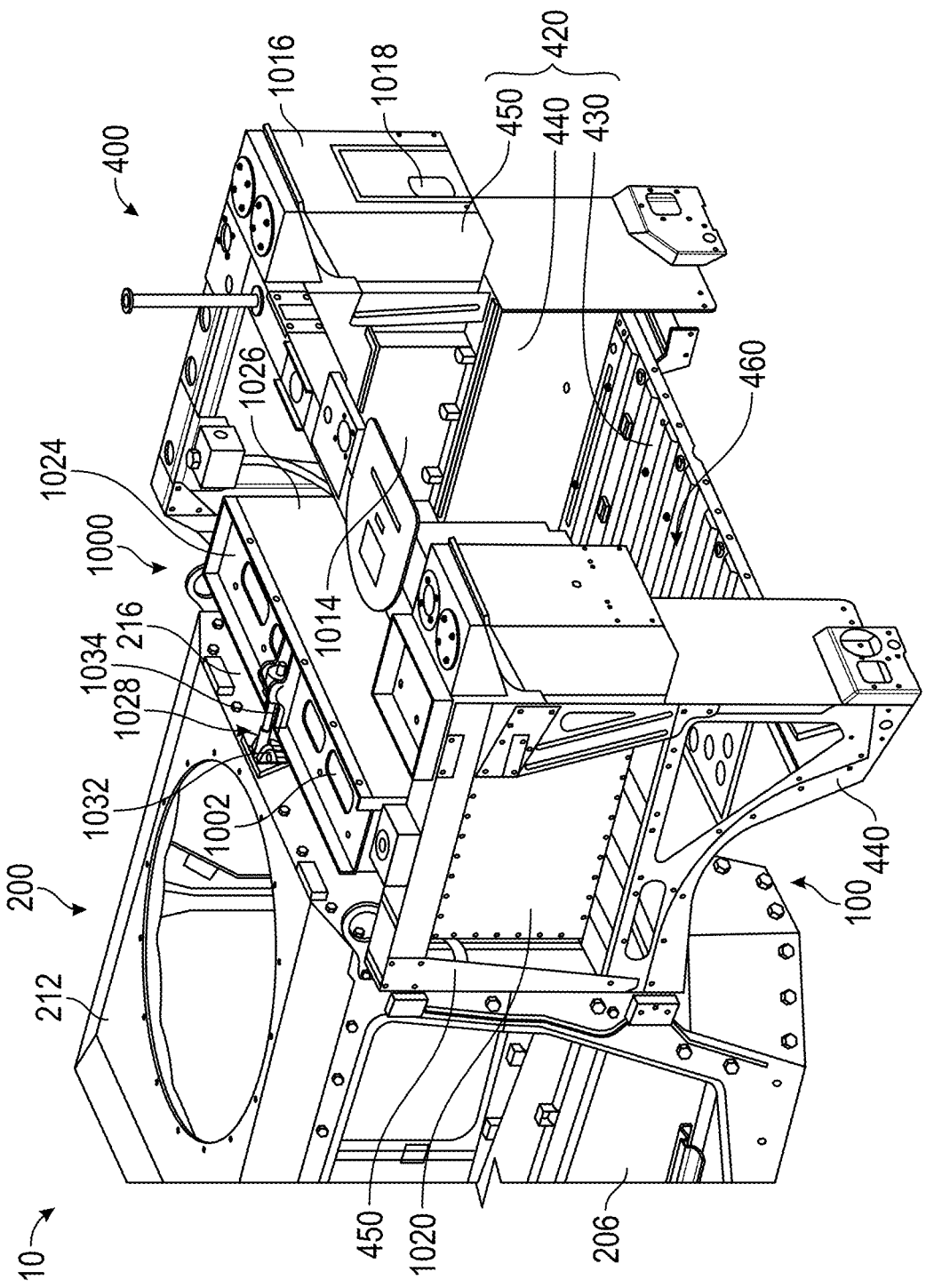
FIG. 26 is another rear perspective view of the vehicle of FIG. 25, according to an exemplary embodiment.

As shown in FIG. 25, power conversion hardware 1014 (e.g., a DC/DC converter) is coupled to the rear module 400 and structured to convert DC power received from either the IMG 700, the motor/generator 822, and/or the ESS 1000 and convert the DC power to power usable by the vehicle systems (e.g., 12 V, 24 V, and/or 48 V). A power panel 1016 is also coupled to the rear module 400 and provides a charging plug 1018 that can be used for plugging the ESS 1000 into an external power station for charging. Additionally, the power panel 1016 can include external power output that receive cords, plugs, or other power connections configured to provide power to external components and systems. An AC power system 1020 includes inverters that convert (i) available DC power from the IMG 700, the motor/generator 822, and/or the ESS 1000 into AC power for consumption by components of the vehicle 10 and/or external systems and/or (ii) AC power from the IMG 700 and/or the motor/generator 82 into DC power for consumption by components of the vehicle 10 and/or external systems. In some embodiments, the charging plug 1018 is an external plug positioned above the rear, driver side wheel well of the rear module 400.

The engine 610, the IMG 700, the motor/generator 822, the charge controller 1012, and the batteries 1008 are sized such that electrical power generation through engine drive of the IMG 700 and/or the motor/generator 822 of the FEAD 800 is greater than the power depletion through operation of the vehicle 10 in the silent mobility mode. In other words, the charge time through engine 610 generation of electrical power via the IMG 700 and/or the motor/generator 822 of the FEAD 800 is less than the depletion time in an electric vehicle drive mode (i.e., takes less time to charge than to deplete). The batteries 1008 can be charged in a first time by the motor generator (e.g., the motor generator 822 and/or the IMG 700). The batteries 1008 are depleted in the silent mobility mode in a second time. The first time is less than the second time. In some embodiments, the vehicle 10 is structured to operate in any combination of engine 610 powered, IMG 700 powered, motor/generator 822 powered, engine 610 charging the ESS 1000, etc. For example, a blended power mode can include propulsion of the vehicle 10 via both electrical power and engine generated power. The engine 610 can charge the ESS 1000 while the vehicle 10 is driving or stationary.

Between-the-Wheels Configuration

As shown in FIGS. 25-30, the ESS 1000 is mounted in the bed cavity 460 of the rear module 400 adjacent the rear wall 216 of the passenger capsule 200 in between the wheel wells 440. A bracket 1024 supports the ESS 1000 in position and includes a protective plate 1026 that shields the ESS 1000 from impact. The protective plate 1026 may surround the ESS 1000 to provide protection from vulnerable directions. The bracket 1024 may include a vibration damping material disposed between the bracket 1024, the protective plate 1026, and the ESS 1000 to inhibit vibrational transfer between the hull and frame assembly 100 and the ESS 1000. In some embodiments, the protective plate 1026 is formed from similar materials to the body or frame of the vehicle 10 to inhibit the intrusion of hostile fragments, blasts, or projectiles.

The bracket 1024 is mounted to the vehicle 10 with an upper isolator mount 1028 that is connected between the bracket 1024 and the passenger capsule 200. In some embodiments, the upper isolator mount 1028 is generally centered on the bracket 1024 and connected to the rear wall 216 of the passenger capsule 200. The upper isolator mount 1028 provides front-to-back vibration isolation relative to the passenger capsule 200. In some embodiments, the upper isolator mount 1028 includes a spring damper shock system coupled between the bracket 1024 and the passenger capsule 200. In some embodiments, the upper isolator mount 1028 includes a pneumatic damper or a hydraulic fluid damper. In some embodiments, the upper isolator mount 1028 is coupled between the bracket 1024 and another portion of the vehicle 10 and/or the hull and frame assembly 100. In some embodiments, the upper isolator mount 1028 includes a plate 1032 rigidly coupled to the passenger capsule 200 (e.g., by welding, fastening, etc.) and a rod 1034 coupled to the plate 1032 with a spherical rod end. The rod 1034 is fastened to the bracket 1024 using a nut, a weld, or a captured end. In some embodiments, the ESS 1000 includes a plurality of the upper isolator mounts 1028.

Figure 27:
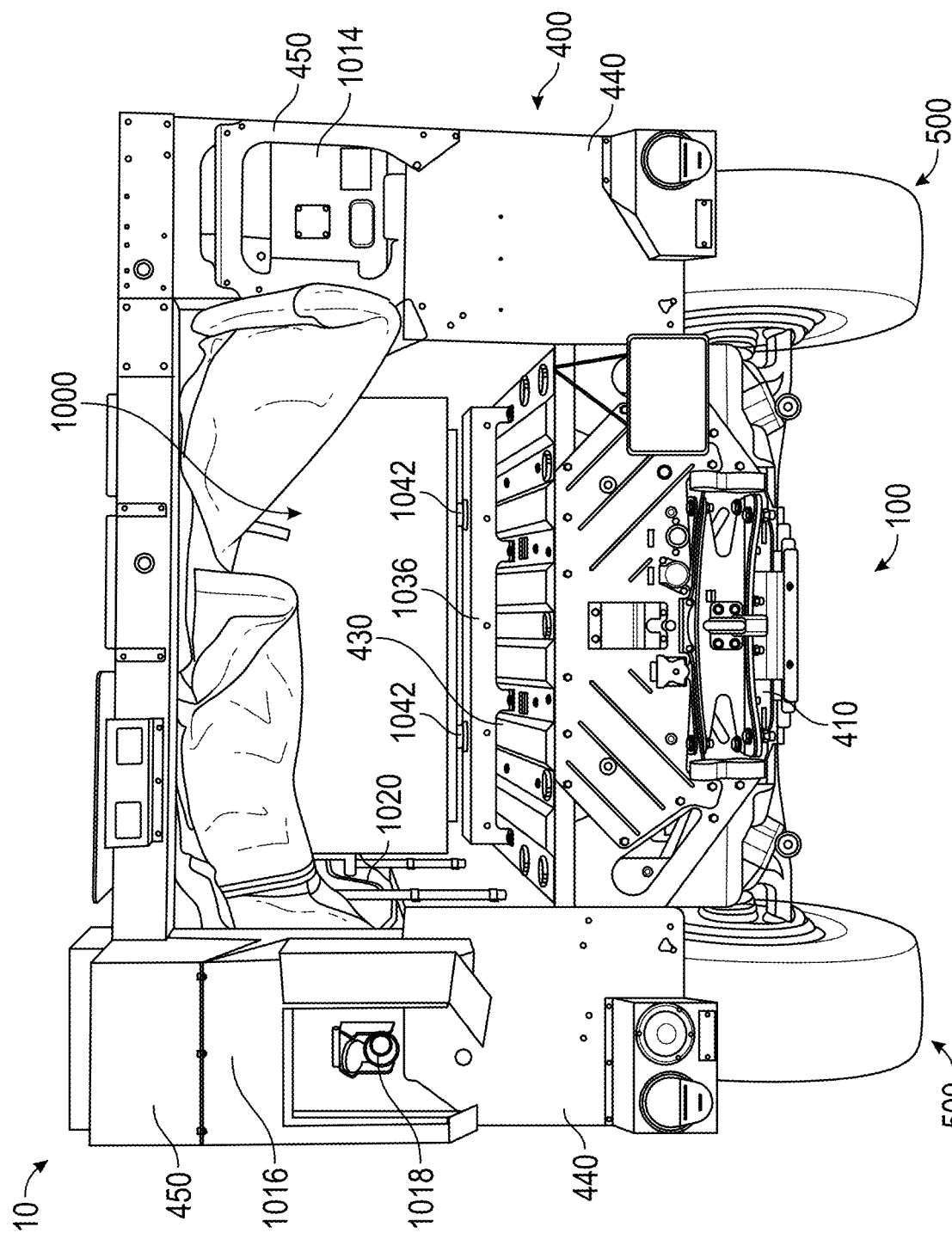
FIG. 27 is a rear view of the vehicle of FIG. 25 having a bed cavity, according to an exemplary embodiment.
Figure 28:
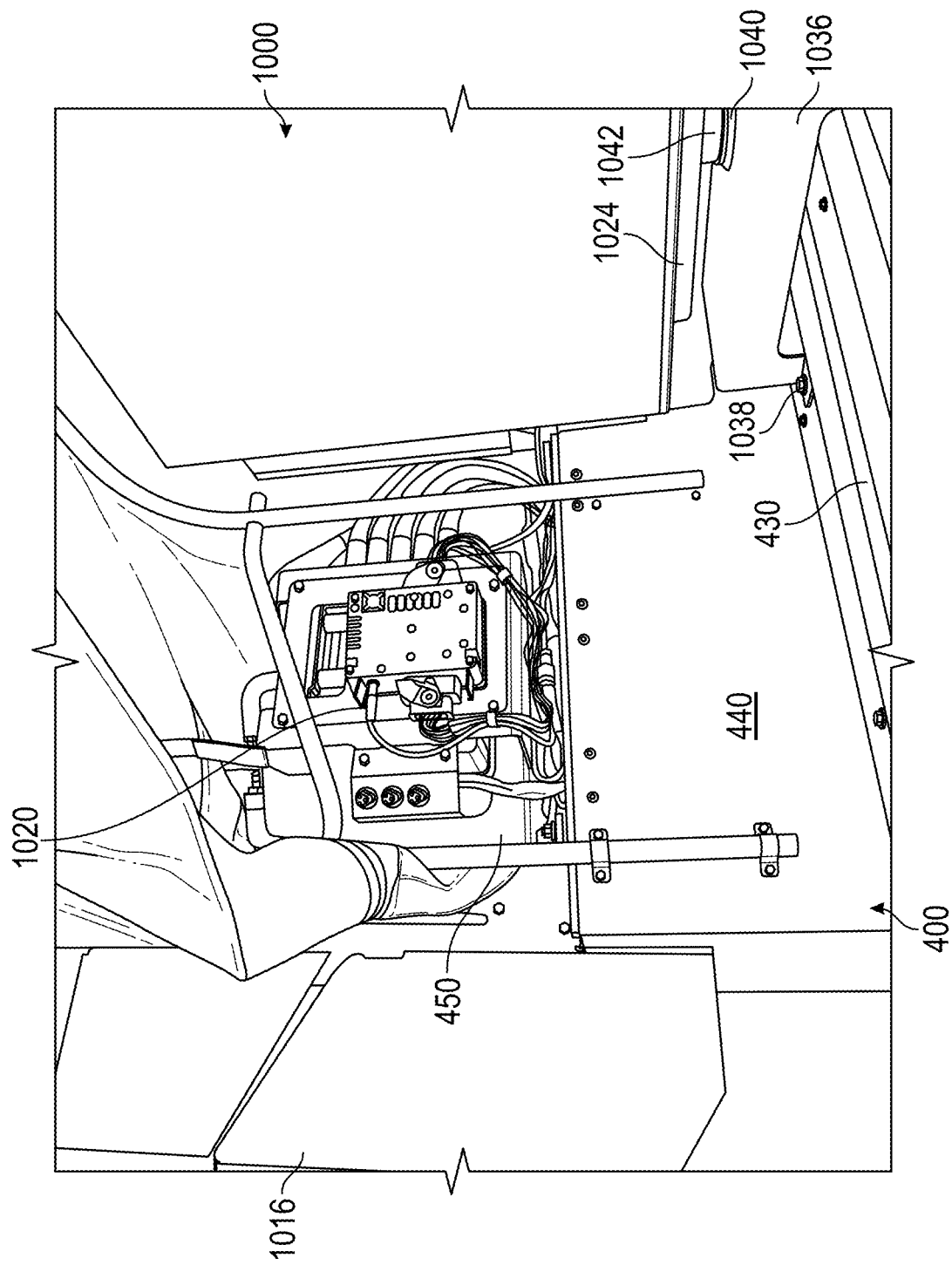
FIG. 28 is a detailed perspective view of the bed cavity of FIG. 27, according to an exemplary embodiment.
Figure 29:
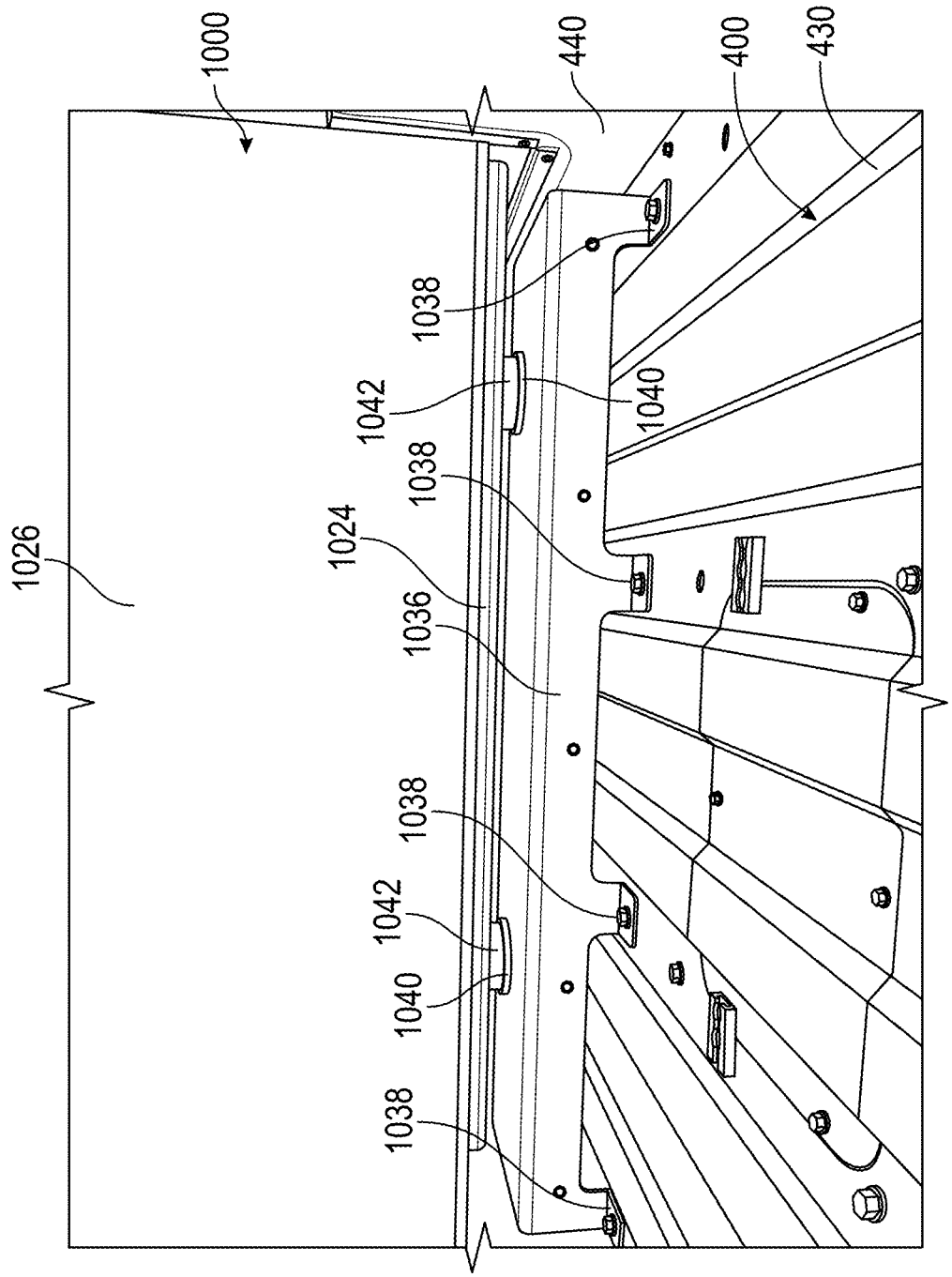
FIG. 29 is another detailed perspective view of the bed cavity of FIG. 27, according to an exemplary embodiment.
Figure 30:
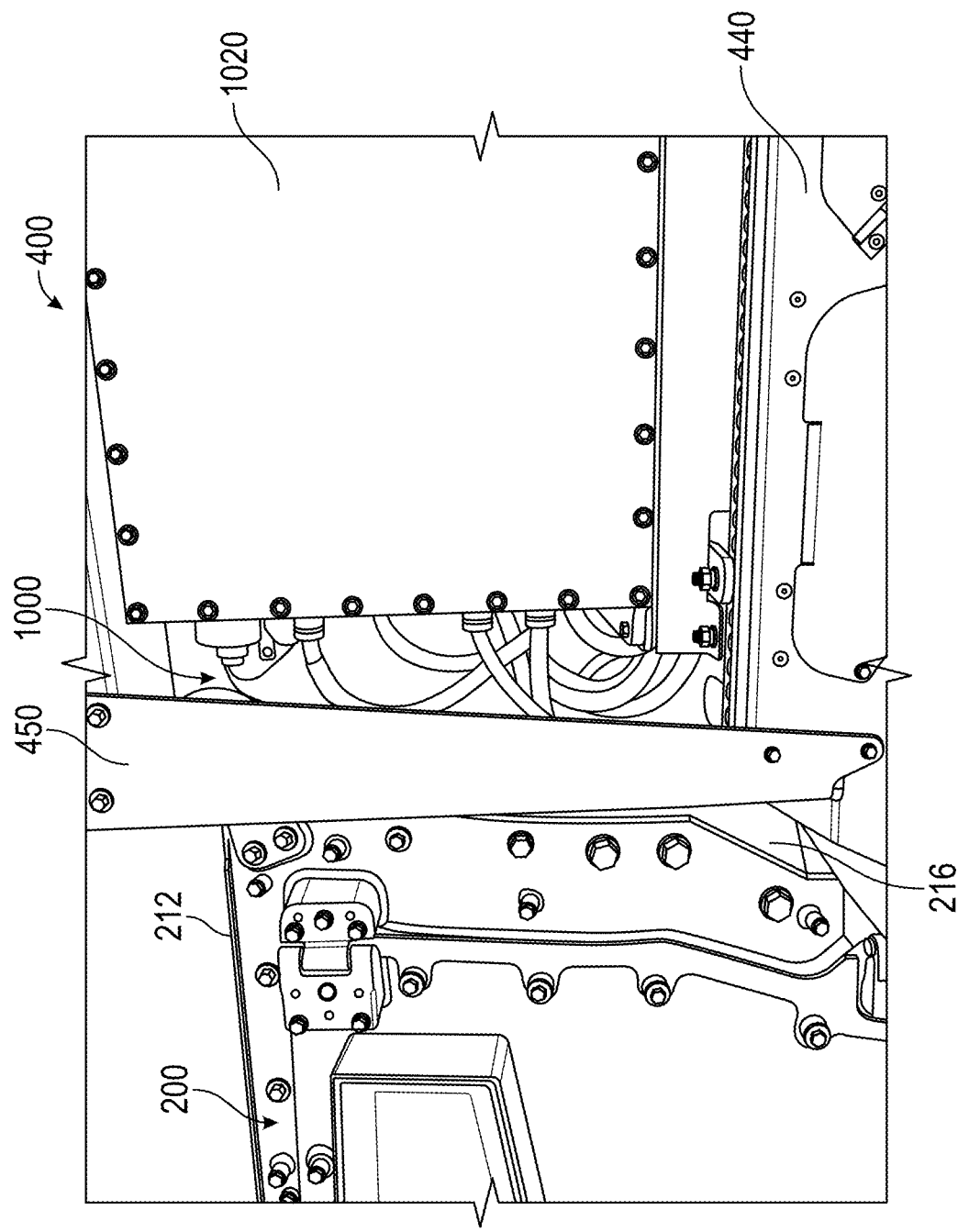
FIG. 30 is a detailed perspective view of a rear portion of the vehicle of FIG. 25, according to an exemplary embodiment.

As shown in FIGS. 27-29, a lower support 1036 is coupled to the bed 430. For example, four legs 1038 are coupled to the bed 430 using fasteners. In some embodiments, more than four or less than four legs 1038 are included. In some embodiments, the lower support 1036 is welded to the bed 430 or formed as a part of the bed 430. The lower support 1036 includes ESS mount structures in the form of recesses 1040 sized to receive lower isolator mounts 1042. In some embodiments, the recesses 1040 are circular and the lower isolator mounts 1042 are secured using adhesive. In some embodiments, the recesses are square, rectangular, oval, or another shape. In some embodiments, the lower isolator mounts 1042 are fastened to the recesses 1040, captured within the recesses 1040, or otherwise held in place between the bracket 1024 and the lower support 1036. As shown in FIG. 29, two lower isolator mounts 1042 are used to support the bracket 1024 on the lower support 1036. In some embodiments, more than two or less than two lower isolator mounts 1042 are included. In some embodiments, the lower isolator mounts 1042 are rubber or another vibration attenuating material. In some embodiments, the bracket 1024 is adhered, fastened to, captured by, or otherwise directly coupled to the lower isolator mounts 1042.

The upper isolator mount 1028 and the lower isolator mounts 1042 maintain the bracket 1024, and thereby the ESS 1000, in position relative to the passenger capsule 200 and the rear module 400 during use of the vehicle 10. The ESS 1000 is positioned within the rear module 400. The weight of the ESS 1000 is supported by the rear subframe 410. The ESS 1000 is centered between the wheel wells 440 within the bed cavity 460 and supported on top of the bed 430.

In some embodiments, the AC power system 1020 (e.g., a high voltage inverter) and power distribution components are positioned in or above driver side stowage box 450 above the rear, driver side wheel well 440 with cables running to through the tunnel slot 208 of the structural tunnel 206 to the IMG 700, the motor/generator 822 of the FEAD 800, and other high voltage components. The power conversion hardware 1014 (700V to 24V) is positioned in or above the passenger side stowage box 450 above the rear, passenger side wheel well 440 and cables run therefrom to low voltage components (e.g., cab electronics, etc.).

Over-the-Wheels Configuration

As shown in FIGS. 31 and 32, an ESS 1044 is structured to be supported above the wheel wells 440 of the rear module 400. In some embodiments, the ESS 1044 includes a first battery set 1046 positioned above a driver side wheel well 440 and/or a second battery set 1048 positioned above the passenger side wheel well 440. Each of the first battery set 1046 and the second battery set 1048 can include multiple batteries 1008 or multiple battery cells and be sized as discussed above in the cumulative (i.e., both battery sets) to provide the desired energy storage capacity.

The weight of the ESS 1044 is supported by the rear subframe 410. In some embodiments, the battery sets 1046, 1048 do not occupy space directly above the bed 430 or within the bed cavity 460. In some embodiments, the first battery set 1046 and/or the second battery set 1048 are additionally or alternatively positioned within the stowage boxes 450 above the wheel wells 440.

In some embodiments, the first battery set 1046 and the second battery set 1048 each include a housing 1050 having a curved surface 1052 shaped to conform to the wheel wells 440. The housing 1050 defines an internal volume sized to receive the batteries 1008. In some embodiments, the housing 1050 defines a rear portion 1054 with a substantially rectangular cross-section that is sized to accommodate one or more batteries 1008. In other words, the rear portion 1054 is positioned aft of the wheel well 440 and defines an area at least as big as a single battery 1008.

In some embodiments, the first battery set 1046 and the second battery set 1048 are fastened to the wheel wells 440. In some embodiments, the first battery set 1046 and the second battery set 1048 are formed as a part of the wheel wells 440 or the rear module 400 (e.g., the housing 1050 is formed as a part of the rear module 400). In some embodiments, the first battery set 1046 and the second battery set 1048 are held to the rear module 400 using brackets, welds, isolator mounts, vibrational dampers, or other rigid connections.

Under Cab Configuration

Figure 33:
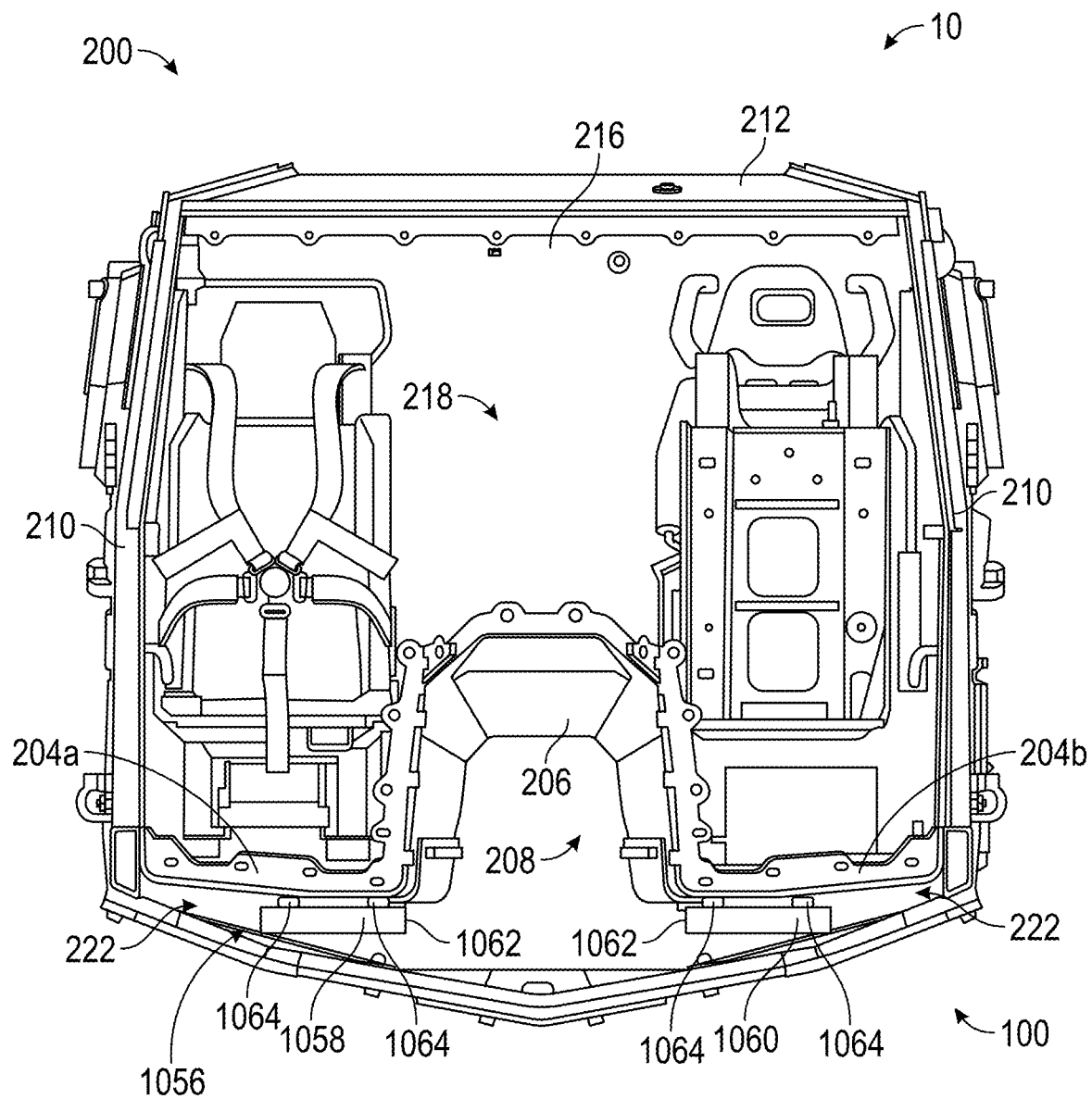
FIG. 33 is a section view of the vehicle of FIG. 1 including the ESS of FIG. 24, according to another exemplary embodiment.

As shown in FIG. 33, an ESS 1056 includes a first battery set 1058 and/or a second battery set 1060 coupled to the floor portions 204 of the passenger capsule 200 and positioned laterally outside of the structural tunnel 206 and spaced above the v-shaped belly deflector 220 within the air gap 222. Each of the first battery set 1058 and the second battery set 1060 includes a housing 1062 coupled to the floor portion 204 with isolator mounts 1064. In some embodiments, the housings 1062 are coupled to the v-shaped belly deflector 220 via isolator mounts in addition to, or as a replacement for, the isolator mounts 1064. In some embodiments, the housing 1062 includes a resilient bottom material to inhibit damage from impacts from below. For example, if the v-shaped belly deflector 220 is damaged, the housing 1062 can be structured to protect the ESS 1056 from damage. In some embodiments, the housing 1062 is formed from the same material as the v-shaped belly deflector 220. In some embodiments, the housing 1062 has a shape corresponding to the air gap 222 to substantially fill the air gap 222 and maximize the amount of battery capacity of the ESS 1056 within the air gap 222.

The weight of the ESS 1056 is carried by the hull and frame assembly 100 and/or the passenger capsule 200. In some embodiments, the weight of the ESS 1056 is supported by the floor portion 204 of the passenger capsule 200. Each of the first battery set 1058 and the second battery set 1060 can include multiple batteries 1008 or multiple battery cells and be sized as discussed above in the cumulative (i.e., both battery sets) to provide the desired energy storage capacity.

The position of the ESS 1056 below the floor portion 204 provides a low center of gravity. In some embodiments, the weight of the ESS 1056 is substantially all below the natural center of gravity of the vehicle 10 and the addition of the ESS 1056 lowers the center of gravity of the vehicle 10. In some embodiments, the ESS 1056 extends longitudinally along the length of the passenger capsule 200 and provides fore-aft stability ballast.

Extended Wheelbase Configuration

Figure 34:
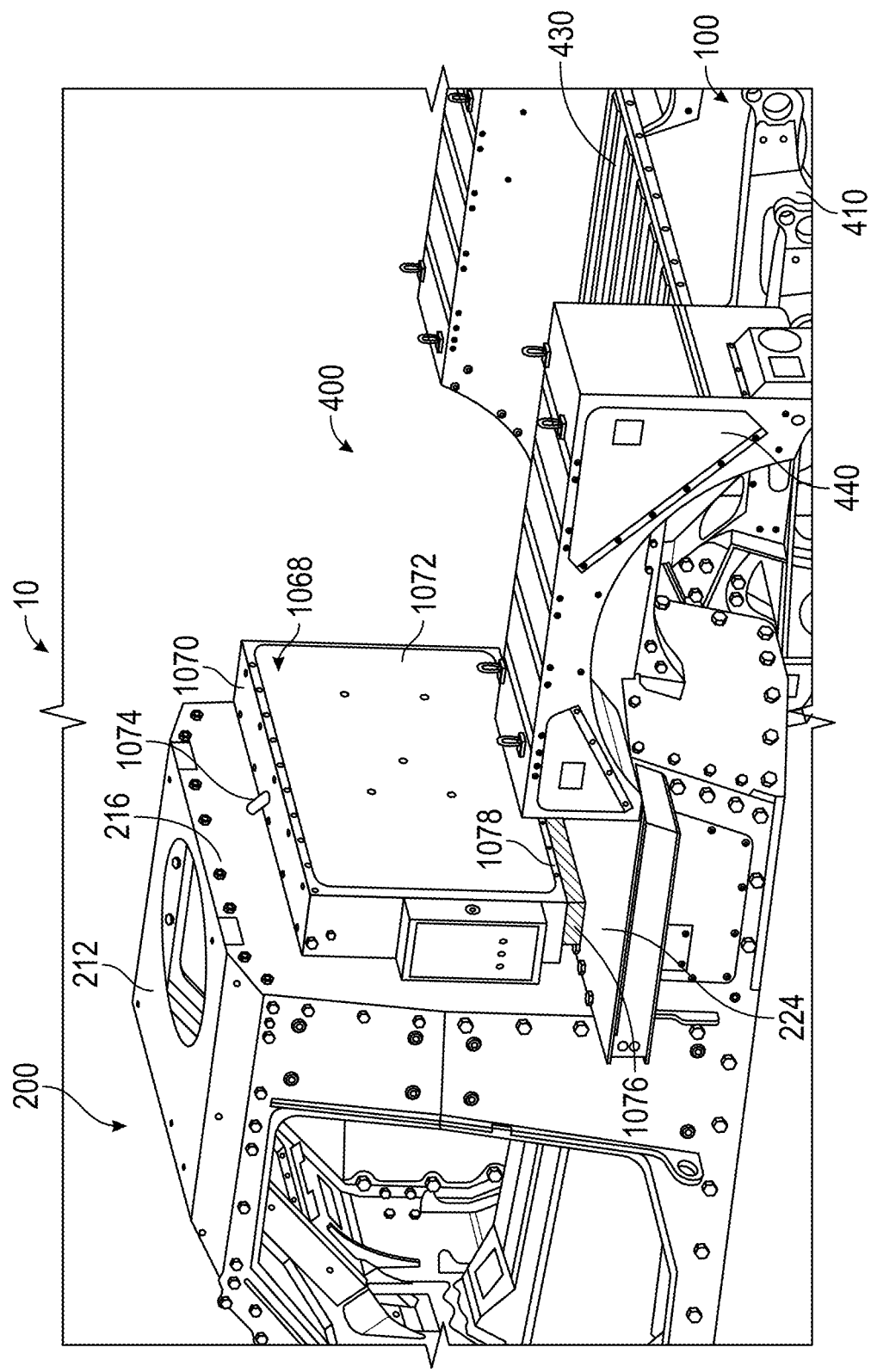
FIG. 34 is a perspective view of the vehicle of FIG. 8 including the ESS of FIG. 24, according to an exemplary embodiment.
Figure 35:
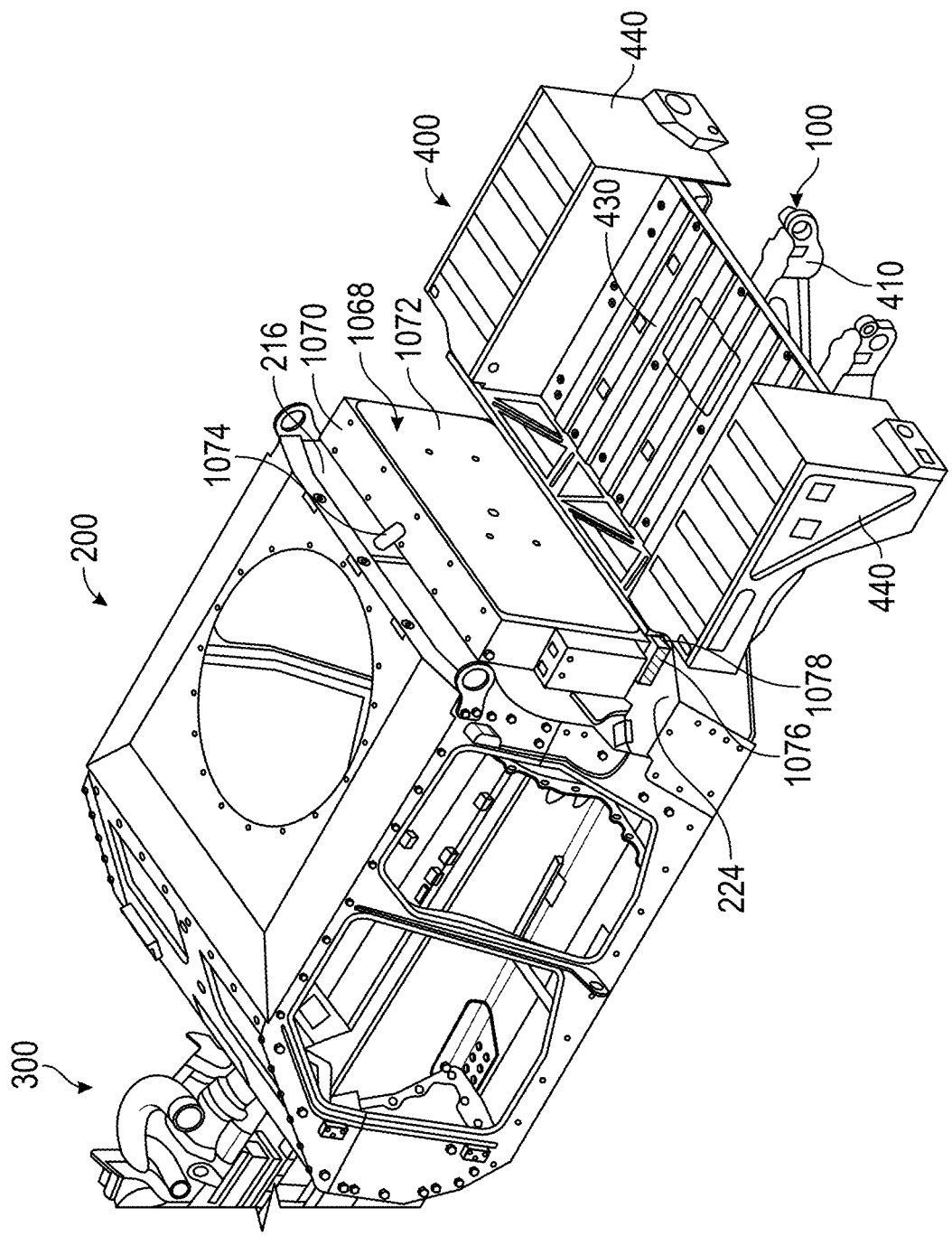
FIG. 35 is a perspective view of the vehicle of FIG. 7 including the ESS of FIG. 24, according to an exemplary embodiment.

As shown in FIGS. 34 and 35, an ESS 1068 is mounted on the capsule extension 224 of the passenger capsule 200 in between the rear wall 216 of the passenger capsule 200 and in front of the cargo body assembly 420. In some embodiments, a bracket 1070 supports the ESS 1068 in position and includes a protective plate 1072 that shields the ESS 1068 from impact. The protective plate 1072 may surround the ESS 1068 to provide protection from vulnerable directions (e.g., the rear and sides). The bracket 1070 may include a vibration damping material disposed between the bracket 1070, the protective plate 1072, and the ESS 1068 to inhibit vibrational transfer between the hull and frame assembly 100 and the ESS 1068. In some embodiments, the protective plate 1072 is formed from, similar materials to the body or frame of the vehicle 10 to inhibit the intrusion of hostile fragments, blasts, or projectiles.

The bracket 1070 is mounted to the vehicle 10 with an upper isolator mount 1074 that is connected between the bracket 1070 and the passenger capsule 200. In some embodiments, the upper isolator mount 1074 is generally centered on the bracket 1070 and connected to the rear wall 216 of the passenger capsule 200. The upper isolator mount 1074 provides front-to-back vibration isolation relative to the passenger capsule 200. In some embodiments, the upper isolator mount 1074 includes a spring damper shock system coupled between the bracket 1070 and the passenger capsule 200. In some embodiments, the upper isolator mount 1074 includes a pneumatic damper or a hydraulic fluid damper. In some embodiments, the upper isolator mount 1074 is coupled between the bracket 1070 and another portion of the vehicle 10 and/or the hull and frame assembly 100. In some embodiments, the upper isolator mount 1074 includes a plate rigidly coupled to the passenger capsule 200 (e.g., by welding, fastening, etc.) and a rod coupled to the plate with a spherical rod end. The rod is fastened to the bracket 1070 using a nut, a weld, or a captured end. In some embodiments, the ESS 1068 includes a plurality of the upper isolator mounts 1074.

A lower support 1076 is coupled to the capsule extension 224. For example, four legs are coupled to the capsule extension 224 using fasteners. In some embodiments, more than four or less than four legs are included. In some embodiments, the lower support 1076 is welded to the capsule extension 224 or formed as a part of the capsule extension 224. The lower support 1076 includes ESS mount structures in the form of recesses sized to receive lower isolator mounts 1078. In some embodiments, the recesses are circular and the lower isolator mounts 1078 are secured therein using adhesive. In some embodiments, the recesses are square, rectangular, oval, or another shape. In some embodiments, the lower isolator mounts 1078 are fastened to the recesses, captured within the recesses, or otherwise held in place between the bracket 1070 and the lower support 1076. In some embodiments, two lower isolator mounts 1078 are used to support the bracket 1070 on the lower support 1076. In some embodiments, more than two or less than two lower isolator mounts 1078 are included. In some embodiments, the lower isolator mounts 1078 are rubber or another vibration attenuating material. In some embodiments, the bracket 1070 is adhered, fastened to, captured by, or otherwise directly coupled to the lower isolator mounts 1078.

The upper isolator mount 1074 and the lower isolator mounts 1078 maintain the bracket 1070, and thereby the ESS 1068, in position relative to the passenger capsule 200 and the rear module 400, and on the capsule extension 224 during use of the vehicle 10. The ESS 1068 is positioned outside the rear module 400 (and the bed cavity 460 thereof) and is supported by the passenger capsule 200 and the hull and frame assembly 100. The weight of the ESS 1068 is supported by the capsule extension 224. The ESS 1068 may be centered between the wheel wells 440 or extend beyond the wheel wells 440.

In some embodiments, the extended wheel base utilizing the capsule extension 224 provides a fifteen inch gap between rear wall 216 and the rear module 400. In other words, the capsule extension 224 has a longitudinal length of at least fifteen inches. In some embodiments, the longitudinal length of the capsule extension 224 is less than or greater than fifteen inches. The longitudinal length of the capsule extension 224 accommodates the ESS 1068. In other words, the thickness of the ESS 1068 is equal to or less than the longitudinal length of the capsule extension 224.

The position of the ESS 1068 on the capsule extension 224 forward of the rear module 400 moves the center of gravity of the vehicle 10 toward to true center of the vehicle 10 and can improve handling characteristics of the vehicle 10 and overall vehicle stability. Additionally, the ESS 1068 is not positioned within the bed cavity 460 thereby providing a larger storage capacity of the rear module 400.

False Floor Configuration

Figure 36:
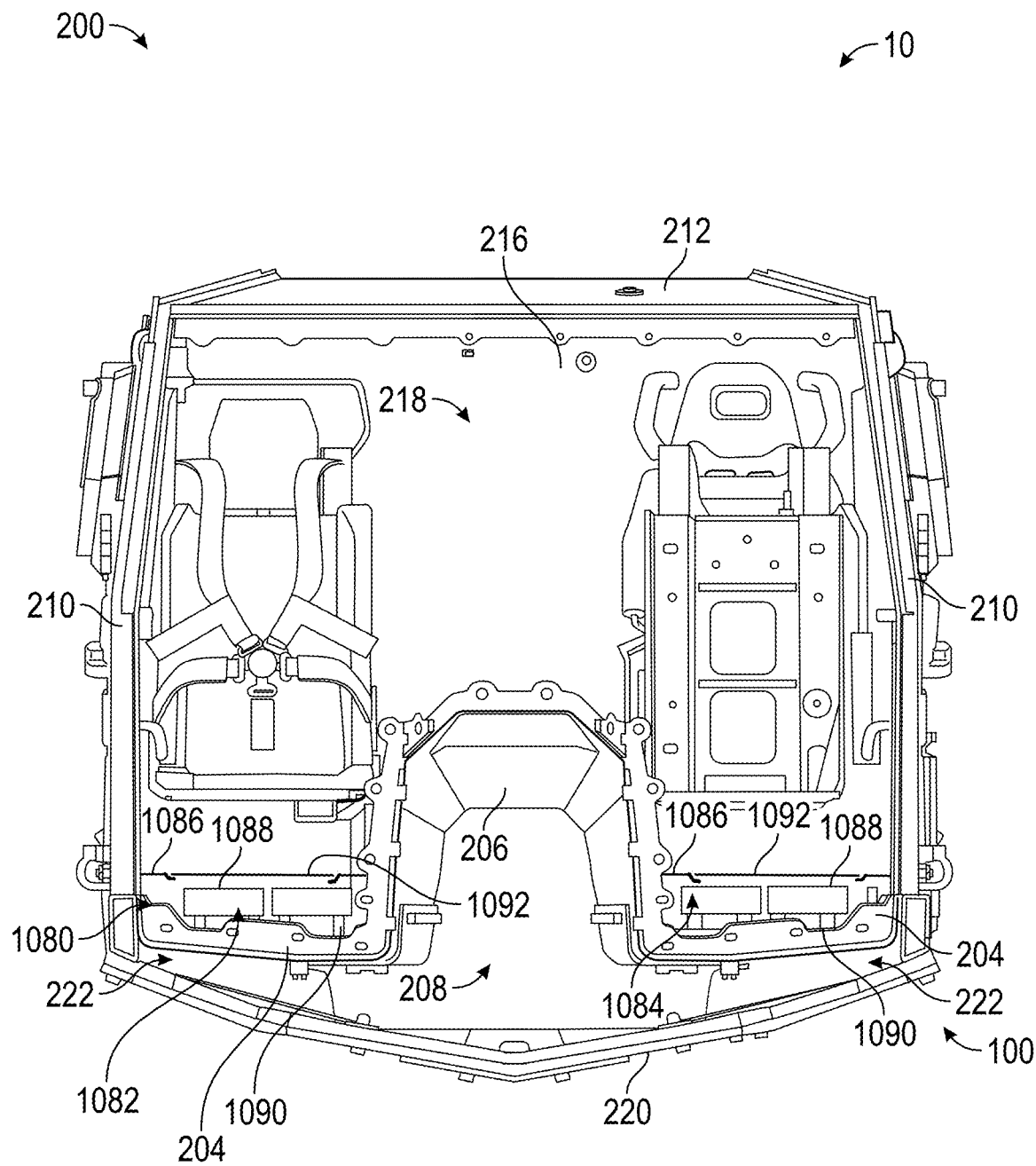
FIG. 36 is a section view of the vehicle of FIG. 1 including the ESS of FIG. 24, according to another exemplary embodiment.

As shown in FIG. 36, an ESS 1080 includes a first battery set 1082 and/or a second battery set 1084 coupled to the floor portions 204 of the passenger capsule 200 laterally outside of the structural tunnel 206 and spaced above the floor portions 204 and under a false floor 1086. Each of the first battery set 1082 and the second battery set 1084 includes a housing 1088 coupled top the floor portion 204 with isolator mounts 1090. In some embodiments, the housings 1088 are coupled to the false floor 1086 via isolator mounts in addition to, or as a replacement for, the isolator mounts 1090. In some embodiments, the housing 1088 is formed from the same material as the v-shaped belly deflector 220 and/or the floor portion 204.

The false floor 1086 includes a door or removable panel 1092 that provides access to the ESS 1080 from within the passenger compartment 218 of the passenger capsule 200. In some embodiments, the removable panel 1092 is a plate that is fastened in place. In some embodiments, the removable panel 1092 is hingedly coupled to the false floor 1086. In some embodiments, the removable panel 1092 is locked in place with a key.

The weight of the ESS 1080 is carried by the hull and frame assembly 100 and/or the passenger capsule 200. In some embodiments, the weight of the ESS 1080 is supported by the floor portion 204 of the passenger capsule 200. Each of the first battery set 1082 and the second battery set 1084 can include multiple batteries 1008 or multiple battery cells and be sized as discussed above in the cumulative (i.e., both battery sets) to provide the desired energy storage capacity.

The position of the ESS 1080 adjacent the floor portion 204 provides a low center of gravity. In some embodiments, the weight of the ESS 1080 is substantially all below the natural center of gravity of the vehicle 10 and the addition of the ESS 1080 lowers the center of gravity of the vehicle 10. In some embodiments, the ESS 1080 extends longitudinally along the length of the passenger capsule 200 and provides fore-aft stability ballast.

In some embodiments, the ESS 1000, the ESS 1044, the ESS 1056, the ESS 1068, and/or the ESS 1080 are used in combination.

Controls

Figure 37:
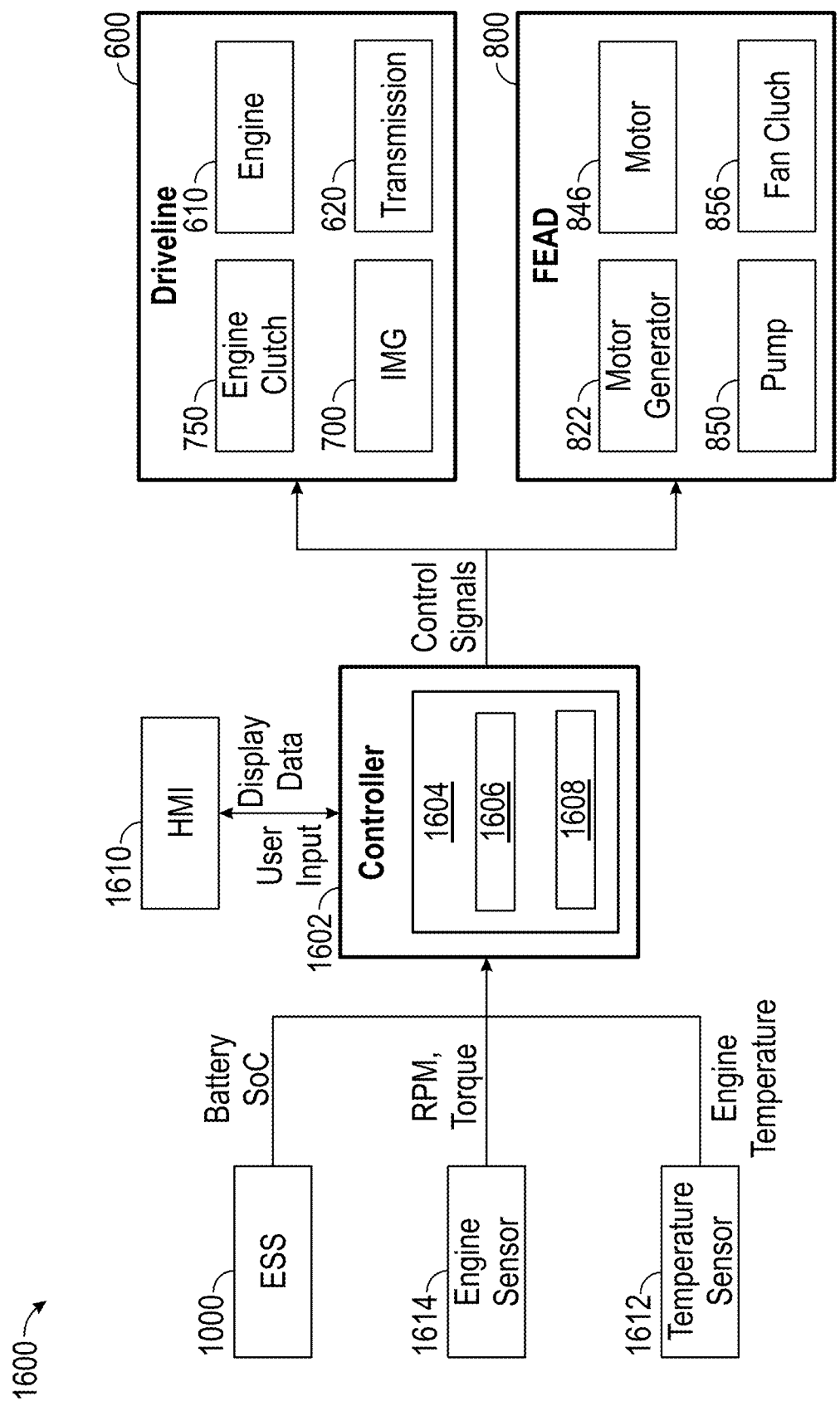
FIG. 37 is a block diagram of a control system for the vehicle of FIG. 1, according to an exemplary embodiment.
Figure 38:
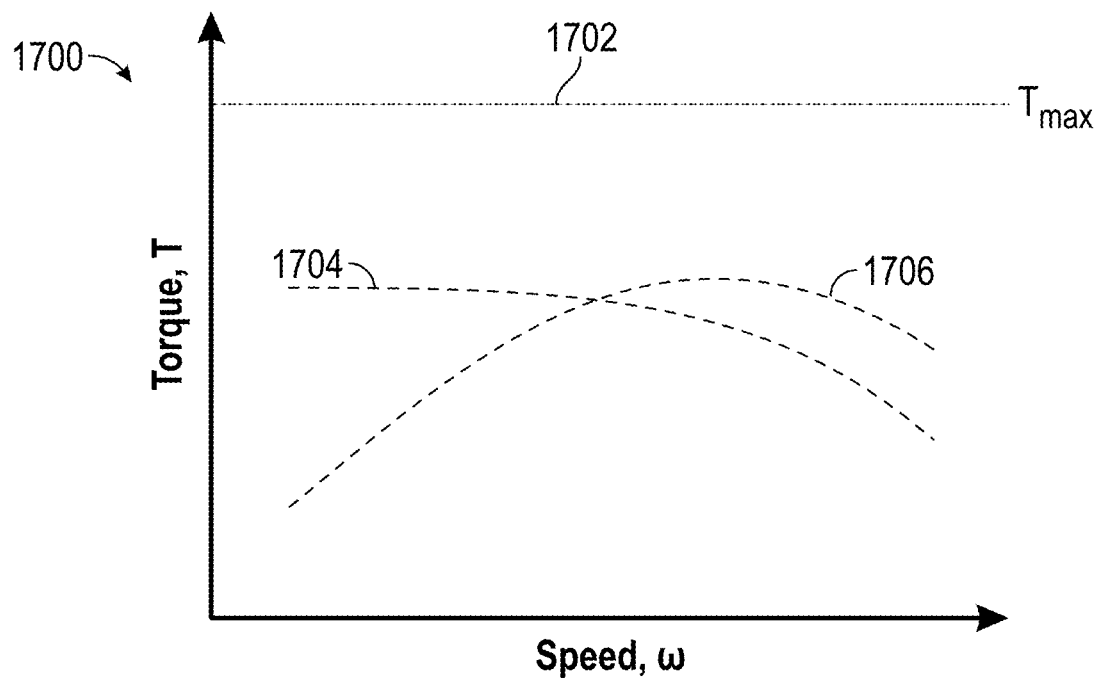
FIG. 38 is a graph showing torque versus speed for an internal combustion engine and an electric motor, the graph including a maximum torque as defined by a transmission of the driveline of FIG. 9, according to an exemplary embodiment.
Figure 39:
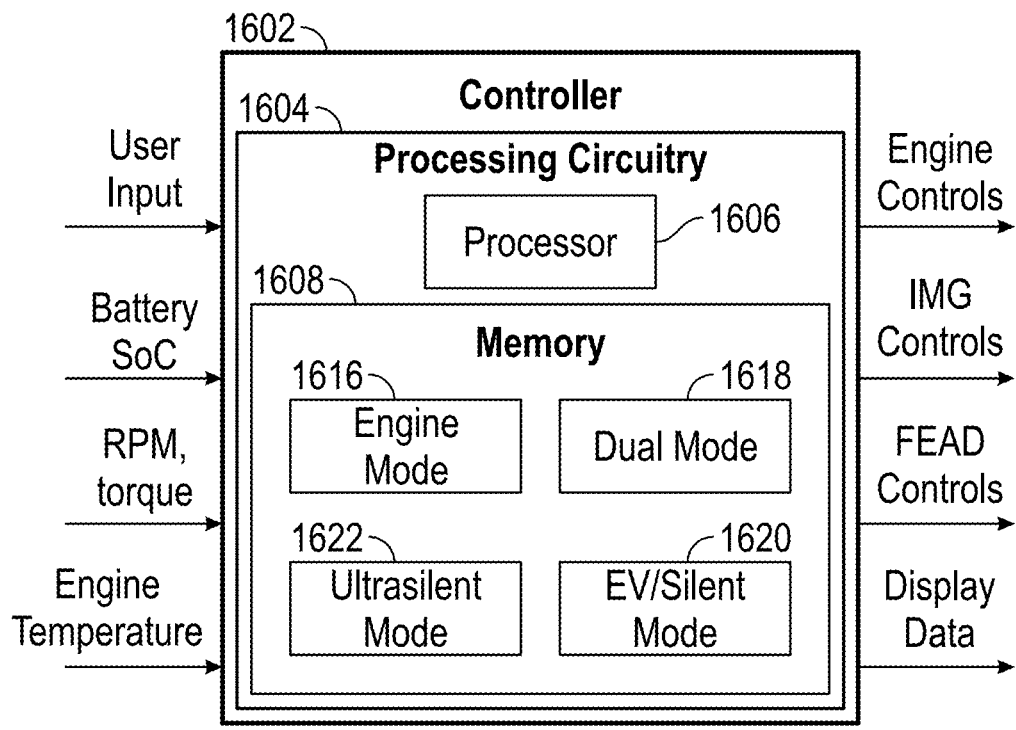
FIG. 39 is a block diagram of a controller of the control system of FIG. 37, according to an exemplary embodiment.

Referring to FIGS. 37-39, the vehicle 10 can include a control system 1600 for controlling the vehicle 10 or systems of the vehicle 10 between and according to different modes of operation. In some embodiments, the vehicle 10 is operable in an engine mode, a dual-drive mode, an EV/silent mode, and/or an ultrasilent mode. The control system 1600 includes a controller 1602 configured to transition the vehicle 10 between the different modes. According to exemplary embodiment, the control system 1600 is configured to provide control signals to the driveline 600 (e.g., the engine 610, the transmission 620, the IMG 700, the FEAD 800, etc.) to transition the driveline 600 and the FEAD 800 between the different modes.

As shown in FIG. 37, the control system 1600 includes the controller 1602, an operator interface, shown as human machine interface ("HMI") 1610, the ESS 1000 (and/or sensors or controllers of the ESS 1000), a temperature sensor 1612, and an engine sensor 1614. The ESS 1000 is configured to provide detected battery SoC of batteries or energy storage devices of the ESS 1000 to the controller 1602. The engine sensor 1614 can be a sensor of the engine 610, feedback from a controller of the engine 610, etc. to provide current speed $\omega$ of the engine 610 (e.g., revolutions per minute "RPM") and/or current torque $\tau$ of the engine 610. The temperature sensor 1612 is configured to provide a detected, measured, or sensed temperature of the engine 610 and/or of other components of the vehicle 10 (e.g., the ESS 1000, the transmission 620, etc.) to the controller 1602. The HMI 1610 is configured to receive a user input and provide the user input to the controller 1602 (e.g., a selection of a specific mode). The controller 1602 is configured to use any of the battery SoC, the current speed ω of the engine 610, the current torque τ of the engine 610, the temperature of the engine 610 (or other components), and/or the user input to transition the vehicle 10 (e.g., the driveline 600 and the FEAD 800) between the different modes, and to operate the vehicle 10 (e.g., the driveline 600 and the FEAD 800) according to the different modes. The HMI 1610 can be positioned within the passenger compartment 218 of the passenger capsule 200 of the vehicle 10.

As shown in FIGS. 37 and 39, the controller 1602 includes a processing circuit 1604 including a processor 1606 and memory 1608. The processing circuit 1604 can be communicably connected to a communications interface such that the processing circuit 1604 and the various components thereof can send and receive data via the communications interface. The processor 1606 can be implemented as a general purpose processor, an application specific integrated circuit ("ASIC"), one or more field programmable gate arrays ("FPGAs"), a group of processing components, or other suitable electronic processing components.

The memory 1608 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 1608 can be or include volatile memory or non-volatile memory. The memory 1608 can include database components, object code components, script components, or any other type of information structure for supporting the various activities and information structures described in the present application. According to some embodiments, the memory 1608 is communicably connected to the processor 1606 via the processing circuit 1604 and includes computer code for executing (e.g., by the processing circuit 1604 and/or the processor 1606) one or more processes described herein.

As shown in FIG. 39, the memory 1608 includes an engine mode 1616, a dual-drive mode 1618, an EV/silent mode 1620, and an ultrasilent mode 1622, according to an exemplary embodiment. The processing circuit 1604 is configured to transition between the different modes and operate the vehicle 10 according to an active one of the engine mode 1616, the dual-drive mode 1618, the EV/silent mode 1620, or the ultrasilent mode 1622. The controller 1602 may transition between the modes in response to a user input, or at least partially automatically (e.g., based on sensor data). The controller 1602 generates engine control signals for the engine 610, the engine clutch 750, and/or the transmission 620, IMG control signals for the IMG 700, FEAD control signals for the FEAD 800 or controllable components thereof, and display data for the HMI 1610 according to the active one of the modes 1616-1622. The HMI 1610 can be or include any of a display screen, a touch screen, input buttons, levers, a steering wheel, a joystick, alert lights, alert speakers, etc., or any other component configured to facilitate input of data from the user to the controller 1602 or output of data from the controller 1602 to the HMI 1610.

Engine Mode

According to an exemplary embodiment, the control system 1600 is configured to operate the vehicle 10 according to the engine mode 1616. In some embodiments, the controller 1602 transitions the vehicle 10 into the engine mode 1616 when a user input is received from the HMI 1610 to operate the vehicle 10 according to the engine mode 1616. In some embodiments, the engine mode 1616 is a default mode of operation of the vehicle 10.

When the vehicle 10 is operated by the controller 1602 according to the engine mode 1616, control signals are generated by the controller 1602 and provided to the driveline 600 so that the engine 610 operates to drive the driveline 600 through the IMG 700 and the transmission 620. The controller 1602 can also provide control signals to the IMG 700 so that the IMG 700 functions as a generator, is driven by the engine 610, and generates electrical energy that is provided to the ESS 1000 for storage, and/or provided to electrical components of the vehicle 10 for consumption. The engine 610 also drives the FEAD 800 in the engine mode 1616, according to some embodiments. In some embodiments, in the engine mode 1616, the controller 1602 is configured to provide control signals to the motor/generator 822 of the FEAD 800 such that the motor/generator 822 functions as a generator and is driven by the engine 610. The motor/generator 822 of the FEAD 800 generates electrical energy when driven by the engine 610 and provides the electrical energy to the ESS 1000 for storage and later use, and/or provides the electrical energy to electrical components of the vehicle 10 for consumption. In the engine mode 1616, the engine 610 may therefore drive the IMG 700, the FEAD 800, and/or the transmission 620. The engine 610 drives the axle assemblies 500 or tractive elements thereof by driving the transmission 620.

The engine 610 drives the FEAD 800 and the accessories of the FEAD 800 (e.g., the hydraulic pump 832, the air compressor 808, the fan 810, the motor/generator 822). The engine 610 may also selectively drive the fan 810 through selective engagement of the fan clutch 856. In some embodiments, the controller 1602 is configured to use the engine temperature from the temperature sensor 1612 to transition the fan clutch 856 between an engaged state and a disengaged state. For example, when the engine temperature exceeds a predetermined value, the controller 1602 may transition the fan clutch 856 into the engaged state so that the fan 810 is driven by the engine 610 to cool the engine 610 (and/or other components of the vehicle 10). When the engine temperature decreases below another predetermined temperature, the controller 1602 can generate control signals for the fan clutch 856 to transition the fan clutch 856 into the disengaged state. In some embodiments, the controller 1602 is configured to operate the HMI 1610 to provide an alert or display to the user that the fan clutch 856 is about to be actuated to the engaged state. In some embodiments, the controller 1602 operates the HMI 1610 to display a current status of the fan clutch 856.

Dual-Drive Mode

According to an exemplary embodiment, the controller 1602 is configured to transition the vehicle 10 into the dual-drive mode 1618 and operate the vehicle 10 according to the dual-drive mode 1618. In another embodiment, the controller 1602 does not include the dual-drive mode 1618. In the dual-drive mode 1618, both the engine 610 and the IMG 700 operate to provide torque to tractive elements of the vehicle 10 through the transmission 620. The engine 610 and the IMG 700 can both operate to provide a maximum torque to the transmission 620 as defined by specifications or ratings of the transmission 620. In the dual-drive mode 1618, the IMG 700 and the engine 610 cooperatively operate to drive the driveline 600.

As shown in FIG. 38, a graph 1700 illustrates a maximum allowable torque 1702, an electric motor torque speed curve 1704, and an engine torque speed curve 1706. The maximum allowable torque 1702 is defined by a rating or capability of the transmission 620. When the vehicle 10 is in the dual-drive mode 1618, the controller 1602 is configured to (i) monitor torque and speed of the engine 610 (e.g., as provided by the engine sensor 1614, a defined by a predetermined torque-speed curve for the engine 610, etc.) and (ii) determine, based on the maximum allowable torque 1702 (e.g., based on a comparison between the current torque of the engine 610 and the maximum allowable torque 1702), an additional amount of torque that can be supported by the transmission 620. If the transmission 620 can support additional torque, the controller 1602 is configured to operate the IMG 700 (e.g., by generating and providing control signals to the IMG 700) to provide additional torque to the transmission 620. In some embodiments, the controller 1602 is configured to operate the IMG 700 to provide additional torque so that a combined torque output by the IMG 700 and the engine 610 is equal to or less than the maximum allowable torque 1702 supported by the transmission 620.

The dual-drive mode 1618 can be similar to the engine mode 1616 but with the additional torque provided to the transmission 620 by the IMG 700 (e.g., with the IMG 700 operating as an electric motor). In some embodiments, the IMG 700 and the engine 610 both operate to provide combined torque to the transmission 620 at a same speed. In some embodiments, the speeds of the IMG 700 and the engine 610 are different.

Advantageously, the dual-drive mode 1618 can be used when the vehicle 10 climbs a hill, when the vehicle 10 is under enemy fire, etc. to provide enhanced acceleration and gradeability. In some embodiments, the dual-drive mode 1618 includes operating the engine 610 and the IMG 700 cooperatively to consistently (e.g., over time, or when the dual-drive mode 1618 is active) provide the maximum allowable torque 1702 to the transmission 620. In some embodiments, the controller 1602 is configured to transition the vehicle 10, or more specifically the driveline 600, into the dual-drive mode 1618 in response to a user input received via the HMI 1610. In some embodiments, the controller 1602 is configured to automatically transition the driveline 600 into the dual-drive mode 1618 in response to sensor data indicating a slope, tilt, roll, or angle of the vehicle 10 (e.g., to detect when the vehicle 10 is climbing a hill and additional or assisting torque from the IMG 700 may be advantageous).

Silent Mode

According to an exemplary embodiment, the controller 1602 includes the EV/silent mode 1620 and is configured to operate the driveline 600 according to the EV/silent mode 1620 in response to receiving a user input from the HMI 1610 to operate according to the EV/silent mode 1620. In the EV/silent mode 1620, the controller 1602 is configured to generate control signals for the engine 610 and provide the control signals to the engine 610 to shut off the engine 610. Advantageously, shutting off the engine 610 reduces a sound output of the vehicle 10 to facilitate substantially quieter operation of the vehicle 10. When the engine 610 is shut off, the driveline 600 (e.g., tractive elements of the axle assemblies 500) is driven by the IMG 700. The IMG 700 can function as an electric motor, consuming electrical energy from the ESS 1000 to drive the vehicle 10 (e.g., for transportation of the vehicle 10). Advantageously, shutting off the engine 610 also reduces a thermal signature of the vehicle 10 to facilitate concealment or harder thermal detection of the vehicle 10.

In the EV/silent mode 1620, the FEAD 800 is driven by the motor/generator 822 as described in greater detail above with reference to FIGS. 15-19. Shutting off the engine 610, driving the transmission 620 with the IMG 700, and driving the FEAD 800 with the motor/generator 822 can reduce an operational sound level of the vehicle 10 (relative to the engine mode 1616) by a significant amount. By way of example, Applicant performed a drive-by test in the engine mode and the silent mode, which resulted in about a 25 decibels (dB) reduction in sound when switching from the engine mode to the silent mode. The fan 810 and fan clutch 856 can be operated based on the temperature received from the temperature sensor 1612 as described in greater detail above with reference to the engine mode 1616. In some embodiments, the controller 1602 is configured to monitor the battery SoC of the ESS 1000 to determine an amount of energy remaining and an estimated remaining runtime of the vehicle 10 in the EV/silent mode 1620. In some embodiments, when the SoC of the ESS 1000 reduces to or below a first threshold, the controller 1602 operates the HMI 1610 to provide a warning to the user regarding the SoC of the ESS 1000. In some embodiments, the controller 1602 is configured to monitor electrical energy consumption or a rate of energy consumption of the ESS 1000 during the EV/silent mode 1620 to determine an estimated amount of runtime remaining for the vehicle 10 in the EV/silent mode 1620. In some embodiments, when the SoC of the ESS 1000 reduces to a minimum allowable level (e.g., 20% SoC), the controller 1602 is configured to automatically transition the vehicle 10 into the engine mode 1616 (e.g., starting the engine 610 by engaging the engine clutch 750). In some embodiments, the controller 1602 is configured to operate the HMI 1610 to notify the user prior to transitioning into the engine mode 1616. In some embodiments, the user can provide an input to override the automatic transition into the engine mode 1616, or to transition the vehicle 10 into the ultrasilent mode 1622.

When the vehicle 10 is operated according to the EV/silent mode 1620, the vehicle 10 may be configured to operate for at least 30 minutes at a speed of at least 25 mph (e.g., 30-35 minutes at 45 mph). In some embodiments, when in the EV/silent mode 1620, the FEAD 800 and, therefore, the fan 810 are driven by the motor/generator 822, independently of a speed of the IMG 700 that is used to drive the vehicle 10 for transportation (e.g., the transmission 620). In some embodiments, operating the fan 810 independently of operation of the IMG 700 facilitates operating the fan 810 at a constant speed (e.g., 1400 RPM) regardless of a speed of the IMG 700 (which prevents sound fluctuations that would otherwise occur due to increasing and decreasing the fan speed). However, when the vehicle 10 is operated in the engine mode 1616 and the engine 610 drives the FEAD 800, the speed of the fan 810 may vary based on variations of the speed of the engine 610.

Ultra-Silent Mode

According to an exemplary embodiment, the controller 1602 includes the ultrasilent mode 1622 and is configured to operate the vehicle 10 according to the ultrasilent mode 1622. In another embodiment, the controller 1602 does not include the ultrasilent mode 1622. When the vehicle 10 is operated according to the ultrasilent mode 1622, the controller 1602 is configured to maintain or transition the engine 610 in an off state (e.g., to reduce sound output) and drive the driveline 600 by operating the IMG 700 (e.g., to provide an output torque to the transmission 620). The ultrasilent mode 1622 can be similar to the EV/silent mode 1620 but with additional operations to further reduce sound output of the vehicle 10.

In some embodiments, the ultrasilent mode 1622 includes shutting off operation of the fan 810 by disengaging the fan clutch 856. Shutting off operation of the fan 810 by disengaging the fan clutch 856 can further reduce sound output of the vehicle 10. In some embodiments, during operation of the vehicle 10 in the ultrasilent mode 1622, automatic transitioning of the vehicle 10 into the engine mode 1616 (or more particularly, starting of the engine 610) is limited. In some embodiments, during operation of the vehicle 10 in the ultrasilent mode 1622, operation of the fan 810 of the FEAD 800, and activation of the engine 610 is limited, regardless of the temperature provided by the temperature sensor 1612, and the SoC of the batteries of the ESS 1000. In this way, the vehicle 10 can be operated in the ultrasilent mode 1622 even to the point of complete depletion of the ESS 1000. In some embodiments, the controller 1602 is configured to provide alerts, notifications, alarms, etc. to the user or operator of the vehicle 10 via the HMI 1610 to notify the operator that the batteries of the ESS 1000 are about to be depleted, that an overheat condition is proximate, etc. The operator may manually transition the vehicle 10 out of the ultrasilent mode 1622 (e.g., to start the engine 610 to charge the batteries of the ESS 1000 and/or to engage the fan 810 of the FEAD 800) as desired. Advantageously, operating the vehicle 10 according to the ultrasilent mode 1622 facilitates improved noise and thermal concealment of the vehicle 10.

Alternative Drivelines

Figure 40:
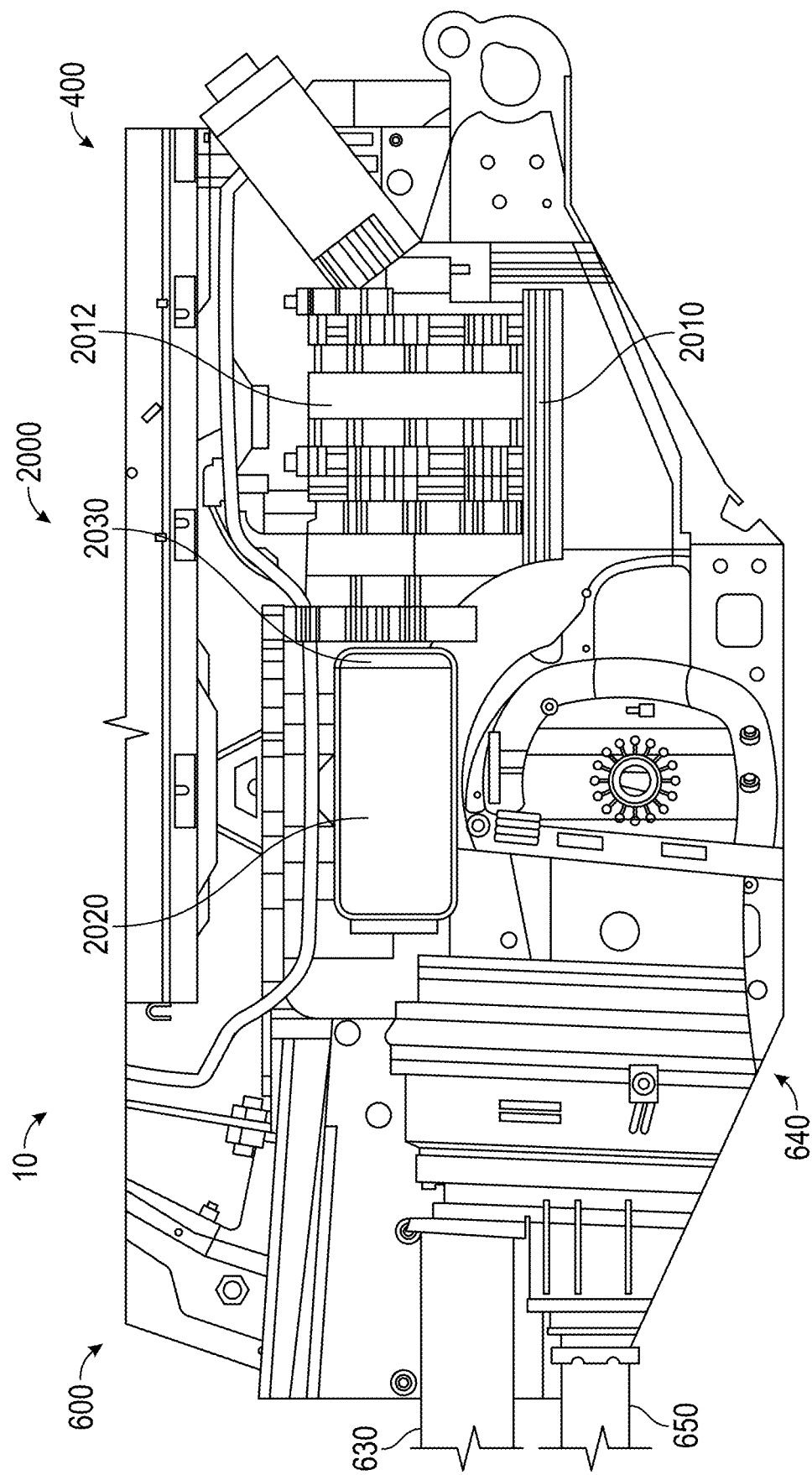
FIG. 40 is a partially transparent side view of the vehicle of FIG. 1 having a driveline including an engine, a transmission, a transaxle drive motor, and a gearbox, according to another exemplary embodiment.
Figure 41:
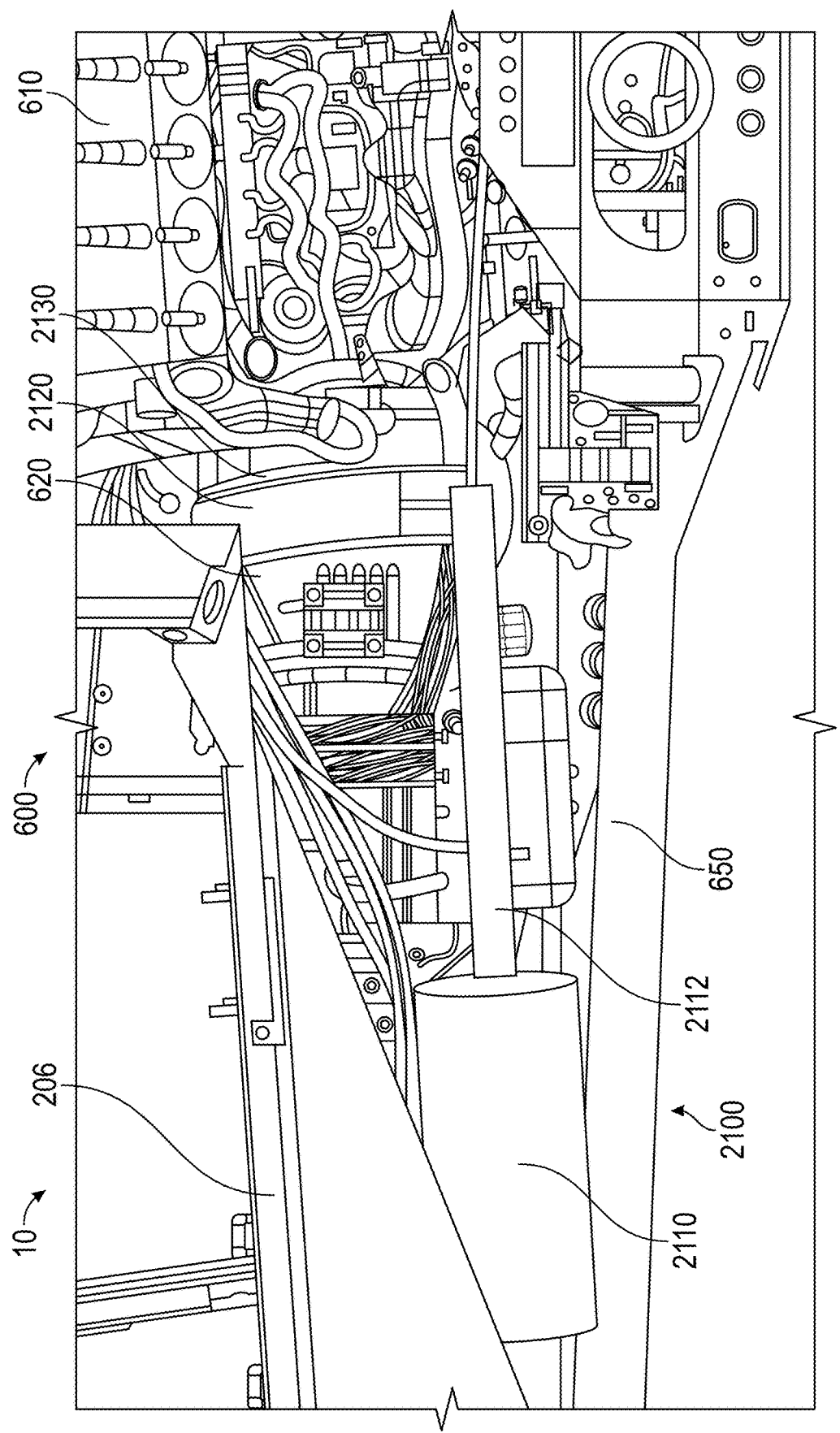
FIG. 41 is a partially transparent side view of the vehicle of FIG. 1 having a driveline including an engine, a transmission, a drive motor, and a gearbox arranged in a rear engine power take-off arrangement, according to another exemplary embodiment.
Figure 42:
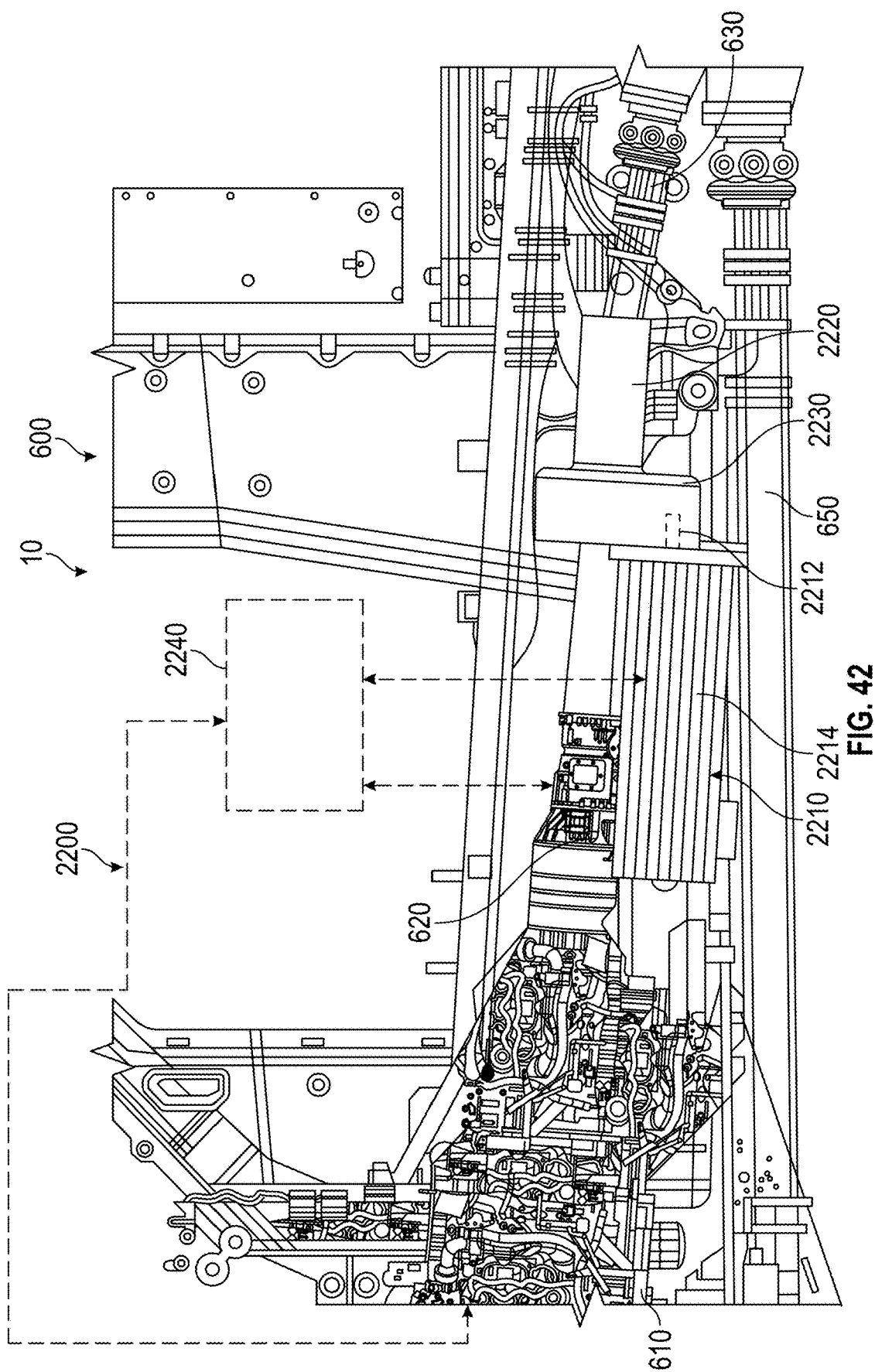
FIG. 42 is a partially transparent side view of the vehicle of FIG. 1 having a driveline including an engine, a drive motor, a transmission, and a gearbox, according to another exemplary embodiment.

According to the various embodiments shown in FIGS. 40-42 various other driveline arrangements for the driveline 600 (e.g., that do not include the IMG 700) can be incorporated into the vehicle 10 to enable multiple modes of vehicle travel. As discussed in detail below, a variety of alternative arrangements can provide the vehicle 10 with one or more of (i) an engine-only travel mode, (ii) an electric-motor only travel mode, and (iii) a hybrid or dual-drive travel mode where each of the engine 610 and an electric motor may variously function, depending on different traveling conditions (e.g., traveling downhill, uphill, below a threshold speed, above a threshold speed, etc.). In some examples, the driveline 600 can be arranged to operate the motor/generator 740 as a booster motor, such that each of the engine 610 and the motor/generator 740 simultaneously drive the transmission 620, and therefore the transaxle drive shaft 630 and the front axle drive shaft 650, providing a maximum output.

Electrified Transaxle

As shown in FIG. 40, the driveline 600 of the vehicle 10 includes a second electrified driveline arrangement replacing the IMG 700 with an electrified transaxle, shown as electrified transaxle assembly 2000. The electrified transaxle assembly 2000 is generally positioned within the rear module 400 (e.g., within the rear subframe 410), and is configured to supply rotational power to each of the rear axle and front axle assemblies 500 to drive the vehicle 10. The electrified transaxle assembly 2000 can be positioned opposite the engine 610 and transmission 620, and can be configured to selectively impart rotational motion to each of the transaxle drive shaft 630 and front axle drive shaft 650 to drive the vehicle 10.

The electrified transaxle assembly 2000 generally includes an electric drive motor 2010 and a gearbox 2020 positioned forward of and coupled to a driveshaft of the electric drive motor 2010. The gearbox 2020 can include one or more gears that engage with the transaxle 640 (e.g., one or more gears thereof), which then imparts rotational motion from the electric drive motor 2010 into each of the rear axle and front axle assemblies 500 to drive the vehicle 10. In some examples, the transaxle 640 further includes a clutch assembly that can selectively decouple or disengage electric drive motor 2010 from the transaxle 640, such that the vehicle 10 can be driven by the engine 610 and independent of the electric drive motor 2010 in certain instances (e.g., to execute an engine drive operation mode). The transmission 620 may be shifted to a neutral gear to decouple the electrified transaxle assembly 2000 from the engine 610 such that the vehicle 10 can be driven by the electric drive motor 2010 and independent of the engine 610 in certain instances (e.g., to execute a silent drive operation mode). In some examples, the electric drive motor 2010 is configured similarly to the motor/generator 740 described above, such that the electric drive motor 2010 can be configured to both draw power from, and generate and provide power to the ESS 1000, depending on the mode the vehicle 10 is in.

Using the vehicle 10 and the electrified transaxle assembly 2000, each of the travel modes described above can be performed by the vehicle 10. For example, in the engine-only travel mode, the engine 610 can once again supply rotational power to the transmission 620, which in turn rotates the transaxle drive shaft 630. The transaxle drive shaft 630 can in turn drive the transaxle 640, which drive the rear axle assembly 500, as well as the front axle drive shaft 650 to drive the front axle assembly 500. In some examples, rotation of the transaxle 640 can be used to drive the electric drive motor 2010 to generate electricity, which can be supplied to the ESS 1000. For example, when the transaxle clutch assembly 2030 is engaged and a gear within the gearbox 2020 engages the transaxle 640, rotation of the transaxle 640 will transmit rotational force through the gearbox 2020 to the driveshaft of the electric drive motor 2010. If the electric drive motor 2010 is configured as a motor/generator 740, as described above, rotation of the drive shaft within an electric drive motor housing 2012 (which includes wound coils) will generate electricity. The electricity generated can then be supplied to or otherwise transferred to the ESS 1000 for subsequent use. In some examples, the electric drive motor 2010 includes a transformer and/or an inverter (or rectifier) that are used to condition and step down or step up the generated electrical power prior to being supplied back to the ESS 1000.

In examples where the electric drive motor 2010 is configured as a motor only (e.g., and is not configured to generate and/or supply electrical power to the ESS 1000), the electric drive motor 2010 can be decoupled from the transaxle 640 using the transaxle clutch assembly 2030. The transaxle clutch assembly 2030 can decouple or disengage one or more of the gears within the gearbox 2020 from the transaxle 640, which then allows the transaxle 640 to rotate without transmitting rotational power through the gearbox 2020 and/or to the electric drive motor 2010. In some examples, the gears within the gearbox 2020 remain in contact with the transaxle 640, but are disengaged with a gearbox shaft or countershaft so that the gears freely spin and do not transmit torque. Accordingly, in this arrangement, the engine 610 and transmission 620 power each of the transaxle drive shaft 630 and the front axle drive shaft 650 while the electric drive motor 2010 is inactive (e.g., no or limited power is supplied to the electric drive motor 2010).

If a silent or reduced fuel mode is selected, the driveline 600 of the vehicle 10 is reconfigured. First, the engine 610 can be turned off, which in turn halts the rotation of the transmission 620. In some examples, the engine clutch 750 disengages the transmission 620, such that the transmission 620 is free to rotate independently (or nearly independently) of the drive shaft of the engine 610. Eliminating the rotation of the transmission 620 in turn ceases rotational power transmission from the transmission 620 to the transaxle drive shaft 630, which then stops (or slows) the vehicle 10 from moving.

With the engine 610 and transmission 620 disengaged from the electrified transaxle assembly 2000 of the driveline 600, the electrified transaxle assembly 2000 can be activated. First, the transaxle clutch assembly 2030 can engage the gearbox 2020. The gearbox 2020 then creates a rotational link between the transaxle 640 and the drive shaft of the electric drive motor 2010. With this coupling created, the ESS 1000 can supply electrical power to the electric drive motor 2010. In some examples, the ESS 1000 includes an inverter to convert stored DC electric power within the ESS 1000 to AC electric power that can be used by the electric drive motor 2010. Once activated, the electric drive motor 2010 rotates its drive shaft, which in turn imparts a torque to the transaxle 640. Because the transaxle 640 is coupled to the rear axle assembly 500, rotation of the transaxle 640 drives the rear wheels of the vehicle 10. Similarly, the rotation of the transaxle 640 transmits torque to the front axle drive shaft 650, which in turn drives the front axle assembly 500 to provide all-wheel (or four-wheel, in some embodiments) drive to the vehicle 10 in the silent or quieter electric-motor-only travel mode. In some examples, the ESS 1000 and electric drive motor 2010 can allow the vehicle 10 to travel in the silent or electric-motor-only mode for greater than 30 minutes at speeds of 25 miles per hour or higher. To accomplish these tasks, the electric drive motor 2010 can be configured to produce approximately 70 kW of continuous output power, with a peak output rating of 200 kW or more.

Similarly, hybrid modes of travel can be accomplished. For example, in some embodiments, the vehicle 10 operates in the electric-motor-only travel mode until a certain threshold traveling speed (e.g., 25 mph) is reached. When the threshold traveling speed is reached, the engine 610 can be activated and engaged with the transmission 620, while the electric drive motor 2010 can be deactivated and decoupled from the transaxle 640. In some examples, the engine 610 is activated upon the vehicle 10 reaching a first threshold speed (e.g., 25 mph) and the engine clutch 750 and/or transmission 620 are engaged to couple the engine 610 to the driveline 600 upon the vehicle 10 reaching a second threshold speed (e.g., 30 mph). In some examples, the driveline 600 transitions back to an electric-motor-only mode after the vehicle 10 has been traveling below the first threshold speed for a predetermined time period (e.g., 30 seconds, 60 seconds, 120 seconds, etc.). Using the above-described electrified transaxle assembly 2000 with the driveline 600, various different vehicle modes can be executed, including engine-only, electric-motor-only, and hybrid. As described above, different embodiments of the vehicle 10 can include an electric drive motor 2010 having a structure similar to the motor/generator 740, which allows for electricity to be generated and stored within the ESS 1000, for use in driving the electric drive motor 2010 at a later time.

Rear Engine PTO

As shown in FIG. 41, the driveline 600 of the vehicle 10 includes a third electrified driveline arrangement replacing the IMG 700 with a rear engine PTO ("REPTO"), shown as REPTO 2100. The REPTO 2100, like the electrified transaxle assembly 2000, includes an electric drive motor 2110 that can be selectively coupled with the transmission 620 using a gearbox 2120 and a REPTO clutch assembly 2130. The gearbox 2120 and the REPTO clutch assembly 2130 of the REPTO 2100 are positioned between the engine 610 and the transmission 620, and the electric drive motor 2110 is positioned within the tunnel slot 208 of the structural tunnel 206 of the passenger capsule 200. The electric drive motor 2110 is configured to supply rotational power the gearbox 2120 to drive the transmission 620 and, thereby, each of the rear axle and front axle assemblies 500 to drive the vehicle 10. Specifically, the REPTO 2100 can be configured to selectively impart rotational motion to each of the transaxle drive shaft 630 and the front axle drive shaft 650 through the transmission 620 and the transaxle 640 to drive the vehicle 10. Once again, the vehicle 10 can be configured to drive in each of the engine-only mode, the electric drive-motor-only mode, and a hybrid mode. In embodiments where the electric drive motor 2110 is configured like the motor/generator 740, the electric drive motor 2110 can generate and provide electrical power to the ESS 1000 for storage and subsequent use.

The electric drive motor 2110 of the REPTO 2100 is positioned behind the engine 610, and is configured to provide an alternative torque to the transmission 620 to drive the vehicle 10. As shown in FIG. 41, the electric drive motor 2110 includes a drive shaft 2112 that is driven by the electric drive motor 2110. The drive shaft 2112 extends forward, toward the engine 610 and parallel to the transaxle drive shaft 630. The drive shaft 2112 is coupled to (e.g., in a splined or geared engagement) with one or more gears within the gearbox 2120 positioned forward of the transmission 620 and behind the engine 610. The one or more gears within the gearbox 2120 can be selectively engaged with the transmission 620, such that rotation of the drive shaft 2112 rotates and transmits a torque to the transmission 620 and the transaxle drive shaft 630 to drive the vehicle 10. In some examples, the gearbox 2120 includes the REPTO clutch assembly 2130 that is configured to selectively engage the drive shaft 2112 with the transmission 620 to transmit torque from the electric drive motor 2110 through to the axle assemblies 500 to drive the vehicle 10. In other examples, the gearbox 2120 remains engaged with the drive shaft 2112 such that when the electric drive motor 2110 is inactive, torque is transferred from the engine 610, through the gearbox 2120, and to the drive shaft 2112, which rotates to generate electrical power that can be subsequently provided to the ESS 1000.

The REPTO 2100 is configured to provide the same multi-mode functionality as described above. For example, when the engine 610 is operating and the vehicle 10 is traveling at high speeds, the electric drive motor 2110 can be disengaged from the transmission 620 (e.g., through the REPTO clutch assembly 2130 disengagement), which in turn permits the transmission and/or gears within the gearbox 2120 to rotate without imparting a significant torque onto the drive shaft 2112 of the electric drive motor 2110. The torque produced by the engine 610 is supplied to the transmission 620, which then rotates the transaxle drive shaft 630 and transaxle 640. Rotation of the transaxle 640 in turn drives the front axle drive shaft 650, thereby transmitting torque to each of the front axle and rear axle assemblies 500 to drive the vehicle 10. In other examples, the electric drive motor 2110 remains clutched to the gearbox 2120 and the transmission 620, such that rotation of the engine 610 (e.g., the engine output shaft) rotates the drive shaft 2112, which in turn generates electricity within the coils of the electric drive motor 2110.

The REPTO 2100 is also configured to operate in a silent mode. To operate the REPTO 2100 in the silent mode, the engine 610 is decoupled from the transmission 620 (e.g., using a clutch assembly). The gearbox 2120 is then engaged with the transmission 620 (e.g., using the REPTO clutch assembly 2130) to create a mechanical linkage between the electric drive motor 2110 and the transaxle drive shaft 630. Then, the electric drive motor 2110 is activated. As discussed above, rotation of the electric drive motor 2110 rotates the transmission 620 shaft, which in turn rotates the transaxle 640 to drive each of the rear and front axle assemblies 500 using only electric power from the electric drive motor 2110. With the engine 610 deactivated, the vehicle 10 is able to drive in a "stealth mode" that makes the vehicle 10 more difficult to hear and less detectable by enemies. In some examples, the vehicle 10 is configured to transition between the stealth mode and the engine-only mode based upon traveling speed or remaining state of charge of the ESS 1000, for example. As discussed above, various different timing strategies can also be used to transition the vehicle 10 between driving modes during operation.

Motor/Gearbox

As shown in FIG. 42, the driveline 600 of the vehicle 10 includes a fourth electrified driveline arrangement replacing the IMG 700 with a motor and gearbox assembly, shown as an upper motor drive shaft and gearbox assembly 2200. The upper motor drive shaft and gearbox assembly 2200 includes a separate electric drive motor 2210 that can be selectively coupled with the transmission 620 and/or the transaxle drive shaft 630 using a gearbox 2220 and a rear clutch assembly 2230. As shown in FIG. 42, the electric drive motor 2210, the gearbox 2220, and the rear clutch assembly 2230 are each positioned within the tunnel slot 208 of the structural tunnel 206 of the passenger capsule 200 and behind the transmission 620. In some examples, the gearbox 2220 is positioned in-line with the transaxle drive shaft 630, which allows the electric drive motor 2210 to impart torque onto the transaxle drive shaft 630 to drive the vehicle 10 independently of the engine 610.

The electric drive motor 2210 includes a drive shaft 2212 that is engaged with one or more gears within the gearbox 2220. The drive shaft 2212 extends approximately parallel (e.g., +/−10 degrees) to the transaxle drive shaft 630, and is configured to drive each of the transaxle drive shaft 630, the transaxle 640, and the front axle drive shaft 650 when the vehicle 10 is operating in the silent or stealth mode. Like the electric drive motor 2010 and the electric drive motor 2110, the electric drive motor 2210 can be an asynchronous or induction AC electric motor that can be controlled using a variable frequency drive. The electric drive motor 2210 can be supplied with electricity from the ESS 1000, which can include an inverter to convert DC power stored within the ESS 1000 to AC power that can be used by the electric drive motor 2210.

The electric drive motor 2210 can also be configured as a motor/generator. Accordingly, when the vehicle 10 is in an engine-only drive mode, and the transaxle drive shaft 630 is being driven by the engine 610, torque can be transmitted to the drive shaft 2212 of the electric drive motor 2210 through the gearbox 2220. When the drive shaft 2212 is rotated within the housing 2214 of the electric drive motor 2210, AC electricity is generated. The generated electricity can be passed to a rectifier and/or one or more transformers to condition the generated electric power before being supplied back to the ESS 1000. In some examples, the electric drive motor 2210 is decoupled from the transaxle drive shaft 630 when the vehicle 10 is in the engine-only drive mode, such that rotation of the transaxle drive shaft 630 does not transmit a significant amount of torque through the gearbox 2220 and into the drive shaft 2212. The rear clutch assembly 2230 can selectively disengage one or more gears from the gearbox 2220, which in turn decouples the drive shaft 2212 from the transaxle drive shaft 630.

The upper motor drive shaft and gearbox assembly 2200 arrangement can also be used to perform any of the engine-only mode, electric-motor-only (e.g., stealth or silent) mode, or hybrid modes, as discussed above. In the engine-only mode, the electric drive motor 2210 is decoupled from the transaxle drive shaft 630 using the rear clutch assembly 2230. As indicated above, the rear clutch assembly 2230 can disengage one or more gears within the gearbox 2220 from a shaft or countershaft within the gearbox 2220, which allows the gear(s) to freely rotate relative to the shaft and/or the countershaft, such that limited torque is transmitted from the transaxle drive shaft 630 to the drive shaft 2212. Accordingly, the torque within the transaxle drive shaft 630 is transmitted to the transaxle 640 and the front axle drive shaft 650, and not to the drive shaft 2212.

The stealth or silent mode can be engaged by turning off the engine 610 and decoupling the drive shaft from the transmission 620. Then, the electric drive motor 2210 can be linked to the transaxle drive shaft 630 using the rear clutch assembly 2230, which engages one or more gears within the gearbox 2220 to the transaxle drive shaft 630. With the transaxle drive shaft linked to the electric drive motor 2210, the electric drive motor 2210 can be activated. Torque produced by the electric drive motor 2210 can then be transmitted through to the transaxle 640, to drive the rear axle assembly 500, and through to the front axle drive shaft 650, to drive the front axle assembly 500. The vehicle 10 can include a control system or engine control unit (ECU) 2240 that communicates between the various components of the driveline 600 to ensure appropriate timing between the different clutches and the electric drive motor 2210, which allows the vehicle to shift between engine-only and electric-motor-only modes while the vehicle 10 is operating.

Using the various above-described arrangements of the driveline 600, the vehicle 10 can transition between several driving modes, including a silent or "stealth" mode that allows the vehicle 10 to drive while producing a limited amount of noise and a limited thermal signature. A compact motor/generator can be incorporated to charge the ESS 1000, which enables extended electric-motor-only use. Different clutch mechanisms and couplings can be used to allow each of the engine 610 and electric motor (e.g., the IMG 700, the electric drive motor 2010, the electric drive motor 2110, the electric drive motor 2210, etc.) to drive the vehicle 10 independently of one another.

Alternative Control Modes

Referring now to FIGS. 43-51, the vehicle 10 may be controlled according to other modes or according to other control techniques, in addition to the engine mode 1616, the dual-drive mode 1618, the EV/silent mode 1620, and the ultrasilent mode 1622. In particular, the vehicle 10 may be controlled (e.g., by the controller 1602) to optimize transmission operation for transitioning between the EV/silent mode 1620 and the engine mode 1616, to autonomously rescue or be summoned to a location or to a person, according to an economy ("ECO") mode which optimizes and automates transition between at least the engine mode 1616 and the EV/silent mode 1620, an environmentally reactive control mode, based on a status of weaponry of the vehicle 10, according to a convoy mode, to facilitate escape from a situation or location, to optimize idle control of the engine 610, in a hybrid or supplemental mode, according to separate shift profiles for the EV/silent mode 1620 and the engine mode 1616, or according to a boost/turbo mode. The control techniques described herein can also include a graphical user interface ("GUI") or display of when an operator may manually initiate a "boost" of torque output to tractive elements of the vehicle 10.

EV/ICE Transition Optimization

Figure 43:
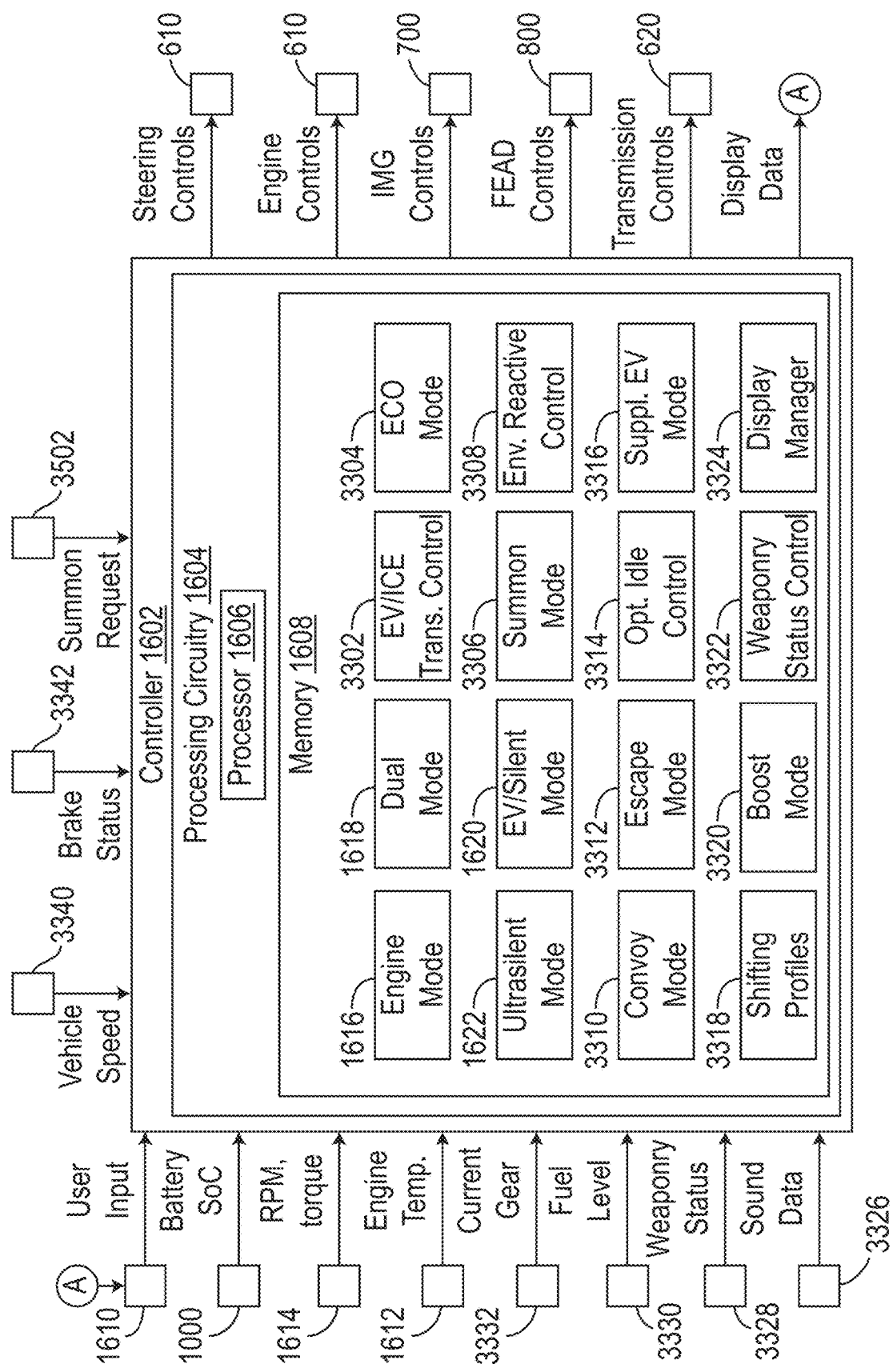
FIG. 43 is a diagram of a controller of the control system of FIG. 37 including alternative modes of operation, according to an exemplary embodiment.

Referring particularly to FIG. 43, the controller 1602 (e.g., the processing circuitry 1604) is configured to perform EV/ICE transition control, shown as EV/ICE transition control 3302. The controller 1602 may obtain a current gear from the transmission 620 or a transmission control unit ("TCU") of the vehicle 10. When the vehicle 10 is being transitioned between the engine mode 1616 and the EV/silent mode 1620, the controller 1602 automatically shifts the transmission 620 into a highest gear at a current speed of the vehicle 10 before transitioning from the engine mode 1616 to the EV/silent mode 1620, or vice versa. The EV/ICE transition control 3302 may be performed in combination with the engine mode 1616 and the EV/silent mode 1620 (e.g., when the vehicle 10 or the controller 1602 transition between the engine mode 1616 and the EV/silent mode 1620). The EV/ICE transition control 3302 can also function to transition the transmission 620 into a highest available gear at the current speed of the vehicle 10 (e.g., while maintaining the current speed of the vehicle 10) when transitioning between the engine mode 1616 and the ultrasilent mode 1622.

Economy Mode

Referring still to FIG. 43, the controller 1602 includes an ECO mode 3304. In some embodiments, the controller 1602 is configured to transition the vehicle 10 into the ECO mode 3304 in response to receiving a user input that indicates that the vehicle 10 should be transitioned into the ECO mode 3304. For example, the HMI 1610 can include a button, a switch, a lever, etc., that can be selected by the user or operator to transition the vehicle 10 into or out of the ECO mode 3304. In some embodiments, the controller 1602 is configured to monitor or quantify fuel consumption of the vehicle 10 over time. The controller 1602 is configured to obtain a fuel level (e.g., from a fuel sensor 3330) and determine when to transition the vehicle 10 between the engine mode 1616, the dual mode 1618, and the EV/silent mode 1620 to minimize fuel consumption and/or energy consumption of the vehicle 10 (e.g., by the engine 610 and the IMG 700, or any other internal combustion engine and motor with which the vehicle 10 is equipped). In some embodiments, the controller 1602 is configured to use a model of the vehicle 10 that quantifies fuel consumption based on one or more operational characteristics or parameters of the vehicle 10.

The model of the vehicle 10 may predict a fuel consumption (e.g., instantaneous fuel consumption, instantaneous fuel efficiency, etc.) and an energy consumption rate, or a combined metric that incorporates both the fuel consumption or energy consumption rate as a function of the current gear, the engine temperature, the RPM or torque, the battery SoC, a current mode of the vehicle 10 (e.g., an amount of torque output by the engine 610 and an amount of torque output by the IMG 700). The controller 1602 can also use a current grade, roll, or tilt of the vehicle 10 (e.g., obtained from an orientation sensor that indicates a pitch of the vehicle 10 or a ground surface). The current grade, roll, or tilt of the vehicle 10 may also be inputs to the model of the vehicle 10. When in the ECO mode 3304, the controller 1602 uses real-time or current conditions (e.g., current values of the fuel level, the current gear, the engine temperature, the RPM and torque, the battery SoC, etc.) to predict the instantaneous or average fuel efficiency in the currently selected mode (e.g., the engine mode 1616, the dual mode 1618, the EV/silent mode 1620). In some embodiments, the model also predicts a corresponding fuel consumption rate, an energy consumption rate, the combined metric, etc., for each of the engine mode 1616, the dual mode 1618, and the EV/silent mode 1620 given the current operational conditions and control decisions of the vehicle 10.

The controller 1602 may automatically transition into whichever of the engine mode 1616, the dual mode 1618, or the EV/silent mode 1620 provides the lowest energy consumption rate, fuel consumption rate, or combined metric. In some embodiments, the controller 1602 is also configured to determine an amount of energy consumption or fuel consumption required to transition between the engine mode 1616, the dual mode 1618, or the EV/silent mode 1620, and account for the amount of energy consumption or fuel consumption to transition between the engine mode 1616, the dual mode 1618, or the EV/silent mode 1620. In some embodiments, the controller 1602, when in the ECO mode 3304, is configured to automatically transition the vehicle 10 between the engine mode 1616, the dual mode 1618, and the EV/silent mode 1620 to minimize the combined metric that indicates amount, rate, or efficiency of both fuel consumption and energy consumption, while accounting for fuel or electrical energy required to perform the transitions between the engine mode 1616, the dual mode 1618, and the EV/silent mode 1620. In some embodiments, the controller 1602 is configured to predict, based on a route and known elevations or pitch of terrain, a cumulative energy consumption or fuel consumption over a trip of the vehicle 10. The controller 1602 may use the model of the vehicle 10 to predict the cumulative energy consumption or fuel consumption, and determine when to transition between the engine mode 1616, the dual mode 1618, and the EV/silent mode 1620 to minimize the cumulative amount of electrical energy and fuel consumed over the trip.

In some embodiments, the controller 1602, when in the ECO mode 3304, is configured to only transition between the engine mode 1616, the dual mode 1618, and the EV/silent mode 1620 after the vehicle 10 has been in the currently selected mode for a predetermined amount of time. The controller 1602 may hold the vehicle 10 in the currently selected mode for the predetermined amount of time to reduce rapid transitioning between the engine mode 1616, the dual mode 1618, and the EV/silent mode 1620. In some embodiments, the controller 1602 is configured to actuate or change the amount of torque provided by each of the engine 610 and the IMG 700 to minimize fuel and energy consumption of the vehicle 10.

Environmentally Reactive Mode

Referring still to FIG. 43, the memory 1608 includes an environmentally reactive control mode 3308, according to some embodiments. When the environmentally reactive control mode 3308 is active or in use, the controller 1602 obtains sound data from a microphone 3326 of the vehicle 10, extracts a sound level of an environment of the vehicle 10 based on the sound data, and adjusts operation or transition of the vehicle 10 between the engine mode 1616, the dual mode 1618, the EV/silent mode 1620, or the ultrasilent mode 1622. In some embodiments, the functions of the environmentally reactive control mode 3308 are performed by the controller 1602 at a higher level, while allowing the controller 1602 to implement any of the functionality for the vehicle 10 according to any of the engine mode 1616, the dual mode 1618, the ultrasilent mode 1622, the EV/silent mode 1620 (or any of the other modes of the vehicle 10).

In the environmentally reactive control mode 3308, the controller 1602 compares the sound level of the environment of the vehicle 10 to a predicted sound level that will occur due to operation of the vehicle 10. For example, if the engine 610 is activated (e.g., by transitioning into the engine mode 1616), the controller 1602 can compare a known sound output of the engine 610 to the sound level of the environment of the vehicle 10. If the sound output of the engine 610 exceeds (e.g., by any amount, by at least a predetermined amount, etc.) the sound level of the environment of the vehicle 10, the controller 1602 limits activation of the engine 610, operation of the engine 610 that will cause the sound output to exceed the sound level of the environment, or limits or restricts transition of the vehicle 10 into the engine mode 1616. If the sound level of the environment is greater than the known sound output of the engine 610 or is substantially equal to the known sound output of the engine 610, the controller 1602 may allow activation of the engine 610, allow operation of the engine 610, or allow transition into the engine mode 1616. In some embodiments, the known sound output of the engine 610 exceeding the sound level of the environment indicates that the known sound output of the engine 610 will be noticeable. Advantageously, limiting activation of the engine 610 based on the comparison between the sound level of the environment and the known sound output of the engine 610 improves stealth and concealability of the vehicle 10. It should be understood that while the environmentally reactive control mode 3308 described herein is described as limiting operation of the engine 610 and limiting transition into the engine mode 1616, operating according to the environmentally reactive control mode 3308 may also include comparing other known sound outputs to the sound level of the environment such as sound output due to operating the IMG 700 at certain speeds, sound output due to operating in the dual mode 1618, sound output due to operating in the EV/silent mode 1620, etc.

In some embodiments, the controller 1602 is configured to use the sound data to identify an arrival direction of weaponry noise (e.g., gunfire, etc.). For example, the vehicle can include an array of microphones 3326 and use amplitudes of the different microphones 3326 of the array to identify the arrival direction of the weaponry noise. The controller 1602 uses the arrival direction of the weaponry noise as an input to identify if the environment is quiet. For example, the controller 1602 may operate weaponry 3328 of the vehicle 10 and monitor the arrival direction of the weaponry noise.

Weaponry Status Control Mode

Referring still to FIG. 43, the controller 1602 includes a weaponry status control mode 3322, according to some embodiments. In some embodiments, the weaponry status control mode 3322 is similar to the environmentally reactive control mode 3308 in that the weaponry status control mode 3322 can be used at a higher level to transition the vehicle 10 between any of the engine mode 1616, the dual mode 1618, the ultrasilent mode 1622, or the EV/silent mode 1620.

When the controller 1602 operates according to the weaponry status control mode 3322, the controller 1602 obtains a weaponry status from weaponry 3328 or a weaponry control unit of the vehicle 10. The weaponry status indicates whether the weaponry 3328 is currently active or not. In response to the weaponry status indicating that the weaponry 3328 is currently active, the controller 1602 may activate the engine 610, transition the vehicle 10 out of a current mode (e.g., the EV/silent mode 1620 or the ultrasilent mode 1622) into a mode that includes activation of the engine 610 (e.g., the engine mode 1616 or the dual drive mode 1618), or allows activation of the engine 610. In some embodiments, the controller 1602 is configured to maintain the engine 610 in an active state for a predetermined amount of time after the engine 610 is activated responsive to the weaponry 3328 being activated. The controller 1602 can detect activation of the weaponry 3328 in other ways such as monitoring control inputs provided to the weaponry 3328, monitoring user inputs provided via the HMI 1610, monitoring the sound data provided by microphone 3326, etc. Since the weaponry 3328 may be louder than the engine 610, operation of the weaponry 3328 may indicate that the engine 610 can be operated or activated without sacrificing detectability, concealability, or stealth due to sound output of the engine 610.

Convoy Mode

Figure 51:
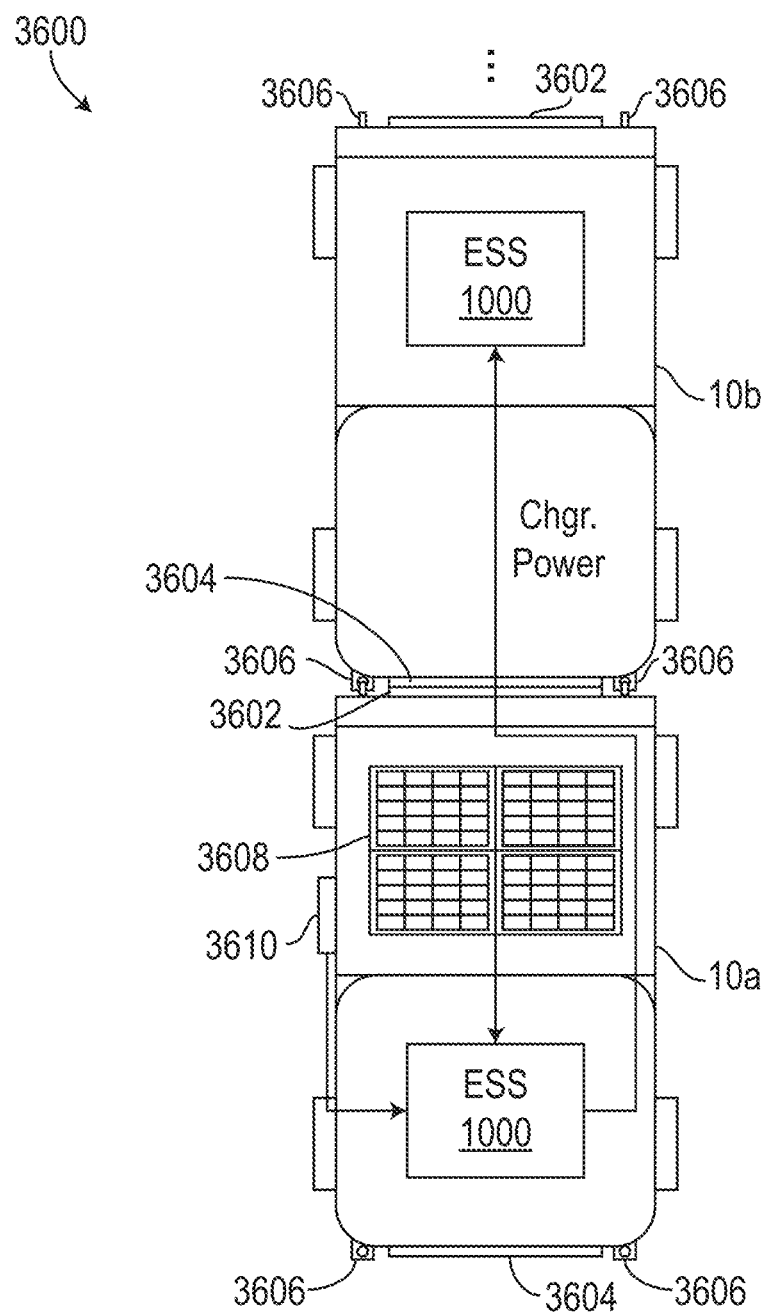
FIG. 51 is a diagram of multiple vehicles of the vehicle of FIG. 1 in a convoy arrangement, according to an exemplary embodiment.

Referring to FIGS. 43 and 51, the controller 1602 includes a convoy mode 3310, according to some embodiments. When the convoy mode 3310 is active, the controller 1602 of the vehicle 10 may communicate with controllers 1602 of other vehicles 10 to coordinate a convoy chain of the vehicles 10. For example, the vehicle 10 may be a leader or a follower vehicle equipped with different equipment. If the vehicle 10 is a leader vehicle, the controller 1602 can communicate with the other vehicles 10 so that the controllers 1602 of the other vehicles autonomously operate to form a chain of vehicles 10 as shown in FIG. 51. If the vehicle 10 is a follower vehicle, then the controller 1602 of the vehicle 10 may communicate with the controller 1602 of the leader vehicle, obtain an assigned number in line (e.g., second in chain, third in chain, etc.) and operate to removably couple with the other vehicles 10 at an appropriate place in line.

FIG. 51 shows a leader vehicle 10a equipped with a solar panel 3608, and an alloy 3610 that generates electrical energy in response to heat. In some embodiments, the solar panel 3608 and/or the alloy 3610 are optional. The leader vehicle 10a is removably coupled with a follower vehicle 10b through removable couplings 3606 and may drag the follower vehicle 10b. The vehicles 10a and 10b each include a front charging pad 3604 and a rear charging pad 3602. When the leader vehicle 10a is coupled with the follower vehicle 10b through the removable couplings 3606, the follower vehicle 10b and the leader vehicle 10a can exchange electrical energy with each other (e.g., the ESS 1000 of the follower vehicle 10b and the leader vehicle 10a exchange electrical energy with each other through contact between the front charging pads 3604 and the rear charging pads 3602). Additional follower vehicles 10 may be similarly coupled with the rear of the follower vehicle 10b to form a chain of vehicles.

In some embodiments, the leader vehicle 10a is a fully electric vehicle including additional batteries 1008 to provide charging for the follower vehicles 10b. The follower vehicles 10b may also shift into a neural gear and be dragged by the leader vehicle 10a. The driving of the axle assemblies 510 or back-driving of the IMG 700 of the follower vehicles 10b is used to generate electrical energy to charge the ESS 1000 of the follower vehicles 10b, according to some embodiments. In some embodiments, the solar panel 3608 of the leader vehicle 10a generate electrical energy that can be provided to the ESS 1000 of the leader vehicle 10a to charge the batteries 1008 of the leader vehicle 10a. The alloy 3610 may similarly generate electrical energy that can charge the batteries 1008 of the ESS 1000 of the leader vehicle 10. In some embodiments, the leader vehicle 10a and/or the follower vehicles 10b include a long range charger to wirelessly charge. In some embodiments, the controllers 1603 of the leader vehicle 10a and the follower vehicles 10b prompt the operators of the vehicles 10 to operate the vehicles 10 to form the chain as shown in FIG. 51. The leader vehicle 10a or any of the follower vehicles 10b can be configured to generate electrical energy by converting mechanical energy or movement in a suspension system to electrical energy. In some embodiments, the follower vehicles 10b do not receive charging power from the leader vehicle 10a, but use the angular rotation of the axle assemblies 510 to generate electrical energy to charge their ESS 1000. In some embodiments, the leader vehicle 10a is a hybrid vehicle including both the engine 610 and the IMG 700. The leader vehicle 10a can drive the IMG 700 with the engine 610 during convoy operations to function as a generator and thereby charge its ESS 1000, which may exchange electrical power through the electrical pads 3602 and 3604 to charge the batteries 1008 of the follower vehicles 10b. In some embodiments, the follower vehicles 10b are fully electric vehicles that do not include the engine 610.

Figure 49:
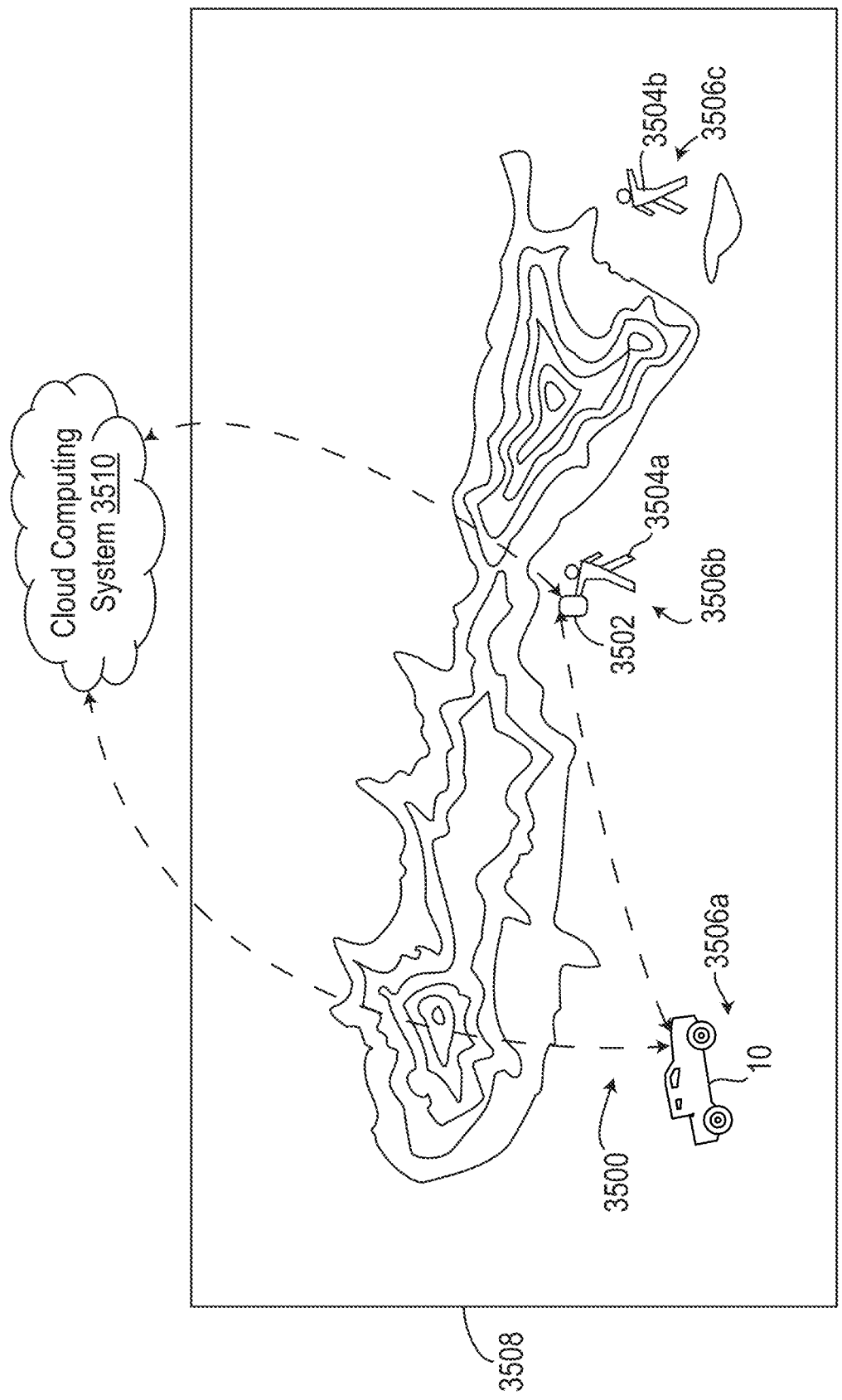
FIG. 49 is a diagram of a map showing the vehicle of FIG. 1 receiving a summon request from a requesting device, according to an exemplary embodiment.

Referring again to FIG. 43, the controller 1602 can operate the vehicle 10 differently according to whether the vehicle 10 is a leader or a follower vehicle, when the vehicle 10 operates according to the convoy mode 3310. If the vehicle 10 is the leader vehicle, the controller 1602 may communicate with the other vehicles 10 and assign a number in the chain. The controllers 1602 of the other vehicles 10 (e.g., the follower vehicles) use the assigned number to form the chain as shown in FIG. 49. In some embodiments, during convoy operations, the controller 1602 operates the vehicle 10 according to the dual mode 1618 if the vehicle 10 is a leader vehicle.

Escape Mode

Figure 48:
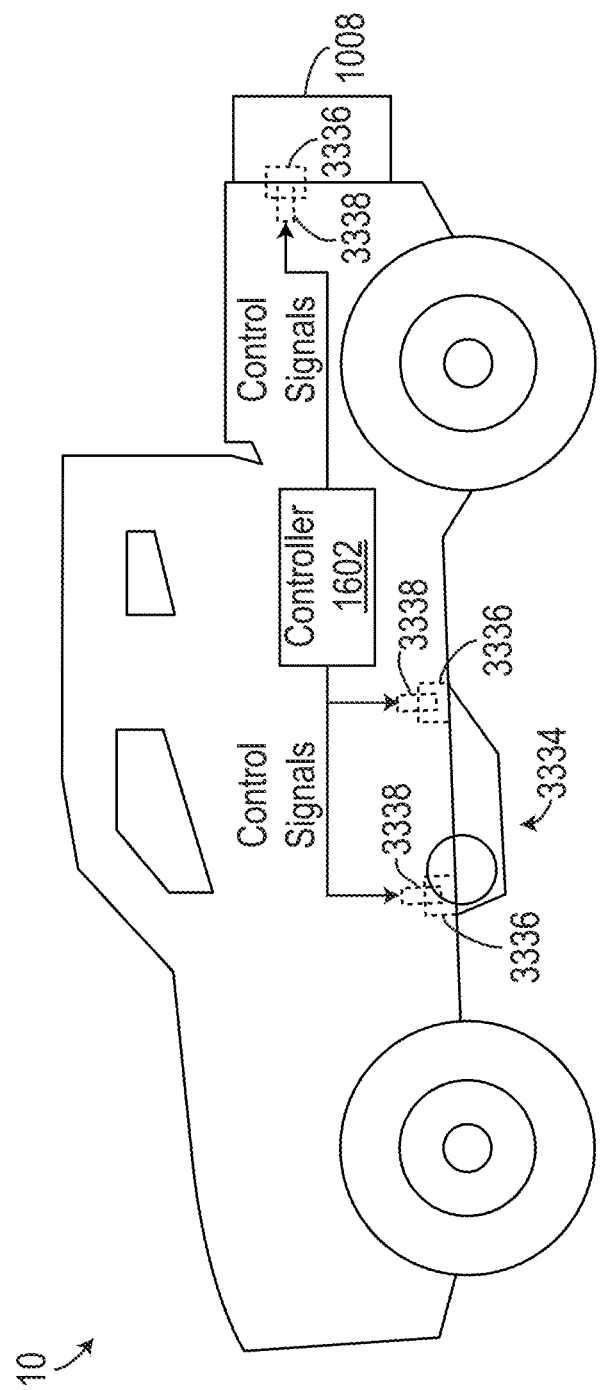
FIG. 48 is a side view of the vehicle of FIG. 1 including one or more battery units and a power unit that can be physically de-coupled from the vehicle, according to an exemplary embodiment.

Referring to FIGS. 43 and 48, the controller 1602 includes an escape mode 3312, according to some embodiments. The controller 1602 may transition the vehicle 10 into the escape mode 3312 in response to a user input provided via the HMI 1610. When the controller 1602 operates according to the escape mode 3312, one or more actions are performed to reduce weight of the vehicle 10 and the vehicle 10 is operated according to the dual drive mode 1618 for transportation to expedite transporting the vehicle 10 from a current location as fast as possible (e.g., maximizing torque output of the engine 610 and the IMG 700). In some embodiments, when the escape mode 3312 is activated, the controller 1602 operates both the engine 610 and the IMG 700 to provide torque output to the axle assemblies 500 to transport the vehicle 10 as fast as possible.

Referring particularly to FIG. 48, the vehicle 10 includes the batteries 1008 being removably coupled with the vehicle 10 via a removable coupling 3336. The removable coupling 3336 may be an interlocking coupling between the batteries 1008, a threaded coupling between the batteries 1008 and the vehicle 10, a pin coupling between the batteries 1008 and the vehicle 10, etc. The vehicle 10 also includes an actuator 3338 (e.g., an electric motor, a transducer, a solenoid, etc.) that is configured to, in response to receiving control signals from the controller 1602, physically affect the removable coupling 3336 to physically de-couple (e.g., drive a fastener to de-thread from the batteries 1008, drive an interlocking member to release the batteries 1008, slide a pin to de-couple the batteries 1008 from the vehicle 10, etc.) the batteries 1008 from the vehicle 10. Once the batteries 1008 are decoupled from the vehicle 10, the batteries 1008 may fall to the ground, thereby reducing weight of the vehicle 10 and facilitating increased speed of transportation of the vehicle 10. In some embodiments, the vehicle 10 includes multiple batteries 1008 that are each coupled with the vehicle 10 through a removable coupling 3336, each of which can be independently decoupled from the vehicle 10. In some embodiments, in response to being physically decoupled from the vehicle 10, the batteries 1008 initiate a self-destruct sequence so that the batteries 1008 self-destruct after the vehicle 10 has transported a distance from the batteries 1008.

Referring still to FIG. 48, the vehicle 10 may include an accessory power unit (APU) 3334 including an electric motor, a generator, an engine, etc., configured to generate energy for one or more body functions of the vehicle 10, accessories of the vehicle 10, transportation of the vehicle 10, etc. The APU 3334 is similarly coupled with the vehicle 10 via removable couplings 3336 which can be driven into a de-coupled state by actuators 3338. In response to receiving the control signals from the controller 1602, the actuators 3338 operate to drive the removable couplings 3336 to physically release the APU 3334 from the vehicle 10.

Referring again to FIGS. 43 and 48, when the vehicle 10 is transitioned into the escape mode 3312, the controller 1602 provides control signals to one or more of the actuators 3338 to physically de-couple one or more of the batteries 1008 or the APU 3334. In some embodiments, the controller 1602 provides control signals to the actuators 3338 of the batteries 1008 or the APU 3334 sequentially and prompts the operator to confirm before providing the control signals to the actuators 3338. In some embodiments, the controller 1602 only generates control signals for actuators 3338 of batteries 1008 that are dead or have a low SOC. Dropping dead batteries 1008 or the APU 3334 may facilitate improved transportation speed of the vehicle 10.

Turbo Mode

Referring to FIG. 43, the controller 1602 includes a boost mode 3320, according to some embodiments. When the boost mode 3320 is activated (e.g., by the operator pressing a button of the HMI 1610, squeezing a trigger, pushing a lever, etc.), the controller 1602 operates the IMG 700 to briefly or temporarily operate the IMG 700 to a maximum torque output to provide additional torque. In some embodiments, the boost mode 3320 is used in addition to the dual mode 1618 or is only available for activation when the dual mode 1618 is currently in use.

In some embodiments, the controller 1602 operates the IMG 700 to peak based on a measured temperature of the IMG 700. For example, if the IMG 700 has been recently peaked by activating the boost mode 3320 responsive to the user input, the controller 1602 may limit activation of the boost mode 3320 again, or may operate the IMG 700 to provide a reduced amount of torque relative to the maximum torque output of the IMG 700. In some embodiments, the maximum torque output of the IMG 700 is a rated maximum torque output of the IMG 700 or a maximum possible torque output of the IMG 700. In this way, the controller 1602 may regulate the torque output by the IMG 700 based on the temperature T of the IMG 700. Once the IMG 700 cools to a sufficient level (e.g., the temperature T drops), a next activation of the boost mode 3320 may result in the IMG 700 being operated by the controller 1602 to provide the maximum torque output. In some embodiments, a display manager 3324 operates cooperatively with the boost mode 3320 to provide a graphical use interface indicating a percentage of the maximum torque of the IMG 700 that can be output based on the temperature T of the IMG 700. In some embodiments, activating the boost mode 3320 results in the IMG 700 providing a torque output to tractive element of the axle assemblies 500 greater than 400 Newton-meters.

Referring particularly to FIGS. 44-47, a boost indicator 3400 that illustrates a currently available amount or percentage of the maximum torque of the IMG 700 is shown. The boost indicator 3400 may be displayed on a screen of the HMI 1610 and informs the operate of the vehicle 10 regarding whether the boost mode 3320 can be activated, and an amount of torque that will be output by the IMG 700 if the boost mode 3320 is activated.

The boost indicator 3400 includes a bar 3404 having a first visual indicator 3406 (e.g., a bar, an area, an arc, a segment, etc.) and a second visual indicator 3408 (e.g., a bar, an area, an arc, a segment, etc.). The first visual indicator 3406 has a variable length, with one end coincident or attached to an end of the first visual indicator 3406. The second visual indicator 3408 has a fixed length that does not vary and provides reference for the length of the first visual indicator 3406. The length of the first visual indicator 3406 varies with respect to the length of the second visual indicator 3408 as a function of the temperature T at the IMG 700, or as a function of an available percentage of a maximum torque output of the IMG 700 that is currently available. The available percentage of the maximum torque output of the IMG 700 is determined by the controller 1602 based on the temperature T of the IMG 700 and a known profile, model, function, equation, etc., to determine an amount of the maximum torque that is currently available from the IMG 700.

Figure 44:
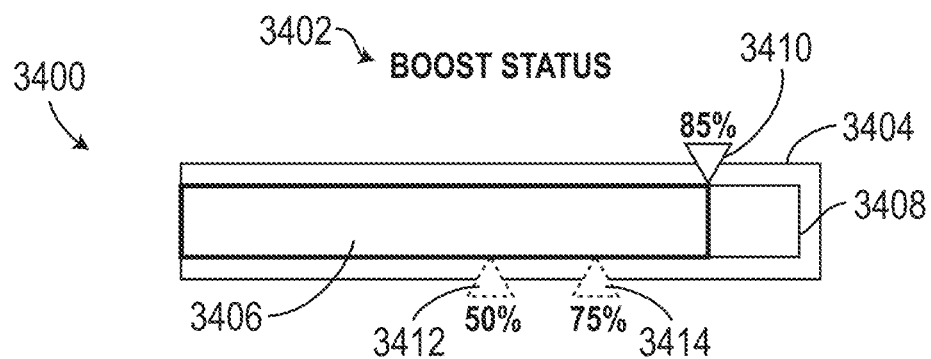
FIG. 44 is diagram of a boost indicator that can be presented to an operator of the vehicle of FIG. 1, according to an exemplary embodiment.

The boost indicator 3400 also includes an indicator 3410 that tracks the end of the first visual indicator 3406 that moves relative to the second visual indicator 3408 to result in the variable length of the first visual indicator 3406. The indicator 3410 may include a shape and textual information (e.g., 85% as shown in FIG. 44) that indicates the percentage of maximum torque available from the IMG 700. In some embodiments, the length of the first visual indicator 3406 with respect to the length of the second visual indicator 3408 tracks the percentage of maximum torque available from the IMG 700 in real-time. For example, if the length of the first visual indicator 3406 is 100% of the length of the second visual indicator 3408, this indicates that 100% of the maximum torque output of the IMG 700 is available (e.g., an amount greater than 400 Newton-meters). Similarly, if the length of the first visual indicator 3406 is 50% of the length of the second visual indicator 3408, this indicates that 50% of the maximum torque output of the IMG 700 is available.

The boost indicator 3400 also includes a first stationary indicator 3412 and a second stationary indicator 3414, which may each include a geometric shape (e.g., a triangle) and textual information. The first stationary indicator 3412 and the second stationary indicator 3414 provide reference relative to the first visual indicator 3406 that has variable length to inform the operator regarding the current length of the first visual indicator 3406 by providing stationary reference or fiducial points.

Figure 45:
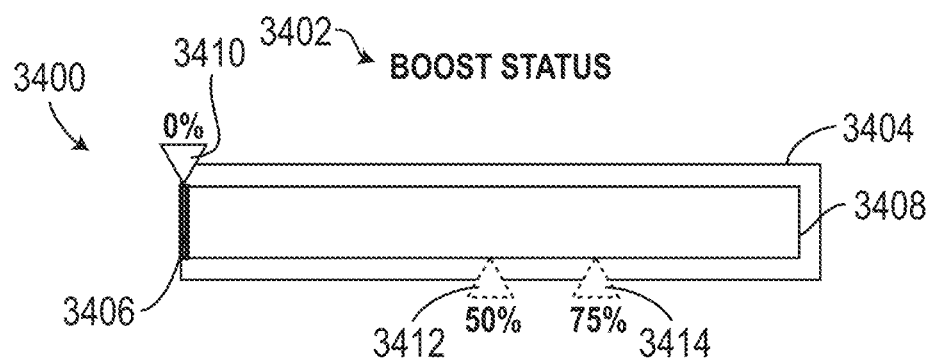
FIG. 45 is another diagram of the boost indicator of FIG. 44, according to an exemplary embodiment.
Figure 46:
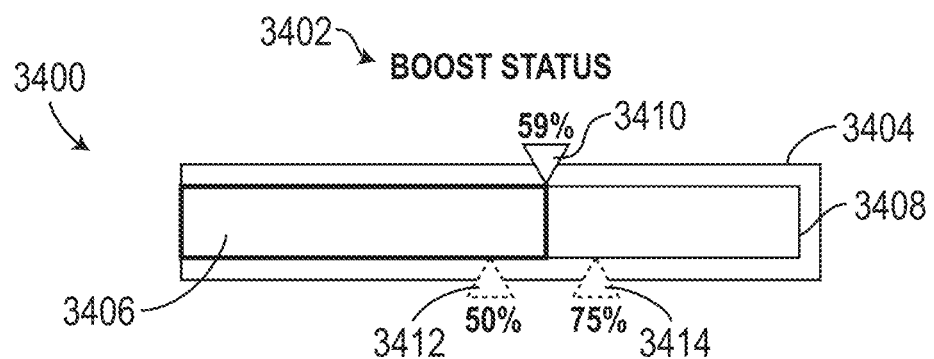
FIG. 46 is another diagram of the boost indicator of FIG. 44, according to an exemplary embodiment.
Figure 47:
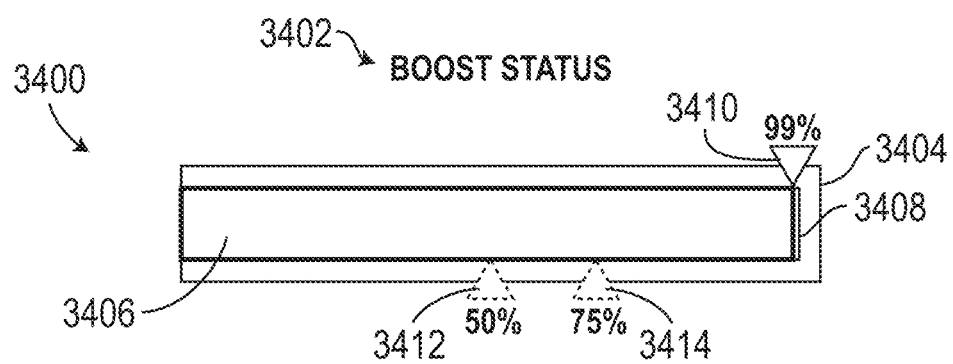
FIG. 47 is another diagram of the boost indicator of FIG. 44, according to an exemplary embodiment.

When the operator provides the input via the HMI 1610 to transition the vehicle 10 into the boost mode 3320, the length of the first visual indicator 3406 may decrease in response to rising temperatures at the IMG 700. FIG. 45 shows the boost indicator 3400 after the vehicle 10 has been transitioned into the boost mode 3320 and temperatures at the IMG 700 have risen. As the IMG 700 cools, the available amount of torque of the IMG 700 may increase, thereby causing the length of the first visual indicator 3406 to increase (as shown in FIGS. 46-47). The vehicle 10 may automatically transition out of the boost mode 3320 in response to the IMG 700 reaching a threshold temperature, or in response to the IMG 700 operating at maximum torque output for a predetermined amount of time. In some embodiments, the controller 1602 limits transition of the vehicle 10 into the boost mode 3320 until the IMG 700 has cooled or until a certain amount of time has passed (e.g., the controller 1602 limits transition of the vehicle 10 into the boost mode 3320 if the available amount of torque is 50% less than the maximum torque output of the IMG 700, illustrated by the first visual indicator 3406). In some embodiments, the length of the first visual indicator 3406 is time-based instead of based on the temperature of the IMG 700. For example, the length of the first visual indicator 3406 may increase or "recharge" as a function of time to incentivize the operator to wait some amount of time (e.g., for the IMG 700 to cool). In some embodiments, a color of the first visual indicator 3406 changes based on the length of the first visual indicator 3406. For example, if the length of the first visual indicator 3406 is 50% (or any other value) or less than the length of the second visual indicator 3408, the first visual indicator 3406 may have a red color. If the length of the first visual indicator 3406 is between 50% and 75% of the length of the second visual indicator 3408 (or any other reference values or ranges), the color of the first visual indicator 3406 may turn yellow or orange. If the length of the first visual indicator 3406 is greater than 75% of the length of the second visual indicator 3408 (or any other value or threshold), the color of the first visual indicator 3406 may be green. In some embodiments, a hue or color of the first visual indicator 3406 varies continuously with respect to the length of the first visual indicator 3406.

Shifting Profiles

Referring to FIG. 43, the controller 1602 includes shifting profiles 3318 for both the engine mode 1616 and the EV/silent mode 1620. In some embodiments, the shifting profiles define at what speed (e.g., RPM) of a primary mover (e.g., the engine 610, the IMG 700, etc.), and whether the primary mover is increasing or decreasing in speed, the transmission 620 should be shifted into a higher or lower gear. The controller 1602 may include different shift profiles 3318 for each of the engine mode 1616, the dual mode 1618, and the EV/silent mode 1620 and the ultrasilent mode 1622. In some embodiments, the EV/silent mode 1620 and the ultrasilent mode 1622 use a same shift profile. Using separate shifting profiles 3318 for the modes 1616-1622 facilitates smooth operation of the transmission 620 and reduces relearning (e.g., of a transmission control unit) that may otherwise occur every time a new mode is activated.

Optimized Idle

Referring to FIG. 43, the controller 1602 includes an optimized idle control mode 3314, according to some embodiments. In some embodiments, any of the functionality described herein with reference to the optimized idle control mode 3314 may be performed while another mode is active. In some embodiments, any of the functionality of the optimized idle control mode 3314 can be performed whenever the engine 610 is active or running.

In the optimized idle control mode 3314, the controller 1602 obtains a speed of the vehicle 10 (e.g., from a speed sensor 3340), shown as vehicle speed. When the vehicle speed approaches zero (e.g., 0 mph) or reaches zero, the controller 1602 generates control signals for the engine 610 to shut off the engine 610. In some embodiments, the controller 1602 also obtains an indication of a parking brake status, shown as brake status, from a parking brake 3342 or a sensor of the parking brake 3342. In response to the parking brake 3342 being active (e.g., as indicated by the brake status), the controller 1602 may shut off the engine 610.

EV Supplemental or Locked Dual Mode

Referring to FIG. 43, the controller 1602 includes a supplemental EV mode 3316, according to some embodiments. In some embodiments, in the supplemental EV mode 3316, the controller 1602 always operates the IMG 700 to supplement the engine 610 with torque whenever the engine 610 is active. In this way, the supplemental EV mode 3316 may remove, limit, or otherwise prevent the vehicle 10 from operating according to the engine mode 1616 (e.g., where only the engine 610 operates to provide torque for transportation). In some embodiments, the supplemental EV mode 3316 changes operation of the engine mode 1616 so that even if the engine 610 provides a majority of torque used for transportation of the vehicle 10, the IMG 700 still provides some amount of torque to supplement the torque output of the engine 610. In some embodiments, the supplemental EV mode 3316 limits the vehicle 10 from being transitioned into any mode where only the IMG 700 operates for providing torque (e.g., the EV/silent mode 1620 or the ultrasilent mode 1622). In this way, the supplemental EV mode 3316 may result in the vehicle 10 being a hybrid vehicle that only operates in a hybrid mode where both the engine 610 and the IMG 700 provide torque for transportation.

In some embodiments, the supplemental EV mode 3316 allows the operator of the vehicle to override the mode and allow transition of the vehicle 10 into the EV/silent mode 1620 or the ultrasilent mode 1622. For example, the HMI 1610 may have a separate override button or switch that, when actuated or selected, causes the controller 1602 to operate the vehicle 10 for transportation using only the IMG 700.

Summon Mode

Figure 50:
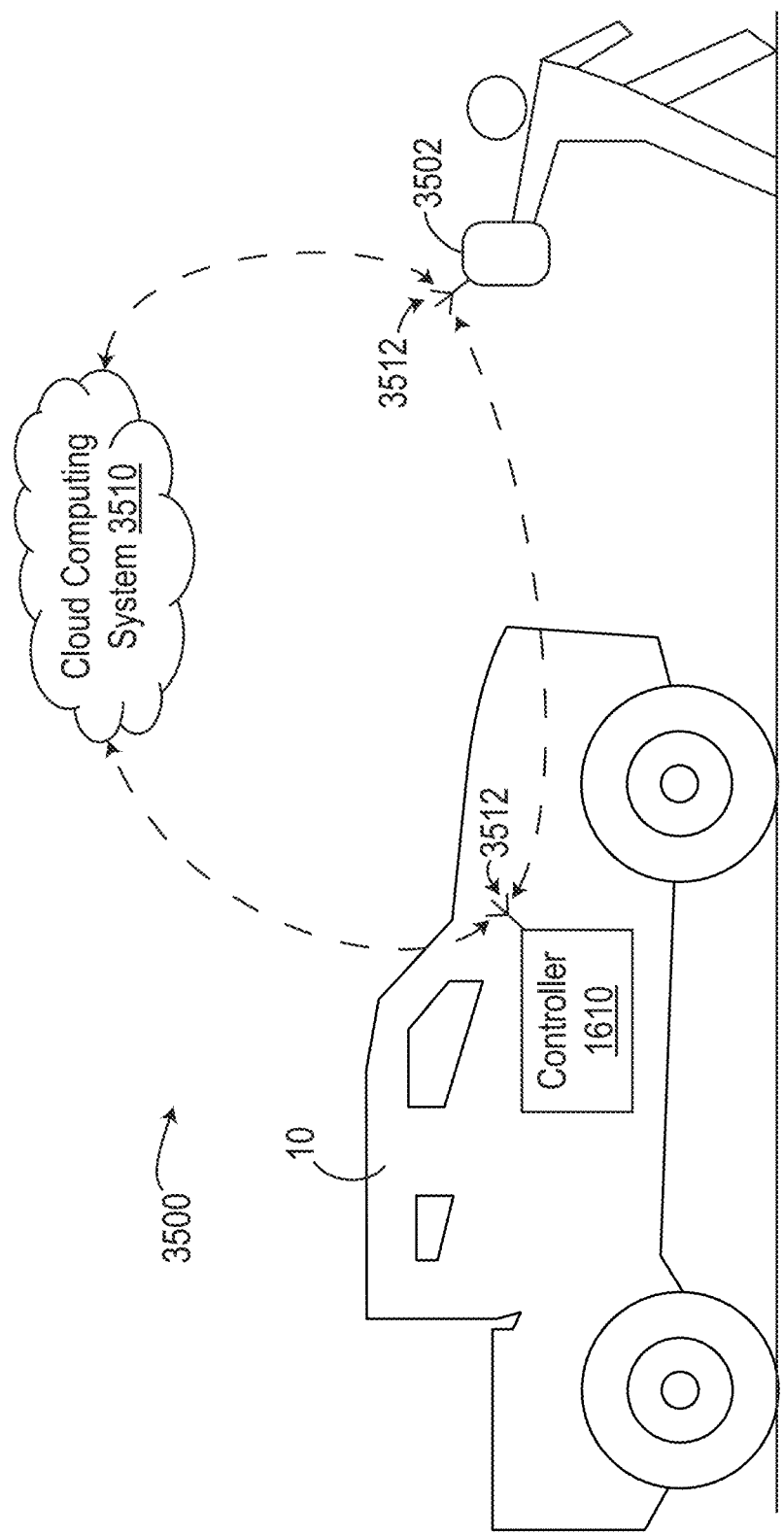
FIG. 50 is a block diagram of a system for receiving a summon request at the vehicle of FIG. 1, according to an exemplary embodiment.

Referring to FIGS. 43 and 49-50, the controller 1610 may operate the vehicle 10 according to a summon mode 3306, according to some embodiments. FIGS. 49-50 illustrate a system 3500 including the vehicle 10, a requesting device 3502 (e.g., a fob, a portable device, a field device, a unit, etc.), and a cloud computing system 3510. When the vehicle 10 is in the summon mode 3306, the controller 1602 may receive a summon request from the requesting device 3502. In some embodiments, the controller 1602 receives the summon request from the HMI 1610 or the cloud computing system 3510. In some embodiments, the vehicle 10 includes a transceiver 3512 configured to receive the summon request from the cloud computing system 3510 or the requesting device 3502. The summon request can include a geographic location (e.g., latitude and longitude) to which the vehicle 10 is requested to transport. In response to receiving the summon request and the geographic location, the controller 1602 operates the vehicle 10 to transport to the geographic location. In some embodiments, the controller 1602 operates the vehicle 10 (e.g., by providing control signals to the driveline 600, the FEAD 800, steering actuators, etc.) to autonomously (e.g., unmanned, without an operator, without requiring input from an operator, etc.) transport to the geographic location. In some embodiments, the controller 1602 operates the HMI 1610 to provide a notification to the operator of the vehicle to prompt the operator of the vehicle 10 to transport the vehicle 10 to the geographic location. The controller 1610 may also operate a display of the HMI 1610 to provide a map with a route to the geographic location.

As shown in FIG. 49, the vehicle 10 may be at a first geographic location 3506a a distance from a first person 3504a who is at a second geographic location 3506b (e.g., illustrated on a map 3508). The first person 3504a may operate the requesting device 3502 to provide the summon request to the vehicle 10 (e.g., by directly sending a wireless signal such as broadcasting a radio signal using a wireless transceiver 3512 of the requesting device 3502 as shown in FIG. 50, or by sending the summon request to the cloud computing system 3510 which forwards the summon request to the controller 1602 of the vehicle 10). The summon request may include the first person's 3504a geographic location 3506b in the summon request or may include a geographic location 3506c where the first person 3504a is not currently. The geographic location 3506c may be a location of a second person 3504b, a location of a fortification, a location of a base, a location of an enemy force, a location between the first person 3504a and an enemy force, a location on a road, a location of a defense, a location of a drop box or container, etc. In this way, the first person 3504a (e.g., a user of the requesting device 3502) can provide the summon request to the vehicle 10 so that the vehicle 10 transports to the location 3506b of the requesting device 3502 or so that the vehicle 10 transports to the location 3506 where the requesting device 3502 is not located.

The cloud computing system 3510 may generate a mission profile or a route for the vehicle 10 when the cloud computing system 3510 receives the summon request. The controller 1602 may operate the vehicle 10 to transport to a specific location to pick up a passenger, rescue a military operative, arrive at a location and disable (e.g., initiate a destruct sequence if no passengers are in the vehicle 10, distract hostile forces, etc.). Upon picking up the passenger, the vehicle 10 may autonomously transport away from the location at which the passenger was picked up (e.g., autonomously). In some embodiments, the vehicle 10 also autonomously opens a door so that the passenger can enter the vehicle 10.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the hull and frame assembly 100, the driveline 600, IMG 700, the FEAD 800, the ESS 1000, the control system 1600, etc.) as shown in the various exemplary embodiments is illustrative only. Additionally, any element disclosed in one embodiment may be incorporated or utilized with any other embodiment disclosed herein.

The invention claimed is:

1. A military vehicle, comprising:
a frame and a plurality of axle assemblies coupled with the frame, the plurality of axle assemblies configured to be driven to transport the military vehicle;
an internal combustion engine configured to drive the plurality of axle assemblies;
an electric motor configured to drive the plurality of axle assemblies; and
processing circuitry configured to:
operate the internal combustion engine and the electric motor according to an environmentally reactive control mode by obtaining a sound level of environmental noise of the military vehicle, and limiting activation of the internal combustion engine based on a comparison between the sound level of the environmental noise and a known sound level generated by operation of the internal combustion engine.

2. The military vehicle of claim 1, wherein the processing circuitry is further configured to operate the internal combustion engine and the electric motor according to a weaponry status mode, wherein in the weaponry status mode, the processing circuitry is configured to start the internal combustion engine in response to operation of weaponry of the military vehicle.

3. The military vehicle of claim 1, wherein the processing circuitry is further configured to operate the internal combustion engine and the electric motor according to an escape mode, wherein in the escape mode, the processing circuitry is configured to operate an actuator to physically decouple one or more items from the military vehicle to reduce weight of the military vehicle, and operate both the internal combustion engine and the electric motor to transport the military vehicle at a maximum possible speed of the military vehicle.

4. The military vehicle of claim 1, wherein the processing circuitry is further configured to operate the internal combustion engine and the electric motor according to a convoy mode, wherein in the convoy mode, the processing circuitry is configured to communicate with processing circuitry of other military vehicles to form a convoy chain comprising a plurality of military vehicles coupled with each other in series, wherein the processing circuitry is also configured to operate an electrical energy storage system of the military vehicle to exchange electrical energy between the military vehicle and the other military vehicles.

5. The military vehicle of claim 1, wherein the processing circuitry uses separate shift profiles for a transmission of the military vehicle when operating in an internal combustion engine-only mode and an electric motor-only mode.

6. The military vehicle of claim 1, wherein the processing circuitry is further configured to operate the internal combustion engine and the electric motor according to a boost mode, wherein in the boost mode, the processing circuitry is configured to operate the electric motor to provide a maximum amount of torque for a period of time and operate a display screen to provide a boost indicator to an operator of the military vehicle.

7. The military vehicle of claim 1, wherein the processing circuitry is further configured to operate the internal combustion engine and the electric motor according to an economy mode, wherein in the economy mode, the processing circuitry is configured to quantify an amount of fuel or electrical energy consumed by the internal combustion engine and the electric motor, and modulate activation of the internal combustion engine and the electric motor to minimize a cumulative energy consumption of the internal combustion engine and the electric motor.

8. The military vehicle of claim 1, wherein the processing circuitry is further configured to operate the internal combustion engine and the electric motor according to a summon mode, wherein in the summon mode, the processing circuitry is configured to receive a summon request from a requesting device and autonomously control the military vehicle to transport to a location of the summon request.

9. The military vehicle of claim 1, wherein the processing circuitry is further configured to operate the internal combustion engine and the electric motor according to an optimized idle control mode, wherein in the optimized idle control mode, the processing circuitry is configured to shut off the internal combustion engine in response to the military vehicle coming to a stop or in response to a parking brake of the military vehicle being activated.

10. The military vehicle of claim 1, wherein the processing circuitry is further configured to operate the internal combustion engine and the electric motor according to a transmission control mode, wherein in the transmission control mode, the processing circuitry is configured to shift a transmission of the military vehicle into a highest available gear when transitioning between an electric vehicle mode and an internal combustion engine mode.

11. The military vehicle of claim 1, wherein the processing circuitry is further configured to operate the internal combustion engine and the electric motor according to a supplemental electric vehicle mode, wherein in the supplemental electric vehicle mode, the electric motor always operates to provide torque to the plurality of axle assemblies to supplement torque provided to the plurality of axle assemblies by the internal combustion engine.

12. A military vehicle, comprising:
a frame and a plurality of axle assemblies coupled with the frame, the plurality of axle assemblies configured to be driven to transport the military vehicle;
an internal combustion engine configured to drive the plurality of axle assemblies;
an electric motor configured to drive the plurality of axle assemblies; and
processing circuitry configured to:
operate the internal combustion engine and the electric motor according to a weaponry status mode, wherein in the weaponry status mode, the processing circuitry is configured to start the internal combustion engine in response to operation of weaponry of the military vehicle.

13. The military vehicle of claim 12, wherein the processing circuitry is further configured to operate the internal combustion engine and the electric motor according to an environmentally reactive control mode by obtaining a sound level of environmental noise of the military vehicle, and limiting activation of the internal combustion engine based on a comparison between the sound level of the environmental noise and a known sound level generated by operation of the internal combustion engine.

14. The military vehicle of claim 12,
wherein the processing circuitry is further configured to operate the internal combustion engine and the electric motor according to an escape mode, wherein in the escape mode, the processing circuitry is configured to operate an actuator to physically decouple one or more items from the military vehicle to reduce weight of the military vehicle, and operate both the internal combustion engine and the electric motor to transport the military vehicle at a maximum possible speed of the military vehicle; and
wherein the processing circuitry is further configured to operate the internal combustion engine and the electric motor according to a convoy mode, wherein in the convoy mode, the processing circuitry is configured to communicate with processing circuitry of other military vehicles to form a convoy chain comprising a plurality of military vehicles coupled with each other in series, wherein the processing circuitry is also configured to operate an electrical energy storage system of the military vehicle to exchange electrical energy between the military vehicle and the other military vehicles.

15. The military vehicle of claim 12,
wherein the processing circuitry uses separate shift profiles for a transmission of the military vehicle when operating in an internal combustion engine-only mode and an electric motor-only mode; and
wherein the processing circuitry is further configured to operate the internal combustion engine and the electric motor according to a boost mode, wherein in the boost mode, the processing circuitry is configured to operate the electric motor to provide a maximum amount of torque for a period of time and operate a display screen to provide a boost indicator to an operator of the military vehicle.

16. The military vehicle of claim 12,
wherein the processing circuitry is further configured to operate the internal combustion engine and the electric motor according to an economy mode, wherein in the economy mode, the processing circuitry is configured to quantify an amount of fuel or electrical energy consumed by the internal combustion engine and the electric motor, and modulate activation of the internal combustion engine and the electric motor to minimize a cumulative energy consumption of the internal combustion engine and the electric motor; and wherein the processing circuitry is further configured to operate the internal combustion engine and the electric motor according to a summon mode, wherein in the summon mode, the processing circuitry is configured to receive a summon request from a requesting device and autonomously control the military vehicle to transport to a location of the summon request.

17. The military vehicle of claim 12, wherein the processing circuitry is further configured to operate the internal combustion engine and the electric motor according to an optimized idle control mode, wherein in the optimized idle control mode, the processing circuitry is configured to shut off the internal combustion engine in response to the military vehicle coming to a stop or in response to a parking brake of the military vehicle being activated.

18. The military vehicle of claim 12, wherein the processing circuitry is further configured to operate the internal combustion engine and the electric motor according to a transmission control mode, wherein in the transmission control mode, the processing circuitry is configured to shift a transmission of the military vehicle into a highest available gear when transitioning between an electric vehicle mode and an internal combustion engine mode.

19. The military vehicle of claim 12, wherein the processing circuitry is further configured to operate the internal combustion engine and the electric motor according to a supplemental electric vehicle mode, wherein in the supplemental electric vehicle mode, the electric motor always operates to provide torque to the plurality of axle assemblies to supplement torque provided to the plurality of axle assemblies by the internal combustion engine.

20. A military vehicle, comprising:
a frame and a plurality of axle assemblies coupled with the frame, the plurality of axle assemblies configured to be driven to transport the military vehicle;
an internal combustion engine configured to drive the plurality of axle assemblies;
an electric motor configured to drive the plurality of axle assemblies; and
processing circuitry configured to:
operate the internal combustion engine and the electric motor according to a convoy mode, wherein in the convoy mode, the processing circuitry is configured to communicate with processing circuitry of other military vehicles to form a convoy chain comprising a plurality of military vehicles coupled with each other in series, wherein the processing circuitry is also configured to operate an electrical energy storage system of the military vehicle to exchange electrical energy between the military vehicle and the other military vehicles.

* * * * *